(12) United States Patent
Jeyachandran et al.

(10) Patent No.: US 7,139,718 B2
(45) Date of Patent: Nov. 21, 2006

(54) NOTIFICATION APPARATUS AND METHOD THEREFOR

(75) Inventors: Suresh Jeyachandran, Yokohama (JP); Shouichi Ibaraki, Tokyo (JP); Masayuki Takayama, Kashiwa (JP); Aruna Rohra Suda, Yokohama (JP); Masanori Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/047,348

(22) Filed: Mar. 25, 1998

(65) Prior Publication Data

US 2001/0051887 A1  Dec. 13, 2001

(30) Foreign Application Priority Data

Mar. 24, 1997 (JP) ................................... 9-069850

(51) Int. Cl.
  *G05B 19/418* (2006.01)
  *G06F 9/46* (2006.01)

(52) U.S. Cl. .......................................................... 705/8

(58) Field of Classification Search .................... 705/8, 705/9, 5, 14, 26, 27, 1, 2, 3, 19, 7
See application file for complete search history.

(56) References Cited

U.S. PATENT DOCUMENTS

| | | | | |
|---|---|---|---|---|
| 4,598,431 A | * | 7/1986 | Nagai et al. .................. | 4/420.2 |
| 4,661,908 A | * | 4/1987 | Hamano et al. ............. | 364/405 |
| 4,926,504 A | * | 5/1990 | Higuchi et al. ................ | 4/247 |
| 4,926,505 A | * | 5/1990 | Higuchi et al. ................ | 4/247 |
| 5,050,077 A | * | 9/1991 | Vincent .......................... | 705/8 |
| 5,416,473 A | | 5/1995 | Dulaney, III et al. ... | 340/825.44 |
| 5,493,692 A | | 2/1996 | Theimer et al. ........... | 455/26.1 |
| 5,499,291 A | | 3/1996 | Kepley ....................... | 379/265 |
| 5,507,554 A | * | 4/1996 | Nakano et al. ......... | 297/216.13 |
| 5,815,554 A | * | 9/1998 | Burgess et al. .......... | 379/90.01 |
| 5,829,066 A | * | 11/1998 | Aibe .............................. | 4/213 |
| 5,842,177 A | * | 11/1998 | Haynes et al. ................ | 705/8 |
| 5,848,395 A | * | 12/1998 | Edgar et al. ................... | 705/9 |
| 5,855,006 A | * | 12/1998 | Huemoeller et al. .......... | 705/9 |
| 5,860,067 A | * | 1/1999 | Onda et al. .................... | 705/9 |
| 5,870,713 A | * | 2/1999 | Haneda et al. ................ | 705/9 |
| 5,890,131 A | * | 3/1999 | Ebert et al. .................... | 705/7 |
| 5,890,134 A | * | 3/1999 | Fox ................................ | 705/9 |
| 5,898,979 A | * | 5/1999 | Miller et al. ................... | 705/9 |
| 5,899,979 A | * | 5/1999 | Miller et al. ................... | 705/9 |

(Continued)

FOREIGN PATENT DOCUMENTS

| | | |
|---|---|---|
| EP | 0 276 424 | 8/1988 |
| WO | WO 91/01615 | 2/1991 |

OTHER PUBLICATIONS

Newsbytes; Individual Software Intros Mac Organizer; p N/A,.*

(Continued)

*Primary Examiner*—Hyung Sough
*Assistant Examiner*—Jason Borlinghaus
(74) *Attorney, Agent, or Firm*—Fitzpatrick, Cella, Harper & Scinto

(57) ABSTRACT

When a schedule is updated, a check is performed to determine whether matters concerning the updated schedule are included in a To Do List, in which all processes to be performed are registered, and a schedule list. When there is an associated undertaking, added to a task table is a notification task for notifying a user and reminding him of the existence of that undertaking. Then, a notification process for reminding the user of the schedule for the pending undertaking is performed under appropriate conditions.

7 Claims, 62 Drawing Sheets

U.S. PATENT DOCUMENTS

| | | | |
|---|---|---|---|
| 5,907,829 A * | 5/1999 | Kida | 705/9 |
| 5,913,212 A * | 6/1999 | Sutcliffe et al. | 705/6 |
| 5,920,858 A * | 7/1999 | Kitabayashi et al. | 707/4 |
| 5,943,652 A * | 8/1999 | Sisley et al. | 705/9 |
| 5,948,054 A * | 9/1999 | Nielsen | 709/200 |
| 5,970,466 A * | 10/1999 | Detjen et al. | 705/8 |
| 5,974,394 A * | 10/1999 | Nakayama et al. | 705/8 |
| 6,012,037 A * | 1/2000 | Yoshikawa | 705/8 |
| 6,016,478 A * | 1/2000 | Zhang et al. | 705/9 |
| 6,038,539 A * | 3/2000 | Maruyama et al. | 705/8 |
| 6,073,062 A * | 6/2000 | Hoshino et al. | 701/3 |
| 6,073,109 A * | 6/2000 | Flores et al. | 705/8 |
| 6,088,367 A * | 7/2000 | Skells | 370/468 |

OTHER PUBLICATIONS

McCaskey, John; Object-Oriented database keeps the house in order; Electronic Design; v. 35; p. 129 (5),.*

Petrovsky, Michele; Get in Synch.; Cardinal Buss. Media Inc.; v 4; p. 39,.*

Yakal, Kathy; DataSel Gold ver 1.0: lean, clean contacts; v 2; n. 11; p. 367, Nov. 1991.*

Cooper, Alan. About Face: The Essentials of User Interface Design. IDG Books Worldwide. Foster City, California. 1995. p. 88.*

Anonymous. Organizing your work gets more done in less time. Profit-Building Strategies for Business Owners. Scarsdale. Dec. 1992. vol. 22, iss. 12. abstract.*

"Expired Reminders: Specifying Alternate Media", IBM Technical Disclosure Bulletin, IBM, Corp., Vol. 35, No. 5. Oct. 1, 1992, pp. 200-202.

"Designation Of Alternate Receipients For Reminders", IBM Technical Disclosure Bulltin, IBM, Corp., vol. 35, No. 5. Oct. 1, 1992, pp. 203-204.

A. Harter, et al., "A Distributed Location System for the Active Office", IEEE Network, Jan.-Feb. 1994, vol. 8, No. 1, pp. 62-70.

"Predicate Reminder Service Mechanism", IBM Technical Disclosure Bulletin, IBM, Corp., vol. 36, No. 6A. Jun. 1, 1993, pp. 53.

* cited by examiner

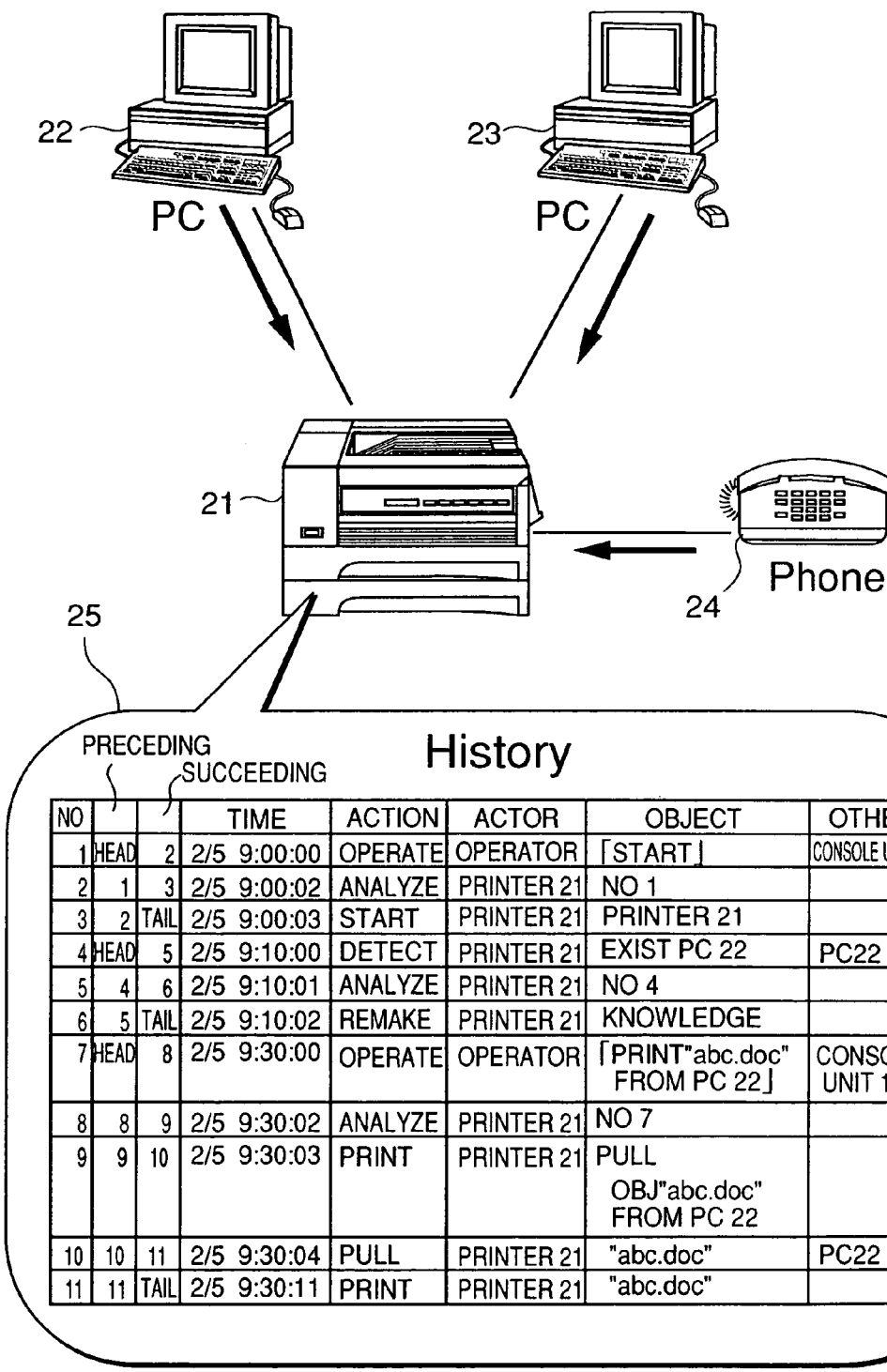

FIG.3

| NO | PRECEDING | SUCCEEDING | TIME | ACTION | ACTOR | OBJECT | OTHERS |
|---|---|---|---|---|---|---|---|
| 1 | HEAD | 2 | 2/5 9:00:00 | OPERATE | OPERATOR | [START] | CONSOLE UNIT 11 |
| 2 | 1 | 3 | 2/5 9:00:02 | ANALYZE | PRINTER 21 | NO 1 | |
| 3 | 2 | TAIL | 2/5 9:00:03 | START | PRINTER 21 | PRINTER 21 | |
| 4 | HEAD | 5 | 2/5 9:10:00 | DETECT | PRINTER 21 | EXIST PC 22 | PC22 |
| 5 | 4 | 6 | 2/5 9:10:01 | ANALYZE | PRINTER 21 | NO 4 | |
| 6 | 5 | TAIL | 2/5 9:10:02 | REMAKE | PRINTER 21 | KNOWLEDGE | |
| 7 | HEAD | 8 | 2/5 9:30:00 | OPERATE | OPERATOR | ["PRINT"abc.doc" FROM PC 22] | CONSOLE UNIT 11 |
| 8 | 7 | 9 | 2/5 9:30:02 | ANALYZE | PRINTER 21 | NO 7 | |
| 9 | 8 | 10 | 2/5 9:30:03 | PRINT | PRINTER 21 | PULL OBJ"abc.doc" FROM PC 22 | |
| 10 | 9 | 11 | 2/5 9:30:04 | PULL | PRINTER 21 | "abc.doc" | PC22 |
| 11 | 10 | TAIL | 2/5 9:30:11 | PRINT | PRINTER 21 | "abc.doc" | |

ORIGINAL HYSTERESIS

| ACTIVATION CONDITION | TASK CONTENTS |
|---|---|
| 3 | NO PROCESSING FOR PREDETERMINED PERIOD OF TIME | MAKE ( OBJECT:IDLE PERIOD OF TIME TASK) |

ORIGINAL HYSTERESIS

| ACTIVATION CONDITION | TASK CONTENTS |
|---|---|
| 7 | UNCONDITIONAL | ANALYZE( OBJECT:RECEIVED DATA 「PRINT"abc.doc"FROM PC 22」) |
| 3 | NO PROCESSING FOR PREDETERMINED PERIOD OF TIME | MAKE ( OBJECT:IDLE PERIOD OF TIME TASK) |

ORIGINAL HYSTERESIS

| ACTIVATION CONDITION | TASK CONTENTS |
|---|---|
| 8 | UNCONDITIONAL | PRINT( OBJECT:"abc.doc" =PULL( ACTOR:A OBJECT:<abc.doc> IOBJECT:PC28)) |
| 3 | NO PROCESSING FOR PREDETERMINED PERIOD OF TIME | MAKE ( OBJECT:IDLE PERIOD OF TIME TASK) |

ORIGINAL HYSTERESIS

| ACTIVATION CONDITION | TASK CONTENTS |
|---|---|
| 9 | UNCONDITIONAL | PULL( ACTOR:A OBJECT:<abc.doc> LOBJECT:(PC22)) |
| 8 | UNCONDITIONAL | PRINT( OBJECT:<abc.doc> =PULL) |
| 3 | NO PROCESSING FOR PREDETERMINED PERIOD OF TIME | MAKE ( OBJECT:IDLE PERIOD OF TIME TASK) |

ORIGINAL HYSTERESIS

| ACTIVATION CONDITION | TASK CONTENTS |
|---|---|
| 8 | UNCONDITIONAL | PRINT( OBJECT:<abc.doc> =PULL) |
| 3 | NO PROCESSING FOR PREDETERMINED PERIOD OF TIME | MAKE ( OBJECT:IDLE PERIOD OF TIME TASK) |

ORIGINAL HYSTERESIS

| ACTIVATION CONDITION | TASK CONTENTS |
|---|---|
| 3 | NO PROCESSING FOR PREDETERMINED PERIOD OF TIME | MAKE ( OBJECT:IDLE PERIOD OF TIME TASK) |

| PROCESS | CONTENTS |
|---|---|
| INITIAL DISPLAY | DETERMINE NUMBER OF COPIES |
| COPY COUNT DESIGNATION OPERATION PROCESS | [ ] SHEET (INITIAL VALUE=1,) |

FIG.14B

| PROCESS | CONTENTS |
|---|---|
| INITIAL DISPLAY | SELECT FUNCTION TO BE EXECUTED |
| FUNCTION DESIGNATION OPERATION PROCESS | COPY, FAX, PRINT |

FIG.14C

| PROCESS | CONTENTS |
|---|---|
| INITIAL DISPLAY | SELECT DESTINATION |
| DESTINATION DESIGNATION OPERATION PROCESS | A CO. MR. a, B CO. MR. b, C CO. MR. c |

FIG.19A

| TYPE | CONTENTS | PRIORITY |
|---|---|---|
| SCHEDULE | SCHEDULE 214 | |
| SCHEDULE | SCHEDULE 215 | |
| SCHEDULE | SCHEDULE 216 | |
| SCHEDULE | SCHEDULE 217 | |
| SCHEDULE | SCHEDULE 218 | |
| TASK | TASK 264 | |
| TASK | TASK 265 | |
| TASK | TASK 266 | |
| RECEIVED DATA | FAX 277 | |
| RECEIVED DATA | E-mail 278 | |
| RECEIVED DATA | TELEPHONE 279 | |

FIG.19B

| TYPE | CONTENTS | PRIORITY | SELECTED BY USER | URGENCY | PERSON | RELATION | |
|---|---|---|---|---|---|---|---|
| SCHEDULE | SCHEDULE 214 | 13 | 5 | 2 | 3 | 3 | 1901 |
| SCHEDULE | SCHEDULE 215 | 12 | 3 | 3 | 3 | 3 | 1902 |
| SCHEDULE | SCHEDULE 216 | 13 | 3 | 4 | 3 | 3 | 1903 |
| SCHEDULE | SCHEDULE 217 | 15 | 5 | 4 | 3 | 3 | 1904 |
| SCHEDULE | SCHEDULE 218 | 14 | 3 | 5 | 3 | 3 | 1905 |
| TASK | TASK 264 | 17 | 3 | 6 | 5 | 3 | 1906 |
| TASK | TASK 265 | 12 | 3 | 6 | 0 | 3 | 1907 |
| TASK | TASK 266 | 20 | 5 | 7 | 5 | 3 | 1908 |
| RECEIVED DATA | FAX 277 | 12 | 3 | 4 | 5 | 0 | 1909 |
| RECEIVED DATA | E-mail 278 | 15 | 3 | 4 | 5 | 3 | 1910 |
| RECEIVED DATA | TELEPHONE 279 | 15 | 3 | 4 | 5 | 3 | 1911 |

FIG. 20

| SCHEDULE PRIORITY | TASK PRIORITY | ARRIVAL INFORMATION PRIORITY | DISPLAY MEANS |
|---|---|---|---|
| 3 OR LESS | 3 OR LESS | 3 OR LESS | DISPLAY COLOR = RED, BLINK, VOICE, 20 POINT |
| 6 OR LESS | 6 OR LESS | 6 OR LESS | DISPLAY COLOR = RED, BLINK, BEEP, 20 POINT |
| 9 OR LESS | 9 OR LESS | 9 OR LESS | DISPLAY COLOR = RED, BLINK, 20 POINT |
| 12 OR LESS | 12 OR LESS | 12 OR LESS | DISPLAY COLOR = RED, 20 POINT |
| 13 OR LESS | 15 OR LESS | 15 OR LESS | DISPLAY COLOR = BLACK, 16 POINT |
|  | 18 OR LESS | 18 OR LESS | DISPLAY COLOR = BLACK, 14 POINT |
| 14 OR MORE | 19 OR MORE | 19 OR MORE | NO DISPLAY |

FIG.23

| URGENCY | PRIORITY |
|---|---|
| MORE THAN A WEEK BEFORE START | 7 |
| MORE THAN 3 DAYS BEFORE START | 6 |
| MORE THAN 1 DAY BEFORE START | 5 |
| MORE THAN 3 HOURS BEFORE START | 4 |
| MORE THAN 1 HOUR BEFORE START | 3 |
| MORE THAN 5 MINUTES BEFORE START | 2 |
| 5 MINUTES BEFORE AND AFTER START | 1 |
| BEFORE END | 1 |
| LESS THAN 1 HOUR AFTER END | 2 |
| LESS THAN 3 HOURS AFTER END | 3 |
| WITHIN 1 DAY AFTER END | 4 |
| LESS THAN 3 DAYS AFTER END | 5 |
| WITHIN A WEEK AFTER END | 6 |
| ON AND AFTER A WEEK AFTER END | 7 |

FIG.24

| POSITION・POST・RELATION | PRIORITY |
|---|---|
| CHAIRMAN OF BOARD | 0 |
| PRESIDENT | 0 |
| DIRECTOR | 1 |
| HEAD OF DEPARTMENT | 2 |
| SECTION CHIEF | 3 |
| CHIEF CLERK | 3 |
| CHIEF OFFICIAL | 4 |
| COWORKER | 5 |
| CLIENT | 1 |
| COOPERATIVE CO. | 2 |
| PURCHASER | 5 |
| FAMILY | 6 |

| TASK | ~262 | | | |
|---|---|---|---|---|
| | TERM | CONTENTS | PERSONS CONCERNED | PRIORITY |
| 264~ | 3/4  18:00 | reserve Hotel | John | 3 |
| 265~ | 3/4  18:00 | reserve Train | President | 3 |
| 266~ | 3/8  19:00 | check Progress | Mary | 5 |

| PERSON | ~267 | |
|---|---|---|
| | PERSON | PRIORITY |
| | President | 1 | ~268
| | Coworker | 5 | ~269

FIG.34A

| USER INSTRUCTION | MODE CONVERSION | PREDICTION |
|---|---|---|
| Hello | ABSENT→RETURNED | |
| Good morning | ABSENT→RETURNED | |
| See you tomorrow | PRESENT→ LEFT | ABSENT UNTIL TOMORROW |
| See you later | PRESENT→ LEFT | ABSENT FOR A WHILE |
| just a moment | PRESENT→ LEFT | ABSENT IN A MOMENT |

FIG.34B

| RECEIVED DATA | TRANSMISSION SOURCE | MODE CONVERSION | PREDICTION |
|---|---|---|---|
| RETURN | OSAKA | ABSENT | |
| RETURN | TOKYO 6F OFFICE ROOM | UNCHANGED | |
| RETURN | TOKYO 11 MEETING ROOM | ABSENT | |
| LEAVE | OSAKA | UNCHANGED | ABSENT AT LEAST FOR TWO HOURS |
| LEAVE | TOKYO 11 MEETING ROOM | UNCHANGED | ABSENT AT LEAST FOR 30 SECONDS |

FIG.34C

| DETECTED DATA | CURRENT MODE | MODE CONVERSION | PREDICTION |
|---|---|---|---|
| USER PRESENT | PRESENT | UNCHANGED | |
| USER PRESENT | ABSENT | RETURNED | |
| USER PRESENT | RETURNED | PRESENT | |
| USER ABSENT | PRESENT | LEFT | |
| USER ABSENT | LEFT | ABSENT | |

FIG.35

| CONVERSION MODE | DECIDED PROCESS |
|---|---|
| PRESENT | • REPORT URGENT DATA<br>• DISPLAY DATA WHEN NO MANIPULATION PERFORMED |
| ABSENT | • LOCK TO INHIBIT USE BY A THIRD PARTY<br>• LOCK ONLY DATA AND PROCESS THAT FOR SECURITY ARE NOT PERMITTED IN ORDER TO INHIBIT USE BY A THIRD PARTY<br>• ENABLE USE OF DATA AND PROCESS PERMITTED BY SECURITY<br>• DISPLAY LOCATION OF USER |
|  | • DISPLAY MESSAGE<br>• DISPLAY MESSAGE ONLY TO SPECIFIED PERSON<br>• ACCEPT MESSAGE FROM VISITOR<br>• RETURN ABSENCE NOTICE IN RESPONSE TO E-MAIL, FAX AND TELEPHONE CALL DURING ABSENCE<br>• PERFORM PROCESS IN RESPONSE TO E-MAIL, FAX AND TELEPHONE CALL DURING ABSENCE |
| LEFT | • REPORT DATA USER SHOULD RECALL |
| RETURNED | • RELEASE A LOCK<br>• RECOVER JOB ENVIRONMENT STATE WHEN USER LEFT<br>• NOTIFY SECOND INFORMATION PROCESSING APPARATUS CONNECTED VIA A NETWORK OF RETURN OF USER<br>• DISPLAY MESSAGE FROM VISITOR.<br>• DISPLAY CONTENTS OF E-MAIL, FAX AND TELEPHONE MESSAGE RECEIVED DURING ABSENCE<br>• DISPLAY PROCESSING CONTENTS PERFORMED DURING ABSENCE |
| UNKNOWN | • QUERY AS TO WHETHER USER IS NEARBY |
| CONTRACTION | • CONFIRM WHETHER USER IS CORRECT<br>• NOTIFY USER OF DISCOVERY OF CONTRADICTION<br>• NOTIFY SECOND INFORMATION PROCESSING APPARATUS CONNECTED VIA A NETWORK OF DISCOVERY OF CONTRADICTION<br>• LOCK<br>• ALARM |
| NO PROCESS | NO PROCESS |

FIG.40

| ASSUMPTION KNOWLEDGE | MODE ASSUMPTION |
|---|---|
| ONE DAY HAS NOT ELAPSED SINCE SEE YOU TOMORROW | ABSENT |
| ONE MINUTE HAS NOT ELAPSED SINCE SEE YOU LATER | ABSENT |
| TWO HOURS HAS NOT ELAPSED SINCE USER LEFT OSAKA | ABSENT |
| 30 SECONDS HAS NOT ELAPSED SINCE USER LEFT TOKYO 11 MEETING ROOM | ABSENT |
| DURING HOLIDAYS ACCORDING TO SCHEDULE DATA | ABSENT |
| DURING MEETING ACCORDING TO SCHEDULE DATA | ABSENT |
| OUT OF OFFICE ACCORDING TO SCHEDULE DATA. | ABSENT |
| ACCORDING TO TO DO LIST, THERE IS URGENT JOB THAT USER CAN NOT DO WHILE PRESENT | ABSENT |
| ACCORDING TO TO DO LIST, THERE IS URGENT JOB THAT USER CAN NOT DO WHILE ABSENT | PRESENT |
| ACCORDING TO TO DO LIST, USER MUST BE PRESENT AND WAIT FOR CONTACT | PRESENT |
| ACCORDING TO PREVIOUSLY RECEIVED DATA, THERE IS URGENT JOB THAT USER CAN NOT DO WHILE PRESENT | ABSENT |
| ACCORDING TO PREVIOUSLY RECEIVED DATA, THERE IS URGENT JOB THAT USER CAN NOT DO WHILE ABSENT | PRESENT |
| ACCORDING TO PREVIOUSLY RECEIVED DATA, USER MUST BE PRESENT AND WAIT FOR CONTACT | PRESENT |
| ACCORDING TO HYSTERESIS DATA, USER IS ABSENT DURING THIS PERIOD TIME | ABSENT |
| ACCORDING TO HYSTERESIS DATA, USER IS PRESENT DURING THIS PERIOD | PRESENT |

FIG.46
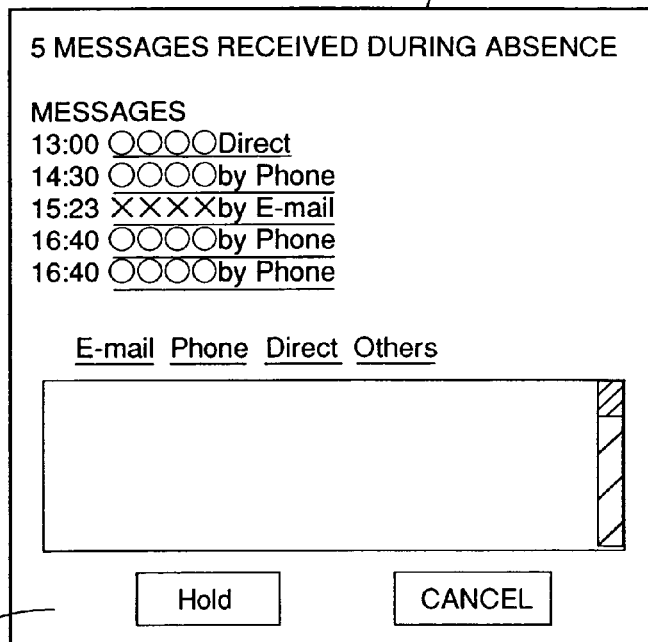
464
5 MESSAGES RECEIVED DURING ABSENCE
MESSAGES
13:00 ○○○○Direct
14:30 ○○○○by Phone
15:23 ××××by E-mail
16:40 ○○○○by Phone
16:40 ○○○○by Phone
E-mail  Phone  Direct  Others
Hold    CANCEL
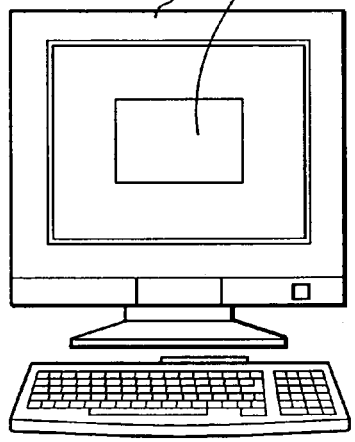
462
BE BACK TO SEAT
Hello 463
461

| USER NAME | PRESENT LOCATION |
|---|---|
| A | TOKYO / xxxx |
| B | OSAKA / •••• |
| C | PRESENT LOCATION UNKNOWN |
| D | PRESENT LOCATION UNKNOWN |
| E | TOKYO 11F CONFERENCE ROOM |

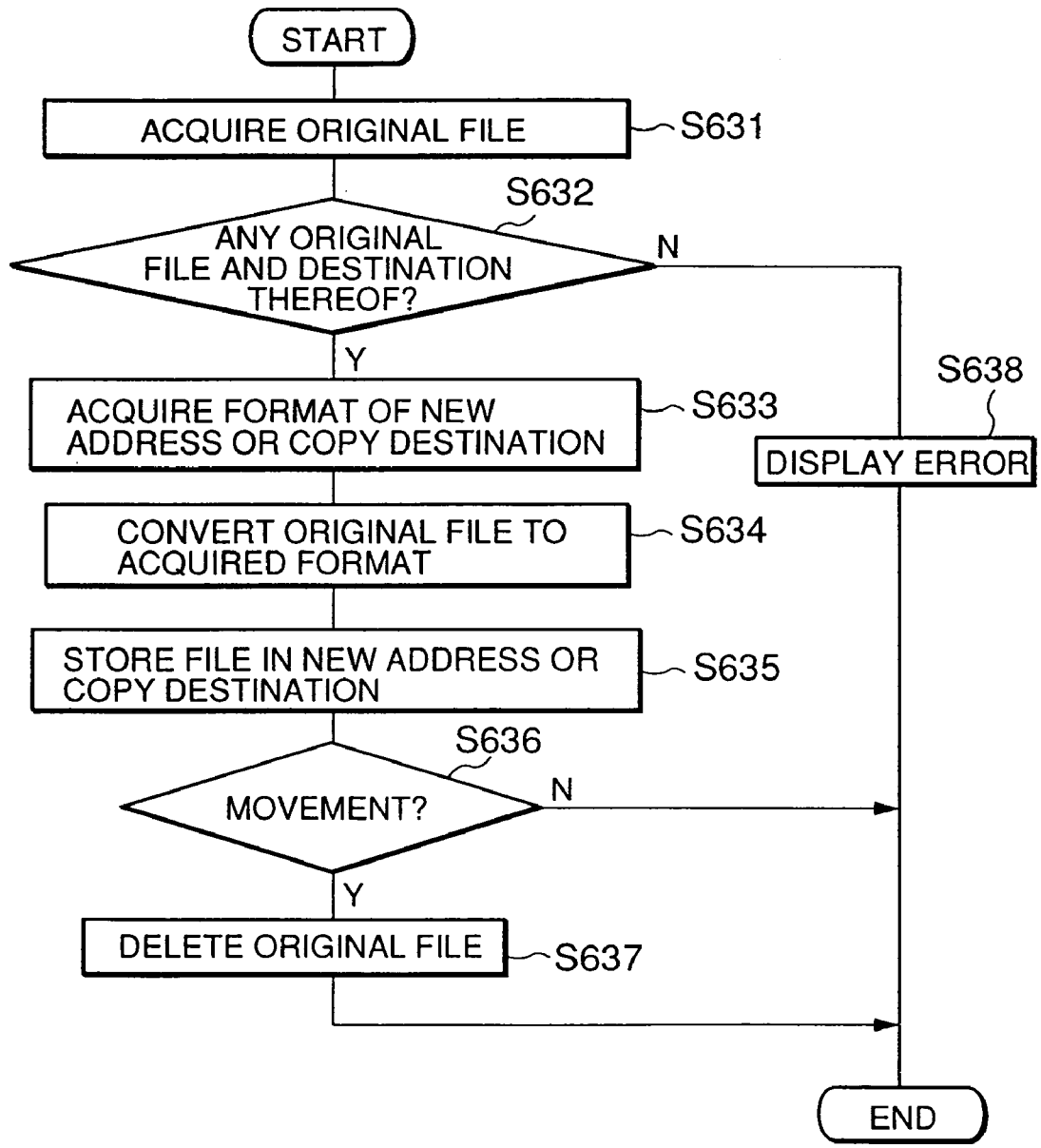

NOTIFICATION APPARATUS AND METHOD THEREFOR

BACKGROUND OF THE INVENTION

1. Field of the Invention

The present invention relates to an information processing apparatus that relays a notification to a user and a method therefor.

2. Related Background Art

Notification of a schedule event can be relayed to a user by using schedule management software that stores and manages the user's schedule.

When a user, for example, inputs "10:30–12:00 Review of new model" to a schedule operating screen and selects a notification time of 15 minutes prior to the start of the review, a notification screen is displayed at 10:15:00, which is 15 minutes before the scheduled review starts, so that the user is reminded of the scheduled event.

With the conventional technique, however, a user must select a notification time in advance, and can not set up a process that provides alternate procedures corresponding to a variety of situations.

When the user selects a notification time using the conventional technique and then leaves his seat before the selected notification time, the performance of the notification process is useless. In addition, conditions other than time can not be designated. Thus, scheduled information can not be fully utilized.

In other words, according to the conventional technique, a user must designate in advance a notification time at which to receive a notification, such as a reminder of a scheduled event, from an apparatus, so that performance of a flexible notification process that corresponds to an existing situation can not be performed, and a notification condition other than the time can not be specified.

SUMMARY OF THE INVENTION

It is, therefore, one objective of the present invention to perform an appropriate notification process in consonance with an existing situation.

According to one aspect, the present invention, which achieves the objective, relates to an information processing apparatus comprising:

determination means for determining whether a predetermined notification condition can be satisfied; and notification means for notifying a user of a pending undertaking when it is ascertained by the determination means that the notification condition can be satisfied.

According to another aspect, the present invention, which achieves the objective, relates to an information processing method comprising:

a determination step of determining whether a predetermined notification condition can be satisfied; and a notification step of notifying a user of a pending undertaking to be executed when it is ascertained at the determination step that the notification condition can be satisfied.

According to an additional aspect, the present invention, which achieves these objectives, relates to a computer-readable storage medium in which is stored a program for controlling a computer, the program comprising codes for permitting the computer to perform:

a determination step of determining whether a predetermined notification condition can be satisfied; and a notification step of notifying a user of a pending undertaking to be executed when it is ascertained at the determination step that the notification condition can be satisfied.

Other objectives and advantages, in addition to those discussed above, will become apparent to those skilled in the art during the course of the description of a preferred embodiment of the invention that follows. In the description, reference is made to accompanying drawings, which form a part thereof, and which illustrate an example of the invention. Such example, however, is not exhaustive of the various embodiments of the invention, and therefore, reference is made to the claims that follow the description for determining the scope of the invention.

BRIEF DESCRIPTION OF THE DRAWINGS

FIG. 2 is a diagram illustrating an example system arrangement according to the embodiment;

FIG. 3 is a diagram showing example hysteresis data;

FIGS. 4A, 4B, 4C, 4D, 4E and 4F are diagrams showing an example task table;

FIGS. 14A, 14B and 14C are diagrams illustrating example operation data;

FIGS. 19A and 19B are diagrams showing example items to be processed;

FIG. 20 is a diagram illustrating example data that define highlighting display methods consonant with the priority levels;

FIG. 23 is a diagram showing example definitions employed in order to acquire priority levels from urgency levels;

FIG. 24 is a diagram showing example definitions employed in order to acquire a priority level consonant with the position, the post and relations of a user;

FIG. 31 is a flowchart showing the processing that is performed in consonance with the number of objects to be searched for;

FIGS. 34A, 34B and 34C are diagrams showing example definitions used for presence mode conversion;

FIG. 35 is a diagram illustrating example user presence mode conversion data;

FIG. 40 is a diagram showing example knowledge data used for inferring a user's presence;

FIG. 46 is a diagram showing example processing performed when it is determined that a user has returned to his seat;

FIG. 63 is a flowchart showing the processing for the various form file combinations.

DETAILED DESCRIPTION OF THE PREFERRED EMBODIMENTS

The preferred embodiment of the present invention will now be described in detail while referring to the accompanying drawings.

(Basic Structure)

Figure 1:
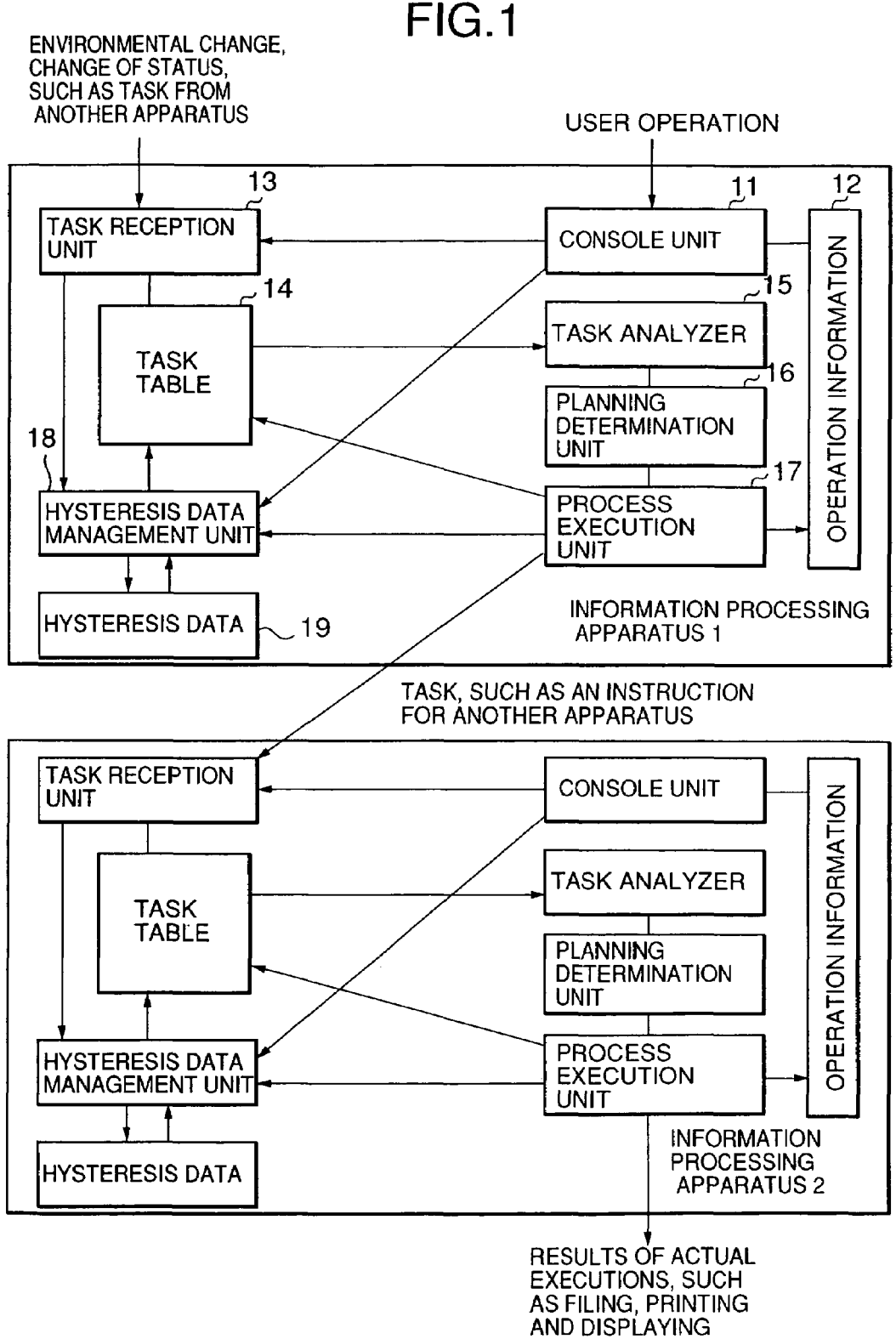
FIG. 1 is a diagram showing the functional arrangement according to one embodiment of the present invention.

FIG. 1 is a diagram showing the functional arrangement according to one embodiment, and FIG. 2 is a diagram illustrating an example system arrangement.

An information processing apparatus 1 in FIG. 1 is, for example, a printer 21 in FIG. 2, and an information processing apparatus 2 in FIG. 1 is, for example, a PC 22 or 23, or a telephone 24 that performs processing in association with the printer 21 in FIG. 2.

In FIG. 2, an action initiated by the PC 22 or 23, or the telephone 24, which is an example information processing apparatus 2, the operation of a console (operation) unit 11, which will be described later, and the detection of the existence of the PC 22 are stored as hysteresis data (history information) 25 in the printer 21.

FIG. 3 is a diagram showing example hysteresis data. As is shown in FIG. 3, the hysteresis data is composed of: a Hysteresis No.; a Pre-hysteresis number, which is a hysteresis No. for hysteresis data for the process on which is based the generation of the processes represented by the individual hysteresis; a Post-hysteresis number, which is the hysteresis No. for the hysteresis data for the process that is generated in response to the processes represented by the individual hysteresis; an Execution time for the process represented by the hysteresis; a Type of action; a Person for whom action is performed; an Object to be processed; and Other information, such as an action source, an action destination, and a location for the action.

For example, [No=7], in history 307 in FIG. 3, designates 7 as the hysteresis number for the hysteresis data. Further, [preceding=head] indicates that the process represented by this hysteresis is a cue for a processing sequence, and constitutes the first process. [Succeeding=8] designates 8 as the hysteresis number for the process that is generated based on the process represented by the hysteresis.

[Time=2/5 9:30:00] indicates that the process represented by the hysteresis was performed February 5, at 9:30:00. [Action=Operate] indicates that the process for this hysteresis is an operation. [Actor=Operator] indicates that an operator performed the process at this hysteresis. [Object="Print 'abc.doc' from PC 22"] indicates that the object of the process for the hysteresis is an instruction "Print 'abc.doc' from PC 22". [Others=Console unit 11] indicates that the process for this hysteresis was performed by the console unit 11.

In the following embodiments, the information processing apparatuses 1 and 2 can be any types of apparatuses so long as they possess the required functions, and may be a printer, a scanner, a facsimile machine, a PC, a copying machine, a file server or a digital camera.

The console unit 11 displays a screen required for a user in consonance with operation data 12. Information concerning data manipulation, or an instruction entered by the user is transmitted to a task reception unit 13 and a hysteresis data management unit 18.

In FIG. 2, assume that a user instructs the printer 21, which is one example information processing apparatus 1, to print file "abc.doc" stored in the PC 22, which is an example information processing apparatus 2. The information 307 in FIG. 3 is added to hysteresis data 19 by the hysteresis data management unit 18, and the hysteresis data 19 is transmitted to the task reception unit 13.

The operation data 12 is information or knowledge that is referred to by the console unit 11, and that regulates the operation at the console unit 11. In this embodiment, based on data received by the task reception unit 13, the operation data 12 are changed or updated by a process execution unit 17, which will be described later, in order to implement flexible operating procedures.

Especially since a communication condition is focused on to change or update the operation data 12, flexible procedures consonant with the communication condition can be performed. Further, since the contents of an instruction issued by a user are focused on, procedures in accordance with commands given for other than a regular process can be performed. In addition, since the focus is placed on the priority levels of the contents to be operated, procedures in accordance with a priority level can be performed. Furthermore, since the focus is placed on the number of items included in the contents to be operated, procedures in accordance with the number of items can be performed.

For example, according to one of the methods employed by the information processing apparatus 1 to control the information processing apparatus 2, the operation data 12 are acquired for the information processing apparatus 2, which changes or updates the operation data 12 of the information processing apparatus 1.

When the communication with the information processing apparatus 2 fails, as a consequence of this failure, the operation data 12 is acquired from a third information processing apparatus 3, so that procedures consonant with the communication situation can be performed. Or, when a user instructs the execution of a process that the information processing apparatus 2 can not perform with its originally available operation data 12, the operation data 12 to implement this process is acquired from a different information processing apparatus, so that the procedures can be performed for an instruction other than those for a regular process.

According to another example method, the priority level for information to be operated on by the console unit 11 is employed to change the operation data 12, so that the operation can be performed in consonance with the priority level for each item of information, and therefore, procedures corresponding to priority levels can be performed. Or, since the operation data 12 are changed in the same manner in consonance with the number of data sets to be operated on, procedures consonant with the number of items can be performed.

The task reception unit 13 not only receives data from the console unit 11, but also, as a status change, receives changes effected in the environment of the information processing apparatus 1, and tasks from other apparatuses, such as the information processing apparatus 2. When the information processing apparatus is connected to a network, the reception task 13 also detects the connection of a new apparatus to the network, receives print instructions from other apparatuses as tasks, and detects a state wherein no process has been performed for a predetermined period of time. As a result, the task reception unit 13 adds received data to a task table 14 as a new task, and also transmits it to the hysteresis data management unit 18. The task reception unit 13, as well as the process execution unit 17, which will be described later, is required for communication with a different apparatus.

When, in FIG. 2, the PC 22, which is the information processing apparatus 2 connected via the network to the printer 21, the information processing apparatus 1, is powered on, the presence of the PC 22 is detected, and information 304 in FIG. 3 is added to the hysteresis data 19 by the hysteresis data management unit 18.

FIGS. 4A to 4F are diagrams showing an example task table 14. As is shown in FIGS. 4A to 4F, in the task table 14 are entered the activation conditions and the contents of tasks, and a task having a hysteresis number is entered in the hysteresis data 19 for a process that is the source of the performance of individual tasks. In FIGS. 4A to 4F, beginning at the top of the table the tasks are arranged in the order of priority. The addition of the task to the task table 14 is performed by the previously described task reception unit 13 and the process execution unit 17, which will be described later. The extraction of a task from the task table 14 is performed by a task analyzer 15, which will be described later.

ANALYZE in a task row 42 in the task table 14 in FIG. 4B is a task that is generated in response to manipulation by a user [Print "abc.doc" from PC 22] in the hysteresis data 307, which is indicated by hysteresis No. 7 in FIG. 3. Thus, a value of "7" is stored in the Original hysteresis column, the activation condition is defined as no condition, and the contents of the task are defined as an analysis of the manipulation by the user. Since the task 42 is added to the hysteresis data 19 as hysteresis No. 8 in hysteresis data 308, a value of "8" is set in the Original hysteresis for a task 43, which is generated based on the task 42, and similarly, a value of "9" is set in the Original hysteresis for a task 44.

The task analyzer 15 extracts the highest priority task from the task table 14, and analyzes the purpose of the task. With this analysis, at a planning determination unit 16 and the process execution unit 17, which will be described later, the performance of less efficient operations is prevented, and an optimal process can be performed.

For example, an analysis of the task 43, stored in the task table 14 in FIGS. 4A to 4F, reveals that it has as a direct purpose the printing of a document, and as a final purpose the delivery of the printed document to a user. If the final purpose can be achieved by using a more efficient method, it is understood that even the performance of printing may be unnecessary, and planning for the processing is performed in accordance with the analysis.

The planning determination unit 16 receives the analysis from the task analyzer 15, and refers to the planning knowledge to plan a process to be performed to achieve the task. For the task 43 stored in the task table 14 in FIG. 4C, the operation Object: "abc.doc"=PULL from the apparatus B is planned before the object is printed.

The process execution unit 17 performs the processing in consonance with the contents determined by the planning determination unit 16, and transmits the processing contents to the hysteresis data management unit 18. When the printing is executed, for example, hysteresis 311 in FIG. 3 is added to the hysteresis data 19 by the hysteresis data management unit 18.

Upon the receipt of the instructions from the console unit 11, the task reception unit 13 or the process execution unit 17, and in consonance with an operation performed by an operator, such as searching, editing, deleting or condition/setup changing; the entry/reception of an instruction or information from another information processing apparatus or the detection of a status; and the performance of a process performed by the subject apparatus, such as reading, printing, displaying, transmitting, saving or holding of information, the hysteresis data management unit 18 adds to the hysteresis data 19, in correlation with the individual hysteresis data, information concerning an actor, such as an operator, an instructor or a person in charge of processing; information concerning an action that is executed, such as manipulation, an instruction or a process; information concerning time of manipulation, an instruction or a process; information concerning a location or an apparatus whereat manipulation, an instruction or a process takes place; and information concerning an object that is manipulated, instructed or processed. Further, the hysteresis data management unit 18 outputs hysteresis numbers relative to the added hysteresis data.

The data, added to the hysteresis data 19, for the object that is manipulated, instructed or processed are stored in correlation with data that are handled by another application, such as file data, schedule data, pending data for processing, a database (address list, etc.) or data extracted from specific data or mail device management data, so that the employment of such data by individual applications is easy.

The hysteresis condition designation operation, which is performed according to the instructions from the console unit 11, the task reception unit 13 and the process execution unit 17, can be used to determine whether hysteresis data corresponding to the operation, the instructions or the processing should be saved, and whether the substance of the object should be saved, and to designate a person who can refer to the hysteresis data. The data are added to the hysteresis data 19 in consonance with the designations.

In the hysteresis data usage process that is performed in accordance with the instructions from the console unit 11, the task reception unit 13 or the process execution unit 17, based on the hysteresis data 19 for the individual apparatuses that have been entered the process is re-performed; a new process, such as printing, displaying, transmitting, saving, searching, action pending, editing or deleting, is performed for the past process; the setup for an alteration/saving condition for the period for saving hysteresis data is changed, or knowledge concerning the operation and the processing is updated.

Figure 5:
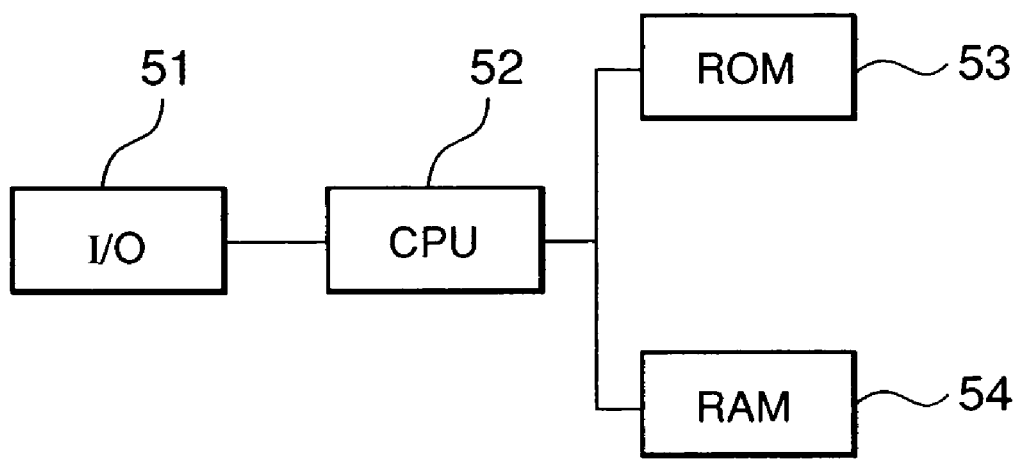
FIG. 5 is a diagram illustrating the hardware arrangement for individual units according to the embodiment.

FIG. 5 is a diagram illustrating the hardware arrangement for the individual units that implement the processing according to this embodiment. An I/O 51 performs input/output transactions with an external device. A CPU 52 executes a program and controls the individual sections. A ROM 53 is used to store constant data and programs that are to be executed by the CPU 52 and that correspond to the flowcharts, which will be described later. A RAM 54 is used to temporarily store the above described task table 14, variables and intermediate data, such as the operation data 12 and the hysteresis data 19, that are generated during the processing. The program may be loaded into the RAM 54 from the outside.

Figure 6:
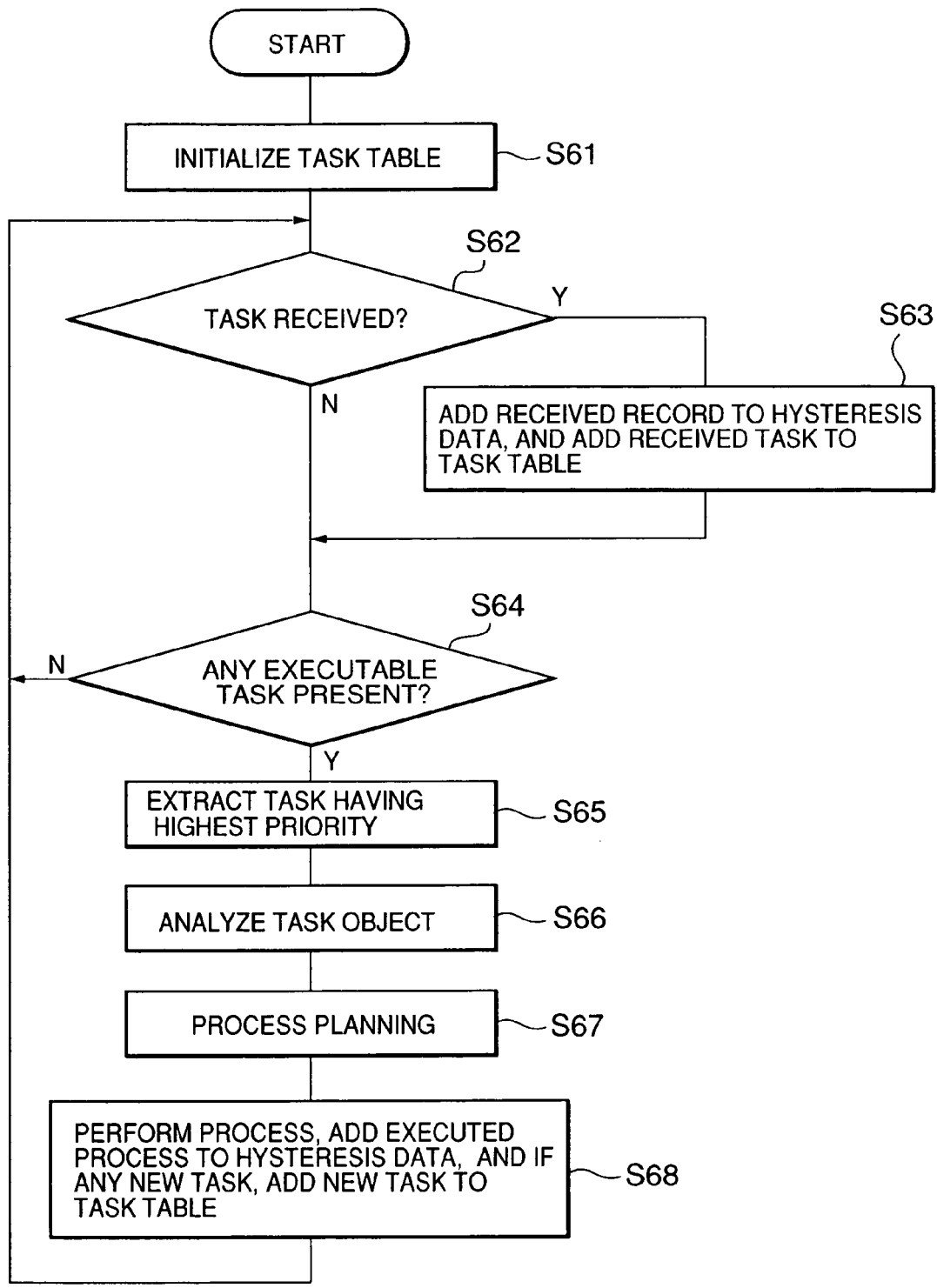
FIG. 6 is a flowchart showing all the processing for the embodiment.

FIG. 6 is a flowchart showing the general processing according to this embodiment. When the information processing apparatus 1 is activated, at step S61 the task table 44 is initiated, as is shown in FIG. 4A. At step S62, a check is performed to determine whether the task reception unit 13 has received, as a status change, information concerning an instruction entered by a user at the console unit 11, an environmental change or a task from another apparatus. When a task has been received, program control moves to step S63, whereat the reception of data is additionally recorded as hysteresis data 304 in the hysteresis data 19, and the reception data analysis task 42 is added at the beginning of the task table 14, as is shown in FIG. 4B.

At step S64, a check is performed to determine whether there is an executable task in the task table 14. If there is no such task, program control returns to step S62, whereat the task reception status is examined. When, at step S64, an executable task is present, program control advances to step S65, whereat the task having the highest priority is extracted from the task table 14.

At step S66, the purpose of the task is analyzed, and at step S67, the process to be performed is determined and process planning is performed. If the task table 14 is as shown in FIG. 4B, ANALYZE, which is the task 42 having the highest priority, is extracted, it is confirmed that the purpose of the task is analyzation of the received data, and planning for the processing for the initiation of analyzation is performed.

At step S68, the processing is performed according to the plan, and a relevant record is added to the hysteresis data 19, as is shown by 308 in FIG. 3. A new task may, if necessary, be added to the task table 14. When, for example, the received data are analyzed as planned for the ANALYZE task 42 in FIG. 4B, the instruction "Print 'abc.doc' from PC 22" entered by the user at the console unit 11 is analyzed, and PRINT, which is a new task 43, is added, as is shown in FIG. 4C.

Program control returns to step S62. However, since a new task has not yet been received, program control moves to step S64 and the above process is repeated. As a result, PRINT for the task 43 in FIG. 4C, which was previously added at step S68, is extracted, analyzed and planned for. In this case, to execute the task PRINT, it is confirmed that the Object is present in the information processing apparatus 1, and a new task 44, PULL, and a task 45, PRINT, that uses the pulled object are added as is shown in FIG. 4D.

When the processing is further repeated, the task 44, PULL, in FIG. 4D is executed. When the processing is further repeated, the Object obtained as the result of the task PULL is used to execute the task 46 in FIG. 4E. As a result, the task table 14 is returned to the same state as it was when initialized, as is shown in FIG. 4F.

Figure 7:
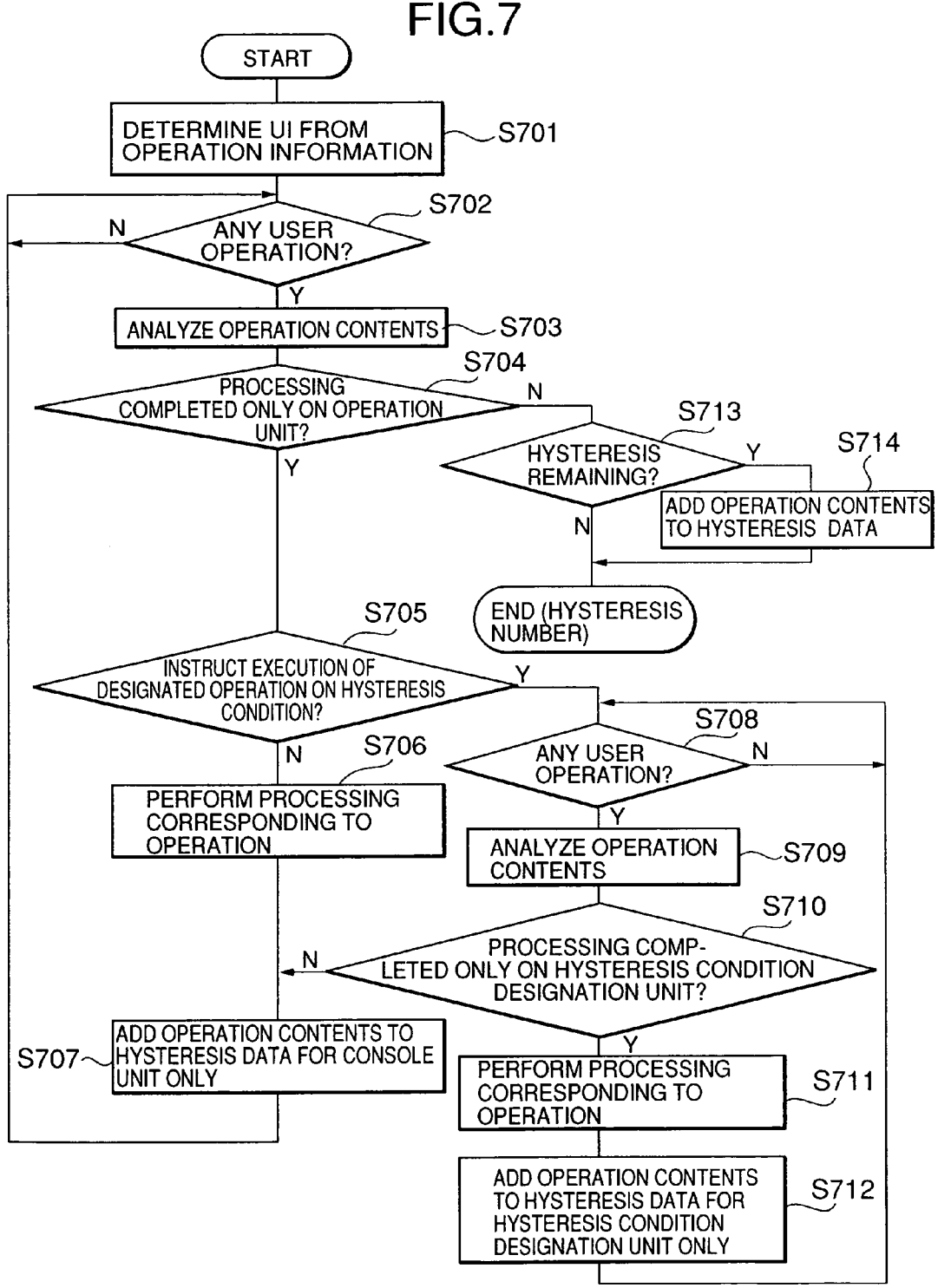
FIG. 7 is a flowchart showing the processing performed by a console unit.
Figure 8:
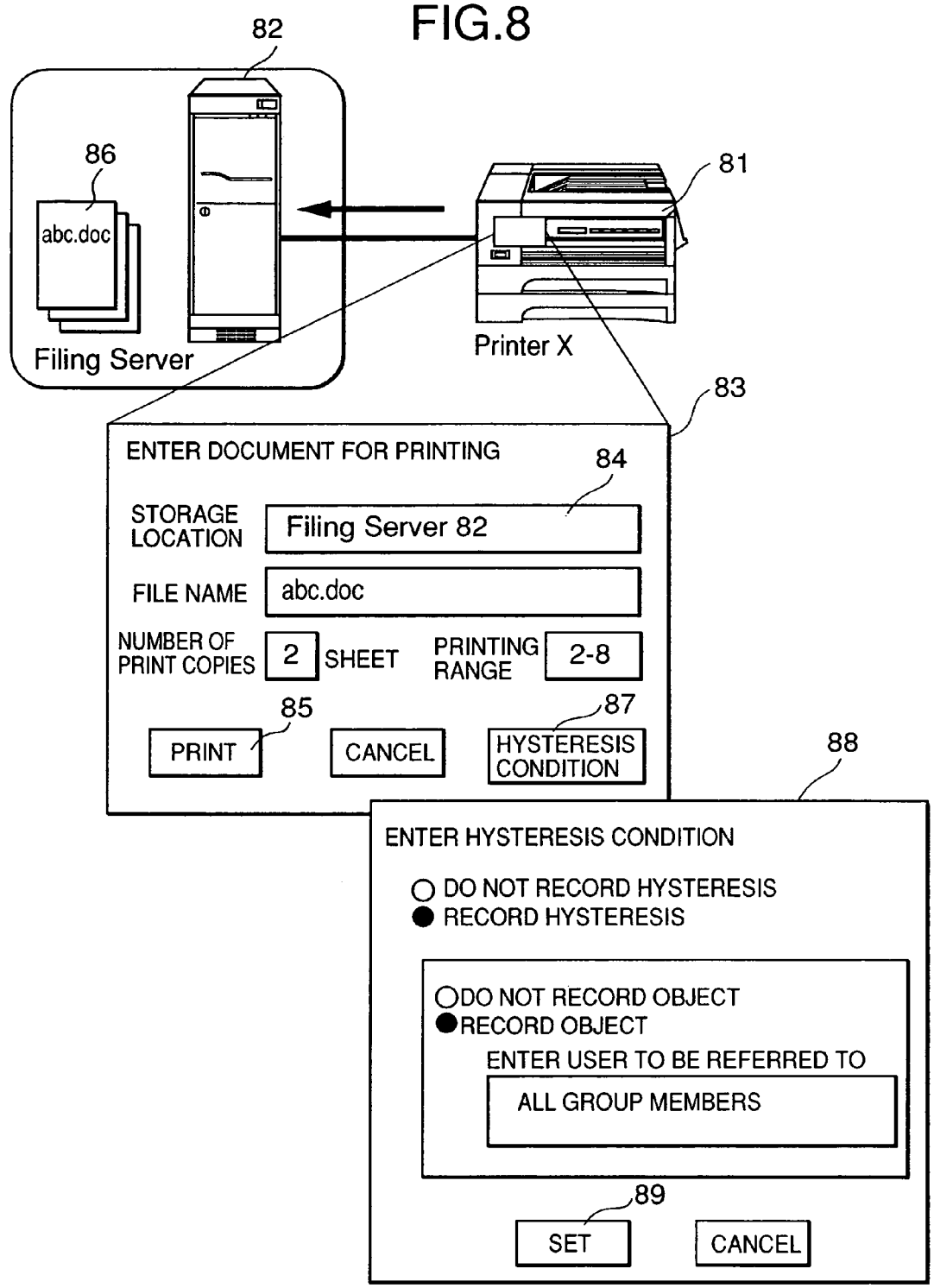
FIG. 8 is a diagram showing an example operating screen.
Figure 9:
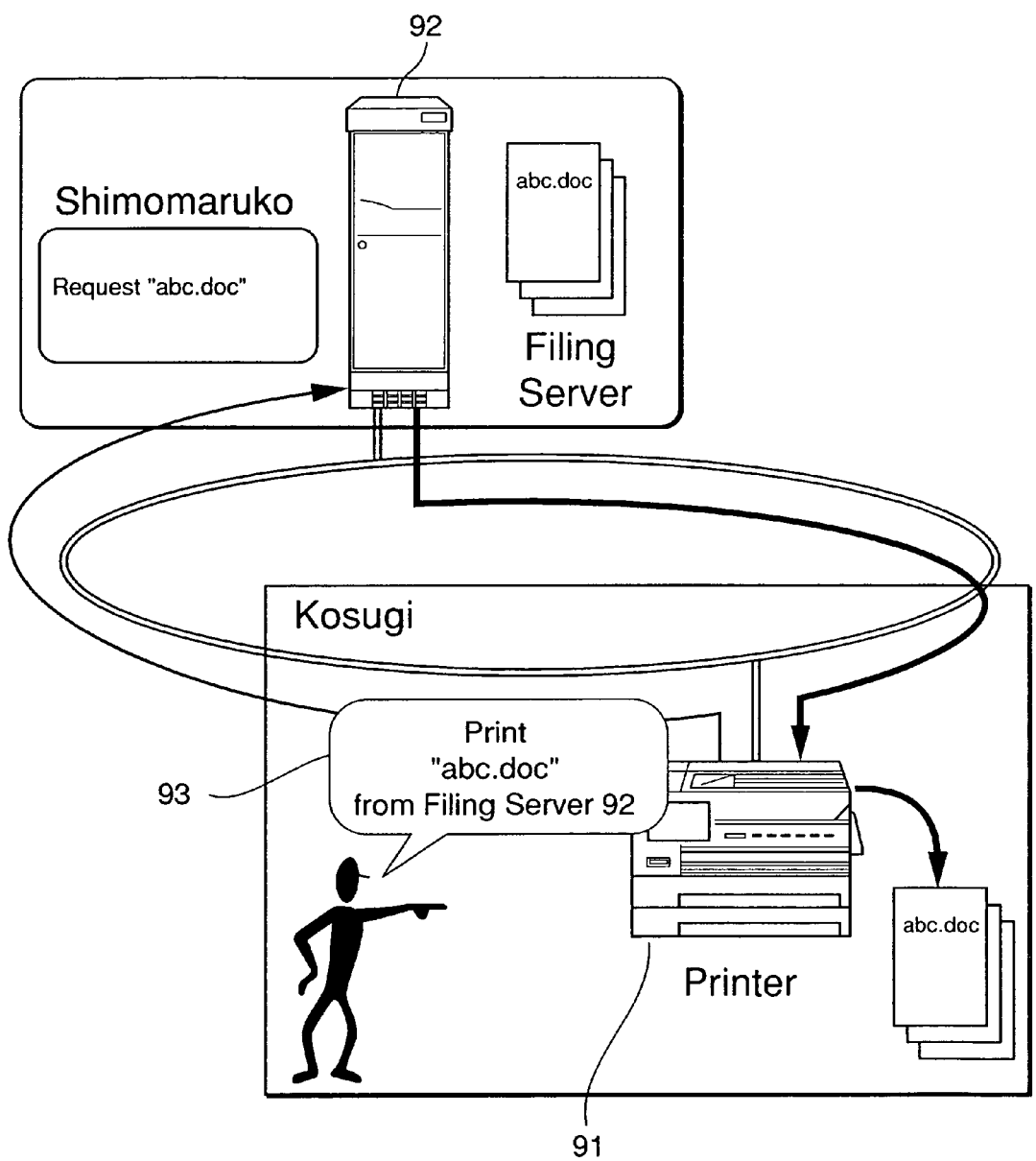
FIG. 9 is a diagram for explaining an example operation performed by a system in response to a vocal instruction.

The processing performed by the console unit 11 of the information processing apparatus 1 will now be described. FIG. 7 is a flowchart showing the processing performed by the console unit 11. FIG. 8 is a diagram illustrating an example screen displayed by the console unit 11. FIG. 9 is a diagram for explaining the operation of a system when a voice instruction is entered at the console unit 11.

In consonance with manipulation by a user, the console unit 11 of the information processing apparatus 1 separately performs an operation that can be completed only by the process in the console unit 11, and the operation of the process must be performed via the task reception unit 13.

For example, the process for changing a character string or a variable in the console unit 11, which corresponds to the entry/deletion of a character string in an input box 84 on a screen 83 in FIG. 8, is completed by the process performed inside the console unit 11. When actual printing can not be performed by the console unit 11 after a print button 85 has been selected, it is performed externally via the task reception unit 13.

The processing performed by the console unit 11 will now be described while referring to the flowchart in FIG. 7. When the console unit 11 is activated, at step S701, the information defined in the operation data 12 is referred to in order to determine the operating procedures, including what is to be displayed on the display screen.

At step S702 a check is performed to determine whether or not a user has actually performed an operation, such as the entry of a character string. If the user has not entered anything, the process at step S702 is repeated until such manipulation occurs.

At step S703, the manipulation by the user is analyzed. When, at step S704, it is ascertained that the process has been completed only by the console unit 11, program control moves to step S705. When the process outside the console unit 11 is reacquired, program control goes to step S713.

At step S705, a check is performed to determine whether manipulation by the user constitutes an instruction for the designation of a hysteresis condition, such as the depression of a hysteresis condition button 87 in FIG. 8. When an instruction is other than the designation of a hysteresis condition has been received, program control moves to step S706.

At step S706, if a process corresponds to the manipulation by the user, which is an action other than the designation of a hysteresis condition, the displayed character string is changed or the variable in the console unit 11 is updated. At step S707 the manipulation data are added to the hysteresis data in the console unit 11. When the hysteresis data in the console unit 11 are employed, the key manipulation performed by the user can be canceled (UNDO) or repeated (REDO). Program control then returns to step S702 to accept an entry by the user.

If, at step S705, the entry by the user concerns the designation of a hysteresis condition, program control goes to step S708, whereat the hysteresis condition designation unit performs the process.

When the hysteresis condition designation unit is activated, at step S708 a check is performed to determine whether manipulation by the user, such as the input of a character string, actually occurred. If no manipulation occurred, the process at step S708 is repeated until manipulation does occur.

As step S709, the manipulation by the user is analyzed. When, at step S710, it is ascertained that the process can be completed by only the hysteresis condition designation unit, program control moves to step S711. When the process outside the hysteresis condition designation unit is reacquired, program control goes to step S707.

At step S711, in response to the manipulation by the user, the displayed character string is changed, or the variable in the hysteresis condition designation unit is updated. At step S712, the manipulation data is added to the hysteresis data in the hysteresis condition designation unit. Since the hysteresis data in the hysteresis condition designation unit is used, the key manipulation by the user can be re-performed (UNDO) or repeated (REDO). Program control then returns to step S708 to accept the key manipulation by the user.

When, at step S704, the process outside the console unit 11 is required, program control moves to step S713, and whether or not the saving of the hysteresis data has been designated is determined by the previously described hysteresis condition designation unit, or by the standard setup performed by the user.

As a result, when the saving of the hysteresis data is designated, program control goes to step S714. The contents of the key manipulation are added to the hysteresis data 19, via the hysteresis data management unit 18, and the hysteresis number that is acquired is returned. The processing is thereafter terminated. Since the contents of the key manipulation added to the hysteresis data 19 are employed as a cue for the processing that is to be performed, when they are added and they are defined as being the lead data in the hysteresis data sequence.

When the hysteresis data are actually added, the hysteresis number is returned from the hysteresis data management unit 18, and is then transmitted to the console unit 11. When there is no need to save the hysteresis data, an invalid value is returned as the hysteresis number. The processing is thereafter terminated.

The specific processing performed by the console unit 11 will be described in detail while referring to FIG. 8.

When the console unit 11 is activated, at step S701 the information defined for the operation data 12 is referred to in order to determine the operating procedures, and the screen 83 in FIG. 8 is displayed.

In accordance with instructions on the screen 83, the user enters character string "Filing Server 82" in the input box 84 to designate the storage location of a document to be printed. At step S702 the entry of the character string is detected, and at step S703 the contents entered by the user are analyzed.

At step S704, it is ascertained that the process can be completed only by the console unit 11, and at step S705 it is ascertained that the hysteresis condition designation has not been instructed.

At step S706, in consonance with the character string that was entered, the display on the screen 83 is changed and the variable in the console unit 11 is updated. At step S707, the information that the character string is stored as hysteresis data in the console unit 11 is added. Since the hysteresis data for the console unit 11 is used, input errors can be corrected easily.

When the user selects the hysteresis condition button 87 to instruct the designation of the hysteresis condition, a hysteresis condition designation screen 88 is displayed. In accordance with an instruction on the screen 88, the user enters a checkmark in the item "saving hysteresis" (white circle is changed to black). Then, at step S708 the occurrence of a specific key manipulation is detected, and at step S709 the manipulation performed by the user is analyzed.

As a result, at step S710 it is ascertained that the process can be completed only by the hysteresis condition designation unit. At step S711 in consonance with the manipulation by the user, the display on the screen 88 is changed, and the setup is changed to save the hysteresis. At step S712 the information that the setup has been changed is added to the hysteresis data of the hysteresis condition designation unit. When the hysteresis is used, manipulation errors can be corrected easily.

When all the required conditions are designated by the above processing and the user selects a setup button 89 to instruct the validation of the designations. At step S710 it is ascertained that the process can not be completed by only the hysteresis condition designation unit, and program control moves to step S707 while the setup contents are validated.

In the console unit 11, when the necessary processes to be executed are designated, and when the user selects a print button 85 to instruct the performance of the process based on these designations, at step S704 it is ascertained that the process can not be completed by only the console unit 11, and program control goes to step S713, whereat it is ascertained that the saving of the hysteresis data is designated. As a result, program control moves to step S714, and via the hysteresis data management unit 18, the manipulation contents are added to the hysteresis data 19, at which time they are defined as the lead data in the hysteresis data sequence, and the acquired hysteresis number is returned to the console unit 11. The processing is thereafter terminated.

When the cancel button is selected, the operation performed is invalidated. To avoid a complicated explanation, no further explanation for this will be given.

The specific processing performed by the console unit 11 when an instruction is entered by voice will be described in detail while referring to FIG. 9. First, the user gives the oral instruction 93, "Print 'abc.doc' from Filing Server 92", to a printer 91, which is an example information processing apparatus 1, and at step S702 the voice input is detected and at step S703 the instruction by the user is analyzed.

If it is ascertained that the console unit 11 can not understand the voice instruction, at step S704 it is ascertained that the process can not be completed by only the console unit 11. Program control then moves to step S713 whereat a check is performed to determine whether the recording of hysteresis data is designated.

When, for example, the recording of hysteresis data is set as the standard, program control goes to step S714. Via the hysteresis data management unit 18, the manipulation contents are added to the hysteresis data 19, at which time they are defined as being the lead data in the hysteresis data sequence, and the acquired hysteresis number is returned to the console unit 11. The processing is thereafter terminated.

The processing performed by the task reception unit 13 of the information processing apparatus 1 will now be explained. The task reception unit 13 of the information processing apparatus 1 handles, as reception tasks, all the information concerning the information processing apparatus 1, such as the contents of the manipulation by the user at the console unit 11 and their hysteresis numbers, instructions and data received from the information processing apparatus 2, which is connected to the information processing apparatus 1 via the network; the external status information detected by the information processing apparatus 1; and the information concerning a document that is entered at the input section of the information processing apparatus 1.

The task reception unit 13 separates a received task that can be completed by only the task recaption unit 13, and a received task that must be added to the task table 14 and performed outside the task reception unit 13.

For example, the simple data exchange process according to the protocol, which corresponds to a reception task accompanied by basic communication, such as TCP/IP or HTTP, between the information processing apparatuses 1 and 2 connected via the network, can be completed by only the task reception unit 13. The contents entered as a result of the manipulation by the user at the console unit 11 and the hysteresis number, and the designation of the process from the information processing apparatus 2, which is connected to the information processing apparatus 1 via the network, can not be handled by the task reception unit 13. Thus, the task is added to the task table 14 so that it can be performed outside the task reception unit 13.

The specific processing performed by the task reception unit 13 will now be explained while referring to the flowchart in FIG. 10. When the task reception unit 13 is activated, at step S101 a check is performed to determine whether a task has been received. If a task has not been received, the process at step S101 is repeated until one is received.

At step S102 the received task is analyzed, and at step S103 a check is performed to determine whether the received task can be completed by only the task reception unit 13. If the task can be so completed, program control advances to step S104. If the task should be performed by an external device other than the task reception unit 13, program control goes to step S106.

At step S104 the process corresponding to the received task is performed, and a simple data exchange is also performed in accordance with the protocol. At step S105 the received task information is added to the hysteresis data in the task reception unit 13. When the hysteresis data in the task reception unit 13 is used, the process can be canceled (UNDO) or repeated (REDO) in order to avoid problems with the communication procedures due to noise. Then, program control returns to step S101 to accept a task.

When, at step S103, it is ascertained that a process outside the task reception unit 13 is required, program control moves to step S106. A check is then performed to determine whether the saving of the hysteresis data has been designated by the hysteresis condition designation unit in the console unit 11, by a standard setup by the user, or by the setup of the reception task unit 13.

When the saving of the hysteresis data is designated, program control advances to step S107, and a check is performed to determine whether the task was received from the console unit 11. If the task is from the console unit 11, since the hysteresis has already been added to the hysteresis data 19 by the console unit 11, addition of the hysteresis data is not performed. Program control thereafter moves to step S109.

When, at step S107, the task has been received from a source other than the console unit 11, program control moves to step S108. The contents of the task are added to the hysteresis data 19 via the hysteresis data management unit 18, and the hysteresis number is acquired. Since the contents of the task added to the hysteresis data 19 are used to initiate the processing to be performed later, the task is defined as being the lead data in hysteresis data sequence.

At step S109, the hysteresis numbers received from the console unit 11, or the hysteresis number returned from the hysteresis data management unit 18 when the hysteresis data are added at step S108, are set to the original hysteresis number of the task and are added to the task table 14. When, at step S106, there is no need to save the hysteresis, an invalid value is set as the original hysteresis number for the task, and is added to the task table 14.

The processing performed by the process execution unit 17 will now be described. In consonance with the contents of the processes to be performed, the process execution unit 17 of the information processing apparatus 1 separates the processes that can be completed by the process execution unit 17 and processes that must be performed outside the process execution unit 17, while at the same time adding a new task to the task table 14.

Figure 11:
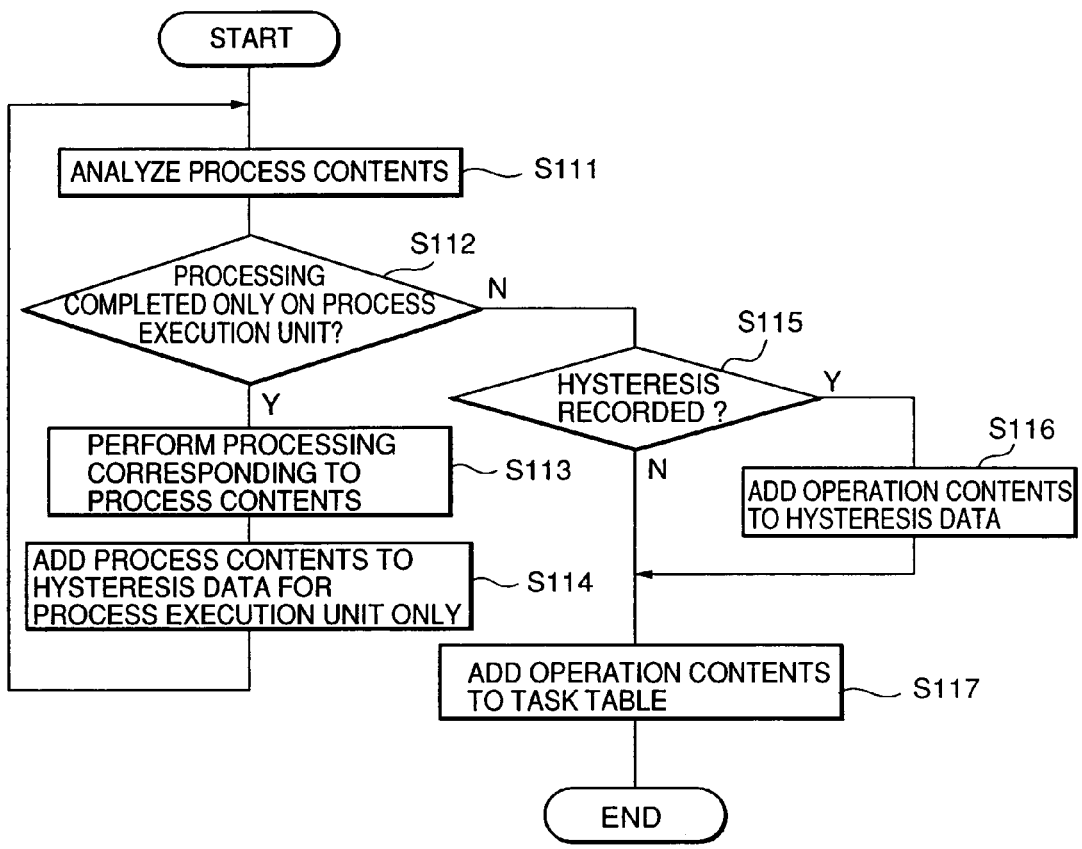
FIG. 11 is a flowchart showing the processing performed by a processing execution unit.

The specific processing performed by the process execution unit 17 will now be described while referring to the flowchart in FIG. 11.

When the process execution unit 17 is activated, at step S111 the contents of the process are analyzed, and at step S112 a check is performed to determine whether the process can be completed by only the process execution unit 17. If the process can be so completed, program control advances to step S115.

At step S113 the process according to the analyzed contents is performed, and at step S114 the contents of the process are added to the hysteresis data for the process execution unit 17. When the hysteresis data in the process execution unit 17 are used, the process can be canceled (UNDO) or repeated (REDO). Then, program control returns to step S111 to continue the remaining process.

When the process can not be completed by only the process execution unit 17, at step S115 a check is performed to determine whether the original hysteresis number, which is designated for a task that corresponds to the process, is the valid original hysteresis number that designates the saving of the hysteresis, and whether the hysteresis should be saved is determined. When the saving of the hysteresis is ascertained, program control moves to step S106, whereat, via the hysteresis data management unit 18, the contents of the process is added to the hysteresis data 19 and the hysteresis number is acquired.

At step S117, when the hysteresis data are added at step S116, the hysteresis number referred from the hysteresis data management unit 18 is set as the original hysteresis number for the task, and is added to the task table 14. When at step S115 the saving of the hysteresis is not required, an invalid value is set as the original hysteresis number for the task, and is added to the task table 14.

(Embodiment 1)

Figure 12:
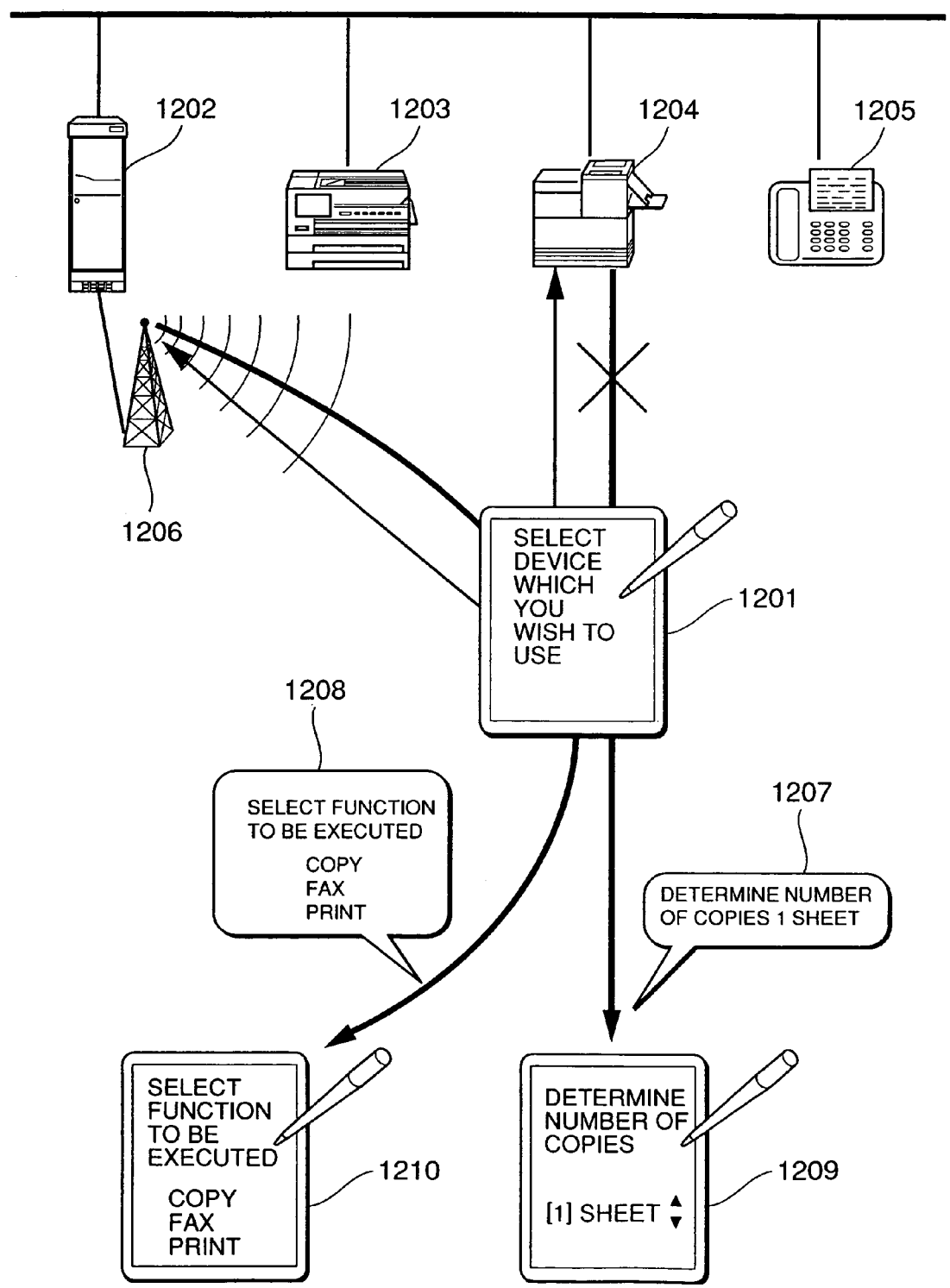
FIG. 12 is a diagram for explaining an example wherein selection of a user interface is performed in consonance with the communication condition of a destination.

FIG. 12 is a diagram illustrating example information processing for determining a UI (User Interface) in consonance with the situation for communicating with a destination.

The UI, which is implemented by a console unit 11 of a remote controller 1201, which is an example information processing apparatus 1, is provided by referring to operation data 12 that the remote controller 1201 possesses, or by referring to operation data 12 that are acquired by a printer 1203, a copier 1204 or a facsimile machine 1205, which is an example information processing apparatus 2 connected via a network, or by a communication facility 1206, which is under the control of a server 1202.

In FIG. 12 is shown an example where a user performs an operation to activate the communication situation process of a processing unit 17, and as a result, corresponding operation data 12 is received and an operating screen is changed. As is shown in FIG. 12, when the operation is initiated, the operation data 12 that the remote controller 1201 possesses are referred to, and a message, "Select device that you wish to use", is displayed on the operating screen of the remote controller 1201.

When a user directs the remote controller 1201 to the copier 1204 in accordance with the instruction, an operation data transmission request is transmitted by the remote controller 1201 to the copier 1204. As a result, operation data 1207 is transmitted by the copier 1204, and is referred to for the display of a copier operating screen 1209.

However, when communication by, for example, infrared rays is not disabled because a barrier exists between the remote controller 1201 and the copier 1204, the remote controller 1201 employs a portable telephone line to communicate with the server 1202 via the communication facility 1206. Then, the remote controller 1201 receives operation data 1208 from the server 1202, and selects a device on the network to display an operating screen 1210.

As is described above, according to this embodiment, the optimal operation procedures can be provided in accordance with the communication situation.

When a user directs the remote controller 1201 to the copier 1204 in accordance with a message, "Select device that you wish to use", which is displayed at the initiation of the operation, the console unit 11 accepts the instruction, and the task reception unit 13 adds it to the task table 14 as a communication situation processing task. Following this, via the task analyzer 15 and the planning determination unit 16, the processor 17 begins the communication situation processing shown in FIG. 13.

Figure 13:
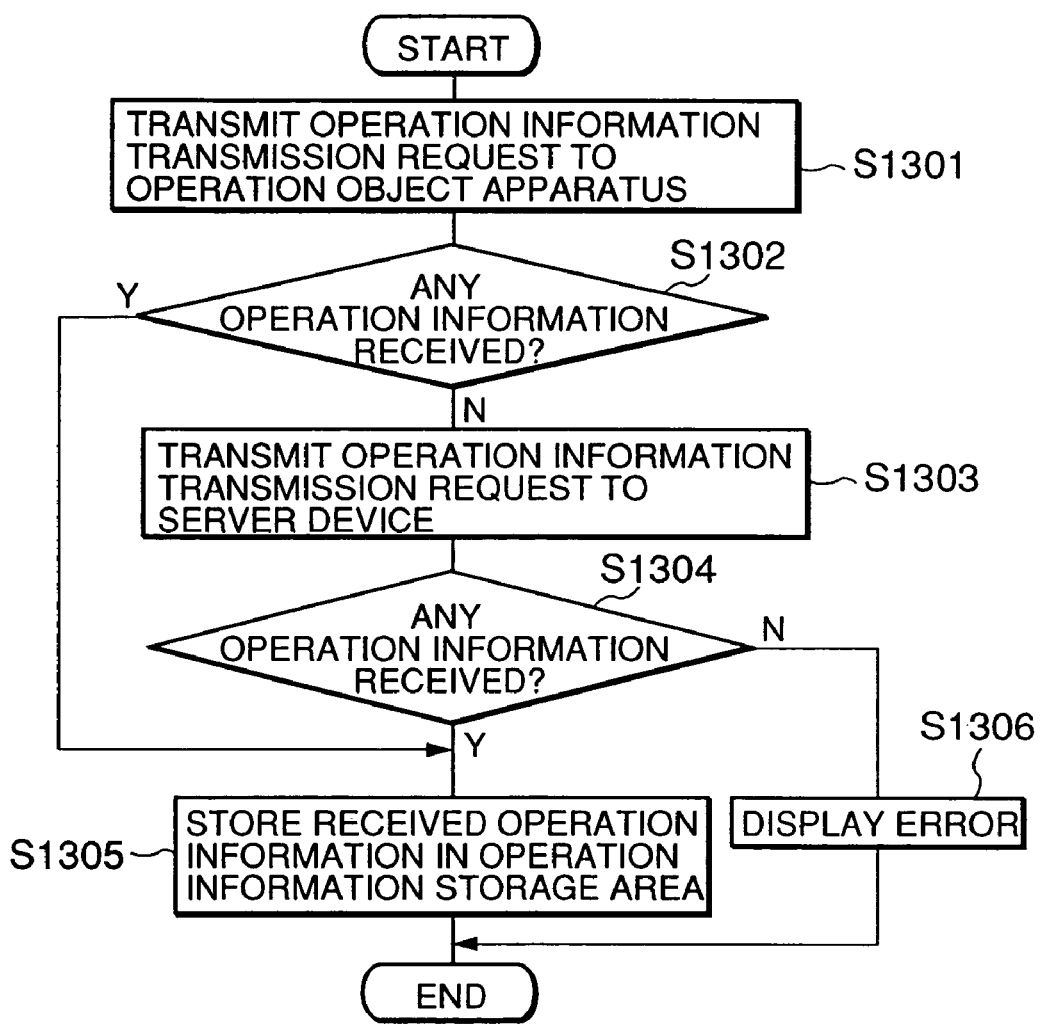
FIG. 13 is a flowchart showing an example of the communication condition processing that is performed.

FIG. 13 is a flowchart showing the communication situation processing.

When the communication situation processing is initiated, first, at step S1301, an operation data transmission request is transmitted to a device to be operated. At step S1302, a check is performed to determine whether operation data can be received in response to the request. When the operation data can be received, program control moves to step S1305. When reception of the operation data fails, program control moves to step S1303. At step S1303, instead of a device to be operated, the operation data transmission request is transmitted to a server device. Then at step S1304, when the operation data can be received successfully, program control moves to step S1305. When reception of the operation data fails, at step S1306 an error message is displayed, and the processing is thereafter terminated.

At step S1305, the received operation data are employed to update the operation data 12 possessed by the remote controller 1201, and to save the updated data. The processing is thereafter terminated. As a result, an operating screen consonant with the communication situation, such as the operating screen 1209 or 1210 in FIG. 12, can be displayed.

FIGS. 14A to 14C are diagrams showing example operation data 12 that are to be received and updated during the communication situation processing or nonregular command processing, which will be described later. As is shown in FIGS. 14A to 14C, the operation data 12 include a type of process to be executed by the console unit 11 and the contents of the data that are to be referred to in the individual processes.

The communication situation processing will be further explained. When the remote controller 1201 was successful in establishing normal communications with the copier 1204, the following processing is performed.

When the communication situation processing is begun, first, at step S1301, a request for the transmission of operation data is issued to the copier 1204. Since at step S1302 the operation data 807 shown in FIG. 14A can be received, program control moves to step S1305. The operation data 1207 include, as types of processes to be executed by the console unit 11, the initial display and a copy count designation operation process, and data 141 and 142 required for the operation of the copier 1204, such as the message "Select number of copies", which is to be referred to in the individual processes.

At step S1305, the received operation data 1207 are employed to update the operation data 12 held by the remote controller 1201 and to save the updated data. The processing is thereafter terminated. As a result, as is shown in FIG. 12, the corresponding operating screen 1209 can be displayed on the copier 1204.

When the remote controller 1204 fails to establish normal communications with the copier 1204, the following processing is performed.

When the communication situation processing is begun, first at step S1301 a request for the transmission of operation data is issued to the copier 1204. Since at step S1302 the operation data can not be received, program control goes to step S1303.

At step S1303, a request for the transmission of operation data is issued to the communication facility 1206, which is controlled by the server 1202. As a result, since at step S1304 operation data 1208 shown in FIG. 4B can be received, program control moves to step S1305. As is shown in FIG. 4B, the operation data 1208 include, as types of processes to be executed by the console unit 11, the initial display, the selection of a function designation operation process, and data 143 and 144, required for the operation of the server 1202, such as the operation "Select function to be executed", which is referred to in the individual processes.

At step S1305, received operation data 808 are employed to update the operation data possessed by the remote controller 1201, and to save the updated data. Processing is thereafter terminated. As a result, the data shown in FIG. 14C are received, and an operating screen 1210 corresponding to the function of the server 1202 can be displayed, as is shown in FIG. 12.

(Embodiment 2)

An explanation will now be given for a second embodiment where optimal operation procedures can be provided even when a user instructs the execution of a process other than the regular processing that can originally be performed by an information processing apparatus that is to be operated by the user.

Figure 15:
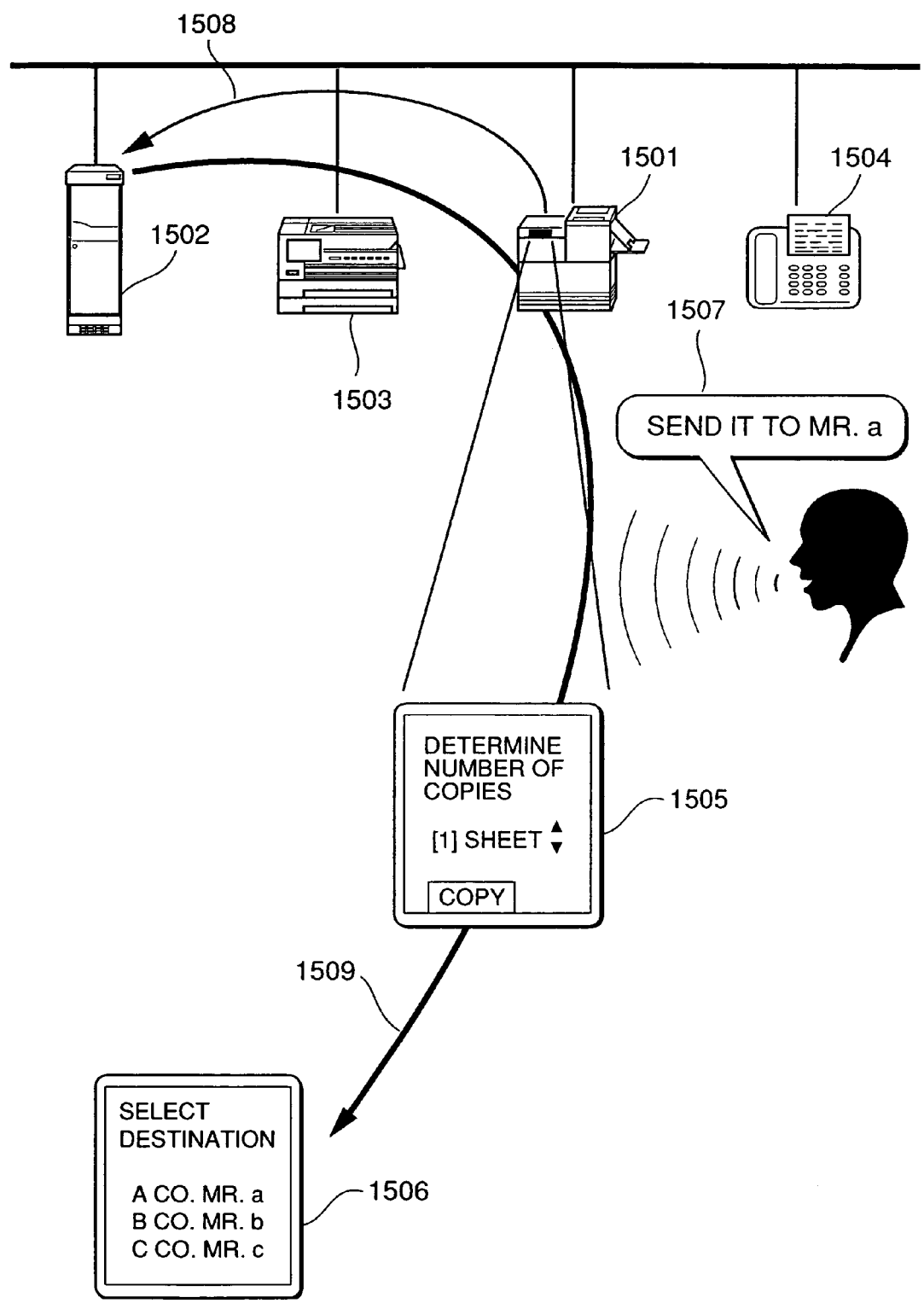
FIG. 15 is a diagram for explaining example procedures other than those constituting the original processing.

FIG. 15 is a diagram showing an example where a user performs an operation for initiating non-regular command processing at the processor 17, and as a result, the user receives corresponding operation data 12 and changes an operating screen.

When the operation is begun, a copier 1501 refers to its operation data 12 and displays, on an operating screen 1505, a message "Determine number of copies" requesting the operation of the copier 1501. Normally, a user designates a document to be copied and determines the number of copies in accordance with that instruction.

However, when a user orally inputs an instruction 1507, "Send it to Mr. a", which does not involve the use of the operating screen 1505, in order to understand the instruction given by the user, via the task reception unit 13 the copier 1505, which is an example information processing apparatus 1, generates a task to analyze the instruction.

Then, when the contents of the instruction are understood by the task analyzer 15, the planning determination unit 16 and the process execution unit 17, a newly generated non-regular command processing task is performed by the process execution unit 17 using procedures which will be described later in FIG. 16.

In the non-regular command processing, the copier 1501, which is an example information processing apparatus 1, determines whether the instructed process should be performed by the copier 1501. When the process is not one to be performed by the copier 1501, a request for transmission of operation data 12 is issued to a server 1502, which is an example information processing apparatus 2, the received operation data 12 are employed to update the operation data 12 held by the copier 1501, and an operating screen 1506 shown in FIG. 15 is displayed.

As is described above, according to this embodiment, the optimal operating procedures can be provided even when a user instructs the performance of a process other than a regular process.

The non-regular command processing will be explained in detail.

In FIG. 15, at the beginning of the operation, the copier 1501 refers to the operation data 12 held by the copier 1501 and displays a message, "Determine number of copies", as is shown on the operating screen 1505. When a user issues an instruction for an operation to the copier 1501, the entry is accepted by the console unit 11, and the task reception unit 13 adds the instruction to the task table 14 as a non-regular command processing task. Then, the non-regular command processing is begun by the processing execution unit 17 via the task analyzer 15 and the planning determination unit 16.

Figure 16:
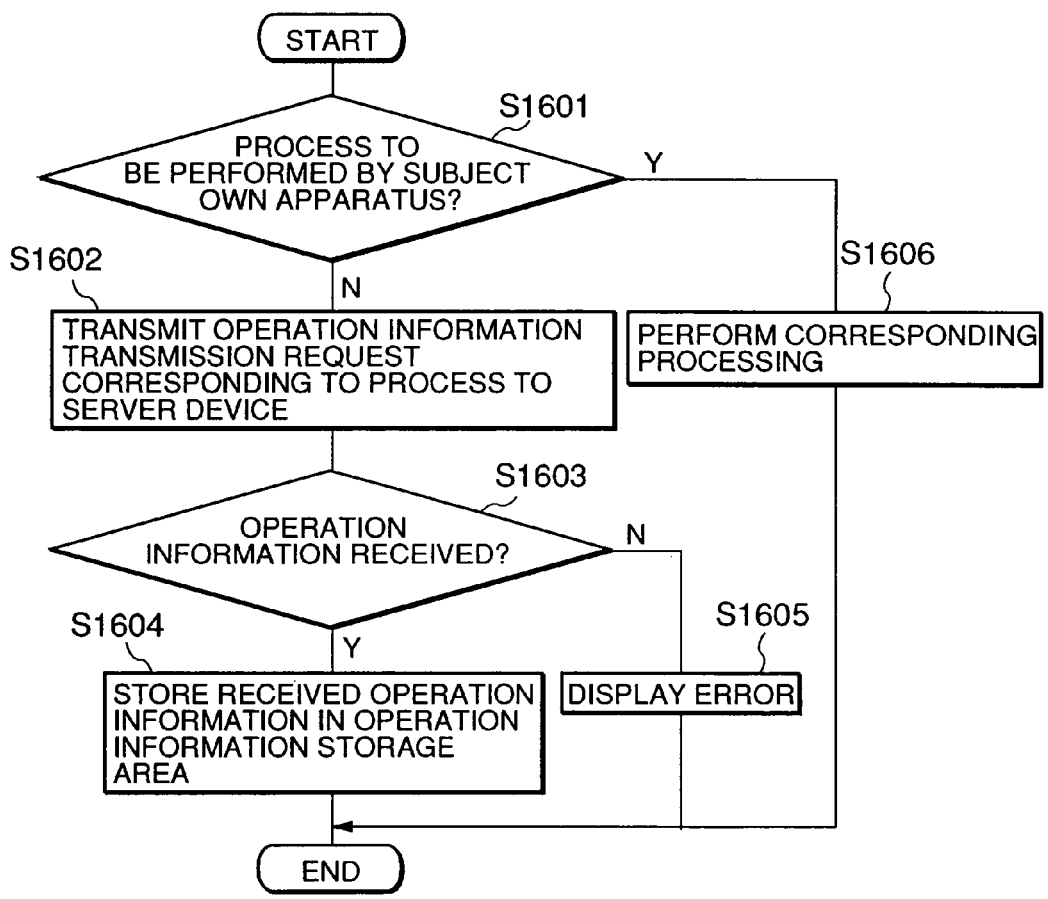
FIG. 16 is a flowchart for an example of the processing performed when handling an irregular command.

FIG. 16 is a flowchart showing the non-regular command processing. When the non-regular command processing is begun, first, at step S1601 a check is performed to determine whether a process instructed by a user should be performed by a subject apparatus. If the instructed process should not be performed by the subject apparatus, program control advances to step S1602. If the process should be performed by the subject apparatus, program control goes to step S1606, a corresponding process is performed, and the non-regular command processing is thereafter terminated. When, for example, execution of a process, other than a copying operation, such as a transmission, is issued by means of an oral instruction 1507, program control moves to step S1602.

At step S1602, an operation data transmission request 1508 is transmitted to the server 1502 in order to obtain operation data corresponding to the above process. When, at step S1603, the reception of operation data 1509 has been successful, program control goes to step S1604. When the reception of operation data 1509 has failed, at step S1605 an error message is displayed, and the processing is thereafter terminated.

At step S1604, the received operation data 1509 are employed to update operation data 12 held by the copier 1501, and the processing is thereafter terminated. As a result, an operating screen, such as the operating screen 1506 in FIG. 15, is displayed that corresponds to the instruction given for the non-regular process.

The above processing will be explained in detail. When a user instructs a copying operation that can originally be performed by the copier 1501, the non-regular command processing is begun, and at step S1601 it is ascertained that the copying operation instructed by the user should be performed by the copier 1501. Program control moves to step S1606, whereat the copying is performed, and the processing is thereafter terminated.

When the user instructs a transmission operation that can not be handled by the copier 1501, the non-regular command processing is begun and at step S1601 it is ascertained that the operation instructed by the user should not be handled by the copier 1501. Program control then advances to step S1602 whereat an operation data transmission request is issued to the server 1502 in order to obtain operation data that correspond to the transmission process. At step S1603, the operation data 1509 are received and at step S1604 the received operation data 1509 are employed to update the operation data 12 held by the copier 1501. The processing is thereafter terminated.

As a result, as shown in FIG. 15, the operating screen 1506 that corresponds to the transmission instruction can be displayed. Not only the copier 1501, but also a printer 1503 and a facsimile machine 1504 can process a non-regular processing instruction in the same manner.

(Embodiment 3)

Figure 17:
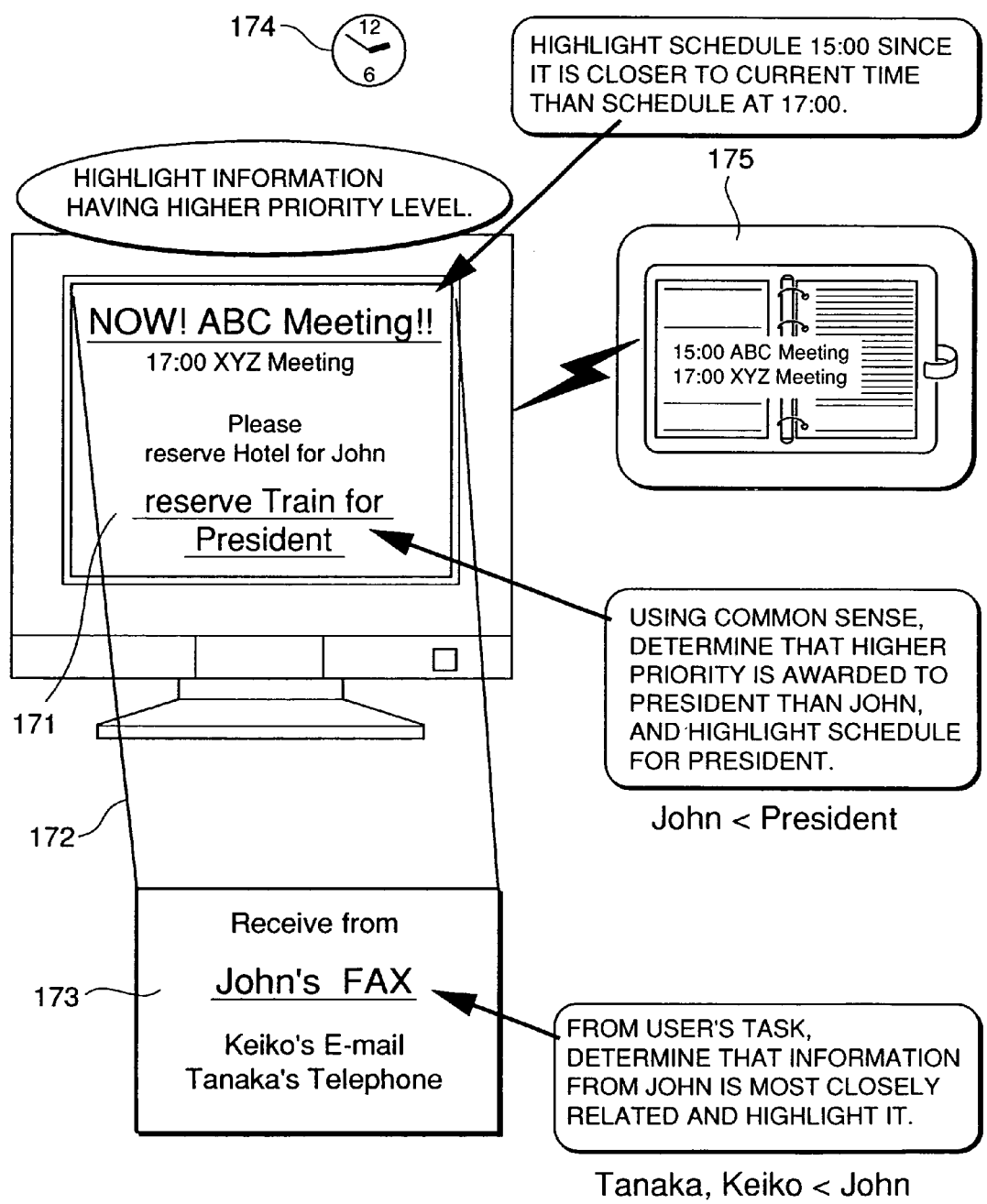
FIG. 17 is a diagram showing an example for the selection of an output form in accordance with a priority level.

FIG. 17 is a diagram showing an example for determining/updating an output form in consonance with the priority levels of the output contents. An information processing apparatus in FIG. 17 highlights the information that has a higher priority level. In FIG. 17 are shown displays for schedules, tasks and received data, and reasons why these displays are provided.

A UI provided by the console unit 11 employs the results obtained when the operation data 12 originally held by the information processing apparatus are updated to display forms that are determined in consonance with the priority levels of the individual data that are to be processed.

For example, in schedule display data 171, the ABC Meeting at 15:00 in a schedule 175 is compared with the XYZ Meeting at 17:00 while taking a current time 174 into account, and the ABC Meeting, which is closer to the current time 174, is highlighted on a display. In task display data 172, among a plurality of tasks that a user must perform, which persons are associated with the tasks are examined, and it is ascertained from the common sense that a task for a president should be performed prior to a task for John, who is a colleague, and thus the task for the president, "Reserve train for President", is highlighted.

On a received data display 173, among data transmitted to the user, it is ascertained from the knowledge of a user's tasks that a facsimile sent from John is most closely related to the user's task, and thus "John's FAX" is highlighted.

As is described above, according to the present invention, optimal operating procedures can be performed in consonance with the priority levels for the individual data that are to be processed.

The processing corresponding to the priority levels and the item count will now be described. In this processing, the display contents are determined in consonance not only with the above described priority levels, but also with the number of items, which will be described later.

Figure 18:
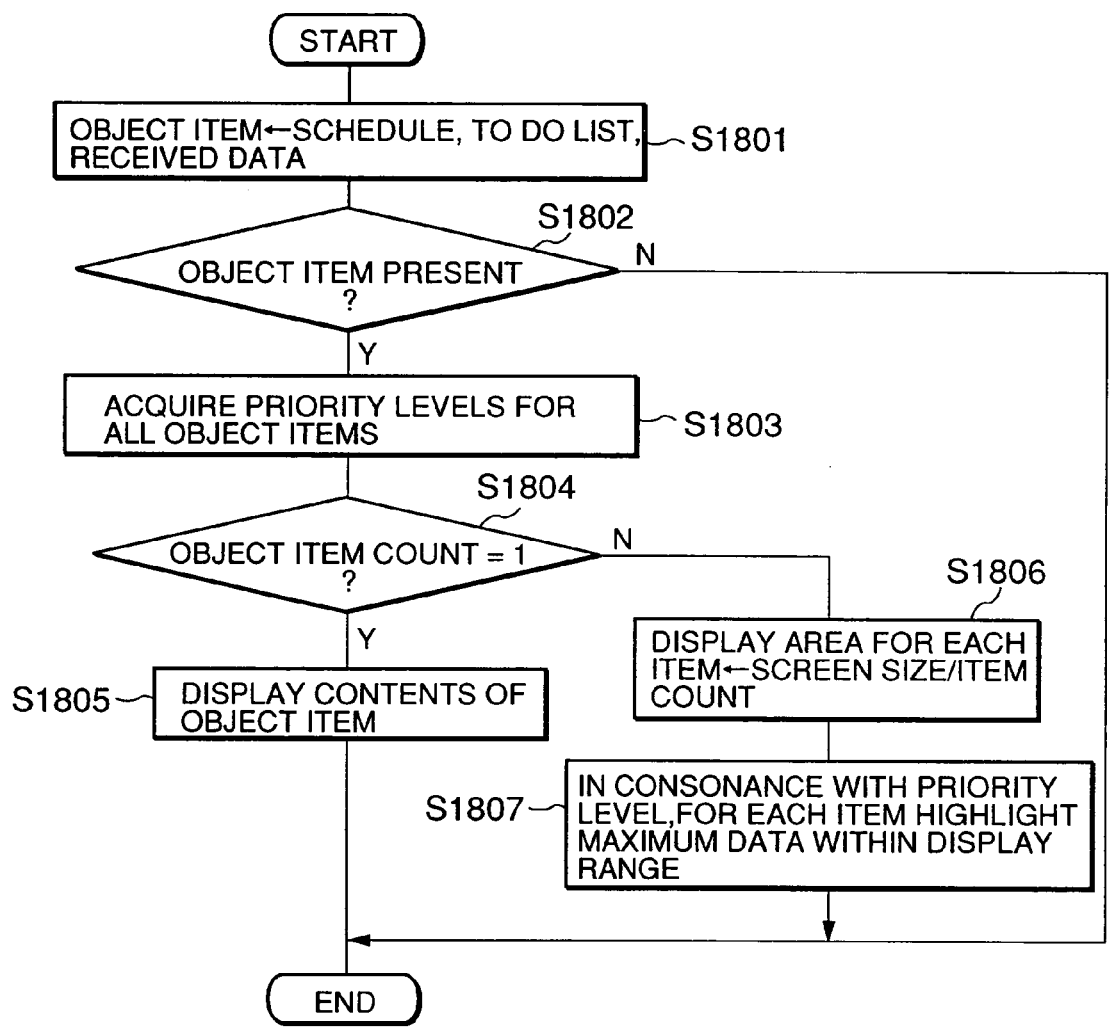
FIG. 18 is a flowchart showing the processing for handling a priority level and an item count.

FIG. 18 is a flowchart showing the processing corresponding to the priority levels and the item count. This processing is performed in common for Embodiments 3 to 10. FIGS. 19A and 19B are diagrams showing example items to be processed in accordance with the processing corresponding to the priority level and the item count. For each item is included an object type, contents and a priority level. FIG. 20 is a diagram showing example definitions for highlighted display methods that are consonant with items to be handled in the processing corresponding to the priority level and the item count. In the definitions for highlighting methods shown in FIG. 20, which display method is to be employed is defined in correspondence with the priority levels of an object schedule, an object task and the received data that is to be processed.

Although not clearly described in FIG. 17, the processing corresponding to the priority level and the item count is begun in accordance with either an instruction issued by a user or the results that are planned by the information processing apparatus 1. First, at step S1801, received or arriving data, such as a user's schedule, a task To Do List, etc., or E-mail, a facsimile or a telephone call, are stored in object items as shown in FIG. 19A.

At step S1802, a check is performed to determine whether data are present in the object items. When there are data in the object items, program control goes to step S1803. When no data are present in the object items, the processing is thereafter terminated. At step S1803, the priority levels are acquired for all the data stored in the object items by means of a priority level acquisition process, which will be described later. The obtained values are represented in FIG. 19B.

At step S1804, a check is performed to determine whether the number of object items is one. If there is only one object item, program control advances to step S1805, whereat the contents in the item are displayed and the processing is thereafter terminated.

When there are two or more object items, program control moves to step S1806, whereat the size of a display screen or the size of a display area that is legible to a user is compared with the number of object items to be displayed, and the optimal size of a display area for each item is determined.

Following this, at step S1807, the maximum data for each item that can be retained in the display area that is thus determined are displayed in consonance with the priority level of each object item, while at the same time the definitions in FIG. 20 are referred to. When the number of items is small relative to the display size, the contents of the data for the individual object items are displayed.

(Embodiment 4)

Figure 21:
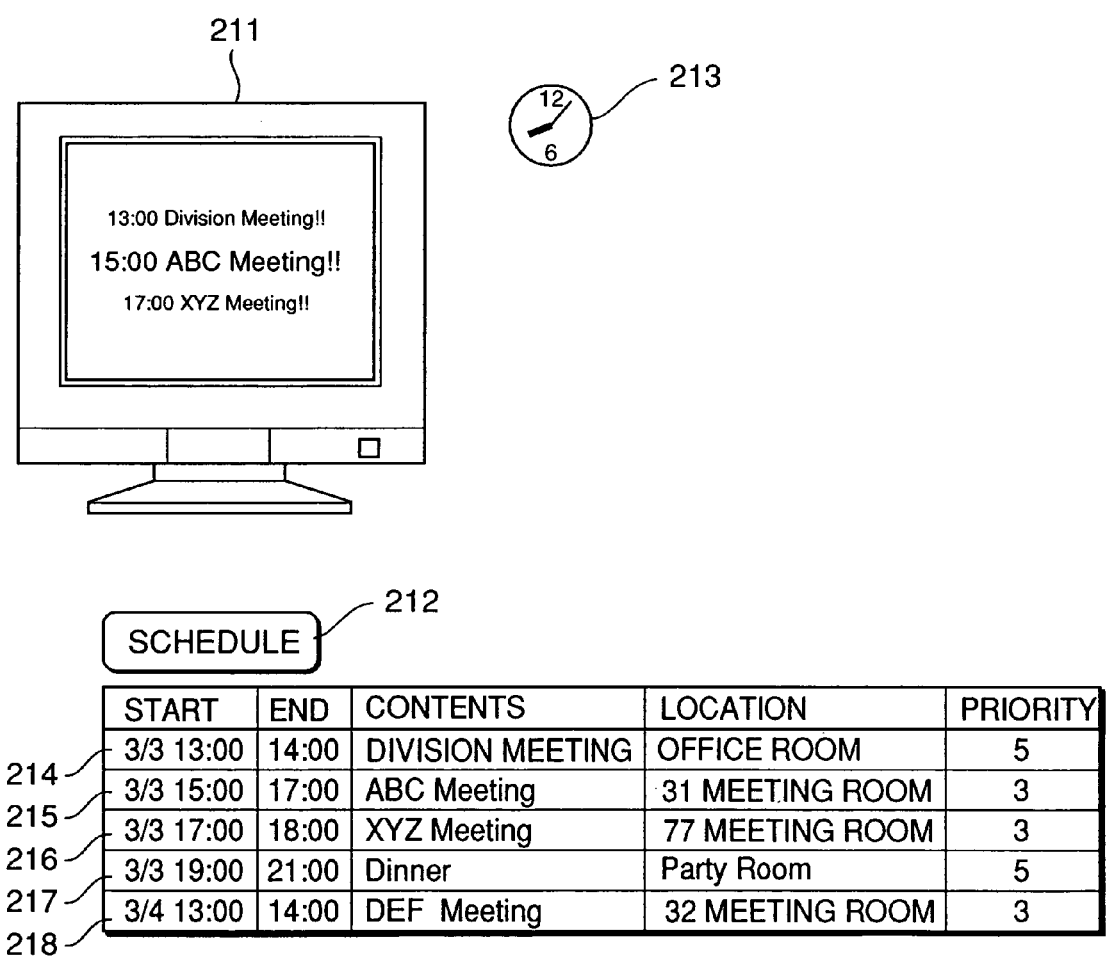
FIG. 21 is a diagram showing an example for the selection of an output form in consonance with the priority level for the contents.

FIG. 21 is a diagram showing an example of the determination and the updating performed for an output form in consonance with the priority level of the contents of the output. In FIG. 21, an information processing apparatus can refer to a user's schedule 212.

Plans stored in the schedule 212 include start and end times, the contents, the locations, priority levels, and information concerning attendance and individual plans and sponsors. The priority level can be designated by a user, a smaller value indicating a higher priority.

In FIG. 21, although a schedule 214 is closest to a current time 213, its priority level as set by the user is 5, which is lower than that of the other schedules, so that the schedule 214 is not highlighted on a display screen 211.

Although the same priority level 3 is set for schedules 215 and 216, as the schedule 215 at 15:00 is the most urgent, it is highlighted on the display screen 211. As a schedule 217 not only has a low priority level, 5, but also has a lower urgency level than the other schedules, it is not even exhibited on the display screen 211.

Although a schedule 218 has a priority level 3, which is not low compared with the other schedules, since the schedule 218 is for the following day and its urgency level is extremely lower compared to the others, it also is not even displayed.

As is described above, according to this embodiment, the optimal display form, such as highlighting, can be provided in accordance with the priority levels for schedule data that are to be displayed.

This processing will be described more specifically. For schedule data, when the processing corresponding to the priority level and the item count is initiated, first, at step S1801, the user's schedules are stored in object items, as are shown in FIG. 19A. Since, at step S1802, data are found in the object items, at step S1803, as is shown in FIG. 19B, priority levels for all the data stored in the object items are acquired through the priority level acquisition process, which will be described later.

At step S1804, it is ascertained that there are two or more object items. Program control moves to step S1806, whereat the size of the display screen or the size of the display area that is legible to a user is compared with the number of object items to be displayed, and the optimal size of a display area for each item is determined. At step S1807, the maximum data for each item that can be held in the display area that is thus determined are displayed in consonance with the priority level of each object item, while at the same time the definition in FIG. 20 is referred to.

For example, the schedule in an object item 1902 in FIG. 19 represents the schedule 215 in FIG. 21, "ABC Meeting", and the priority level=12. By referring to the definition in FIG. 20, the display for the schedule 1902 is defined as being one for which a display color=red and a font size is 20 points.

The schedule in an object item 1903 represents the schedule 216 in FIG. 21, "XYZ Meeting", with priority level=13. By referring to the definition in FIG. 20, the display for the schedule 1903 is defined as being one for which a display color=black and the font size is 16 points.

The schedule in an object item 1904 represents the schedule 217 in FIG. 21, "Dinner", with priority level=15. By referring to the definition in FIG. 20, the schedule 1904 is so defined as being not displayable.

When the display methods are determined by the individual object items as are described above and are performed, the results are shown on the display screen 171 in FIG. 17.

Figure 22:
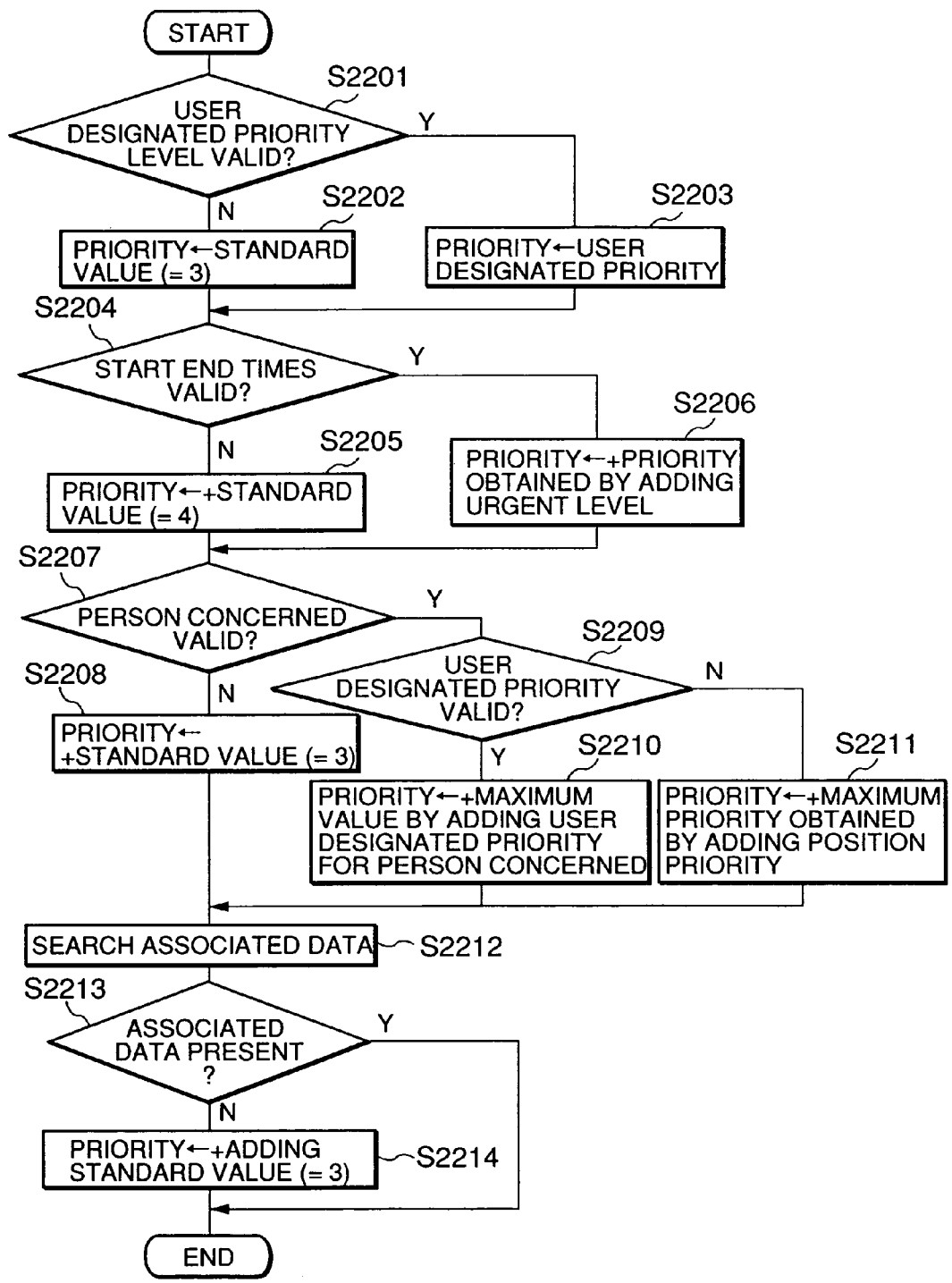
FIG. 22 is a flowchart showing the priority acquisition processing.

The priority level acquisition process will now be described. FIG. 22 is a flowchart showing the priority level acquisition processing. FIG. 23 is a diagram showing example definitions used to assign priority levels by using urgency levels. In this example, definitions are provided to obtain a priority level from information concerning time, such as a start time and an end time, which is included in an object item, and an urgency level that is acquired by comparing it with the current time.

FIG. 24 is a diagram showing example definitions used to acquire a priority level by employing an individual position and post, and relation to a user, all of which are referred to in the priority level acquisition process. In this example, definitions are provided to acquire a priority level from information concerning a person, such as an attendee, a sponsor and an instructor, that is included in an object item.

When the priority acquisition process is begun, first, at step S2201, a check is performed to determine whether the priority level selected by a user for an object item is valid. If the priority level is invalid, program control moves to step S2202 whereat a standard level (=3) is set as the priority level. When, at step S2201, the priority level selected by the user is valid, at step S2203 it is established.

Then, at step S2204 a check is performed to determine whether the start time and the end time for the object item are valid. If theses times are invalid, program control advances to step S2205 whereat a standard value (=4) is added to the priority level. If these times are valid, at step S2206 the urgency level and the priority level definition information in FIG. 23 are referred and the thus obtained priority level is added.

At step S2207, a check is performed to determine whether persons, such as an attendee, a sponsor and an instructor, associated with the object item are valid. If they are invalid, program control advances to step S2208, whereat the standard level (=3) is added to the priority level. When those persons are valid, program control moves to step S2209, whereat a check is performed to determine whether the priority level for each person selected by the user is valid.

At step S2210, for each person shown in FIG. 25, priority definition information 257, which will be described later, is referred to and the maximum priority level for each person who is selected by the user is added to the priority level.

At step S2211, referred to is priority definition information, such as definition information 267 in FIG. 24 and FIG. 26, which will be explained later, that is provided in accordance with the common sense interpretation of the relative importance of positions and posts. The maximum priority level based on the common sense interpretation of the relative importance of the positions and posts is added to the priority level.

As step S2212, information concerning persons, times and locations, and other information, which are included in an object item are employed to search for associated information. When, at step S2213, no associated information is found, program control advances to step S2214, whereat priority level (=3) is added to the priority level.

Thus obtained priority level is output, and the priority level acquisition processing is thereafter terminated.

A case where the schedule 215 in FIG. 21 is designated as an object to be processed will now be specifically described. When the priority level acquisition process is begun, it is ascertained at step S2201 that the priority level selected by the user is a valid value (=3), and a priority level of 3 is set. At step S2204, it is ascertained that the start time for the object, 15:00, is valid. Then, at step S2205, the urgency level is obtained by comparing 15:00 with the current time 213, 12:40. The urgency level and the priority level definitions in FIG. 23 are referred to, and the obtained value (=3) is added to the priority level, thereby obtaining the total (=6).

At step S2207, a check is performed to determine whether information concerning the schedule for a person has been designated. When such information is not designated, program control advances to step S2208, whereat the standard value (=3) is added to the priority level to obtain the total (=9). Then, if as the result of a search performed at step S2212, it is determined that no information concerning the schedule exists, program control moves to step S2214, whereat the standard value (=3) is added to the priority level to obtain the total (=12).

Through the above processing, the obtained priority level (=12) is output as in 1902 in FIG. 19B, and the processing is thereafter terminated.

(Embodiment 5)

Figure 25:
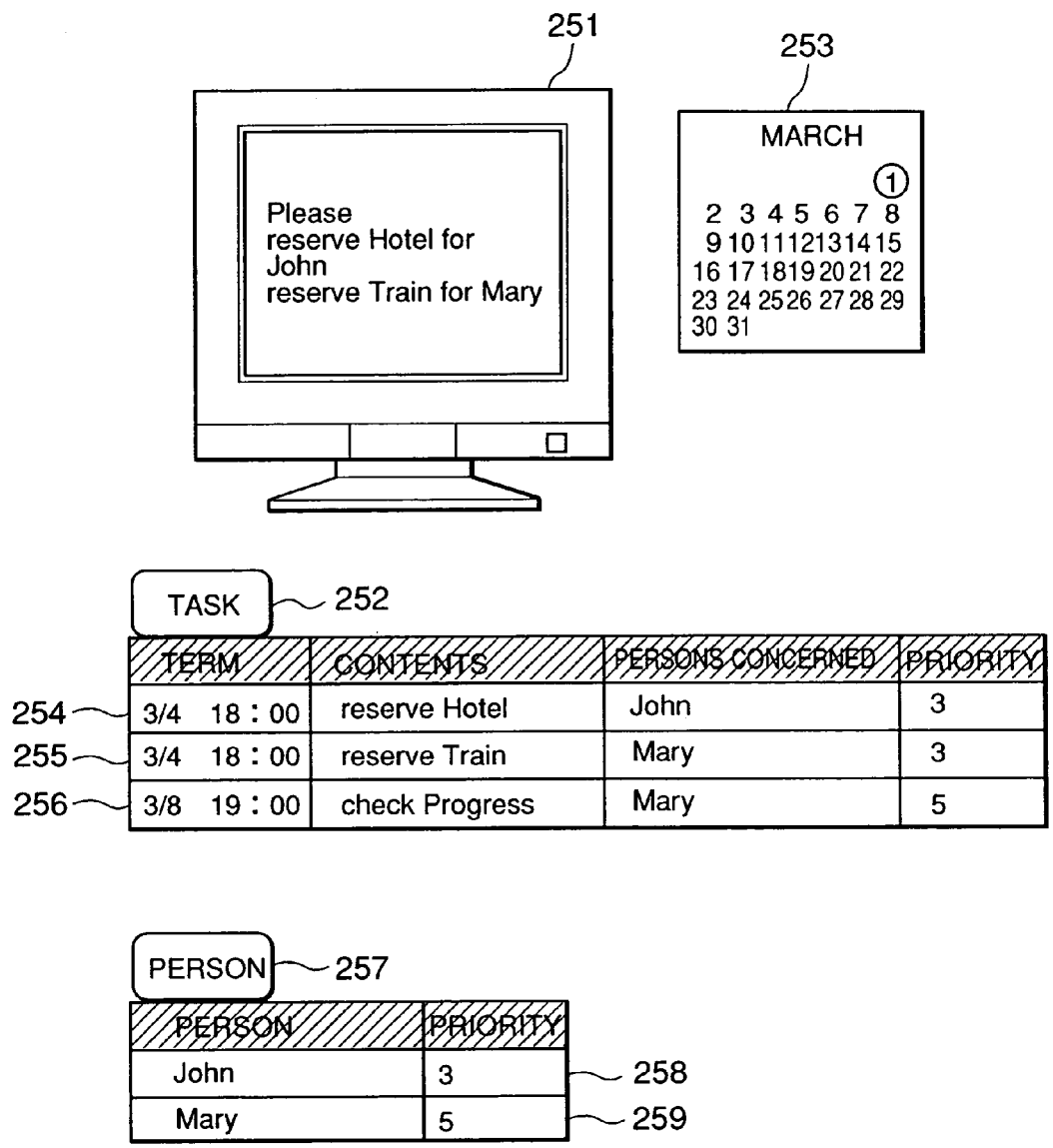
FIG. 25 is a diagram showing an example where an output form is determined in accordance with the priority level of a task and a subject individual.

FIG. 25 is a diagram for explaining an example where an output form is determined and updated in consonance with the priority levels for tasks and persons. In FIG. 25 are shown definition information for a priority level for each task and for each person, and a corresponding display result, which is obtained through the processing corresponding to the priority level and item count.

An information processing apparatus in FIG. 25 includes a task 252 that the other information processing apparatuses can refer to, such as a To Do List in which are extended tasks to be accomplished by a user, and information 257 for defining the priority levels for individual persons.

The individual tasks registered in the task 252, such as a user's To Do List, are a term deadline, contents, a person concerned and a priority level. Also, though not shown in FIG. 25, information for schedules concerning the individual tasks is included. The priority level can be selected by a user, and a smaller value is regarded as a higher priority level. The information 257 for defining the priority level for each person includes a priority level associated with the name of each person.

In FIG. 25, while tasks 254 and 255 have the same urgency level relative to a current date 253, and the same priority level 3 set by a user, the persons associated with the individual tasks 254 and 255 differ. Since the priority level information 257 designated for individual persons is referred to, John 258 has a higher priority than Mary 259, so that task 254 for John, "Reserve Hotel for John", is highlighted on a display screen 251.

Since a task 256 has a priority level of 5, which is lower than the other tasks, and also has a low urgency level, it is not even displayed on the display screen 251.

As is described above, the optimal display form, such as highlighting, can be provided in consonance with the priority level of the task information that is displayed.

A case where the task 254 in FIG. 25 is designated for processing will be specifically explained. When the priority level acquisition process is begun, at step S2201 it is ascertained that the priority level selected by a user is valid (=3), and a priority level of 3 is set. Then, at step S2204, it is ascertained that the end time for an object to be processed is March 4th, 18:00, which is valid. The urgency level is obtained by comparing the end time with a current date 213, March 1st. Then, the urgency information and the priority definition information in FIG. 23 are referred to, and the obtained value (=6) is added to the priority level to acquire the total (=9).

Following this, since John is designated as the person concerned, at steps S2207 and 2209 a check is performed to determine whether John and his priority level are valid. Since both are valid, program control moves to step S2210, whereat a value (=3) designated in the priority definition information for a user selected person is added to the priority level, and the total (=12) is acquired. Since, as a result of the search at step S2212, it is determined that no data concerning the task exist, program control advances to step S2214, whereat the standard value (=3) is added to the priority level to acquire the total (=15). Thus obtained priority level (=15) is output, and the (Embodiment 6) processing is thereafter terminated.

Figure 26:
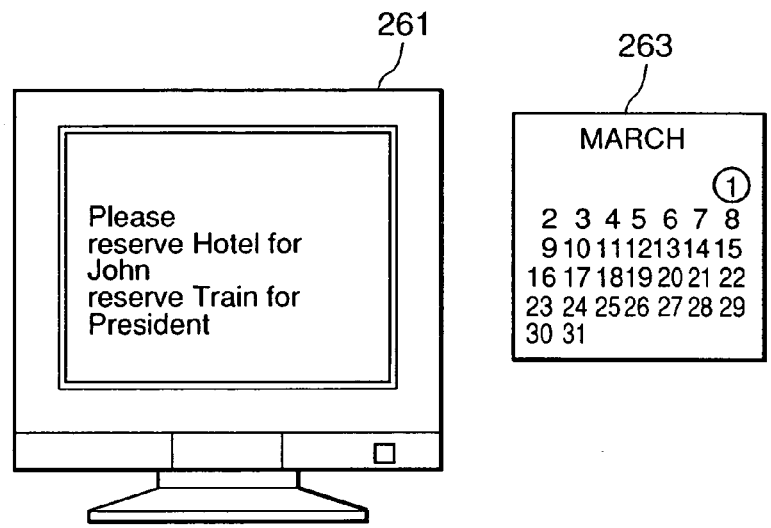
FIG. 26 is a diagram showing an example where an output form is determined in accordance with the priority level of a task and a person's post.

FIG. 26 is a diagram illustrating an example for determining and updating an output form in consonance with the priority levels for a task and the position of a person concerned. In FIG. 26 are shown information for defining tasks, the positions of persons and the priority levels for individual posts, and corresponding display results, which are obtained through the processing corresponding to the priority and the item count. An information processing apparatus in FIG. 26 includes a task 262, such as a user's To Do list, that the information processing apparatus can refer to, and information 267 for defining priority levels based on the common sense interpretation of the relative importance of the positions and posts of persons.

In FIG. 26, although the tasks 264 and 265 have the same urgency level relative to a current date 263, and the same priority level 3 has ben set by a user, the persons associated with the individual tasks 264 and 265 differ. Since the priority level information 267 designated for individual persons is referred to, a president 268 has a higher priority than a colleague 269, so that task 265 for the president, "Reserve Train for President", is highlighted on a display screen 261.

Since a task 266 has a priority level of 5, which is lower than that of the other tasks, and also a low urgency level, it is not even displayed on the display screen 261.

As is described above, the optimal display form, such as highlighting, can be provided in consonance with the priority level of the task information that is displayed.

The procedures for a task, such as a To Do List, will now be described. When the processing corresponding to the priority level and the item count is begun, first, at step S1801 user's tasks are stored in object items, as shown in FIG. 19A, and are processed in the same manner as for the schedules.

For example, the schedule in an object item 1906 in FIG. 19B represents the schedule 264 in FIG. 26, "Reserve Hotel", and the priority level=17. By referring to the definition in FIG. 20, the display of the schedule 1906 is defined as being one for which a display color=black and the font size is 14 points. The schedule in an object item 1907 represents the schedule 265 in FIG. 26, "Reserve Train", and the priority level=12. By referring to the definition in FIG. 20, the display of the schedule 1907 is defined as being one for which a display color=red and the font size is 20 points. The schedule in an object item 1908 represents the schedule 266 in FIG. 26, "Check Progress", and the priority level=20. By referring to the definition in FIG. 20, the schedule 1908 is defined as being not displayable.

When the display methods are determined by the individual object items that are described above and are performed, the results are shown on the display screen 172 in FIG. 17.

A case where the task 265 in FIG. 26 is designated for processing will be specifically explained. When the priority level acquisition process is begun, at step S2201, it is ascertained that the priority level selected by a user is valid (=3), and a priority level 3 is set. Then, at step S2204, it is ascertained that the end time for an object to be processed is March 4th, 18:00, which is valid. The urgency level is obtained by comparing the end time with a current date 253, March 1st. Then, the urgency information and the priority definition information in FIG. 23 are referred to, and the obtained value (=6) is added to the priority level to acquire the total (=9).

Following this, since President is designated as the person concerned, at steps S2207 and 2209 a check is performed to determine whether the President and his or her priority level are valid. Since both are valid, program control moves to step S2211, whereat the definition information in FIG. 24, based on the common sense interpretation of the relative importance of the position and the post, is referred to, and a value (=0) for the priority level for the President is added to the priority level to acquire the total (=9). Since, as a result of the search at step S2212, it is found that no data concerning the task exist, program control advances to step S2214 whereat the standard value (=3) is added to the priority level to acquire the total (=12).

Thus obtained priority level (=12) is output as 1907 in FIG. 19B, and the processing is thereafter terminated.

(Embodiment 7)

Figure 27:
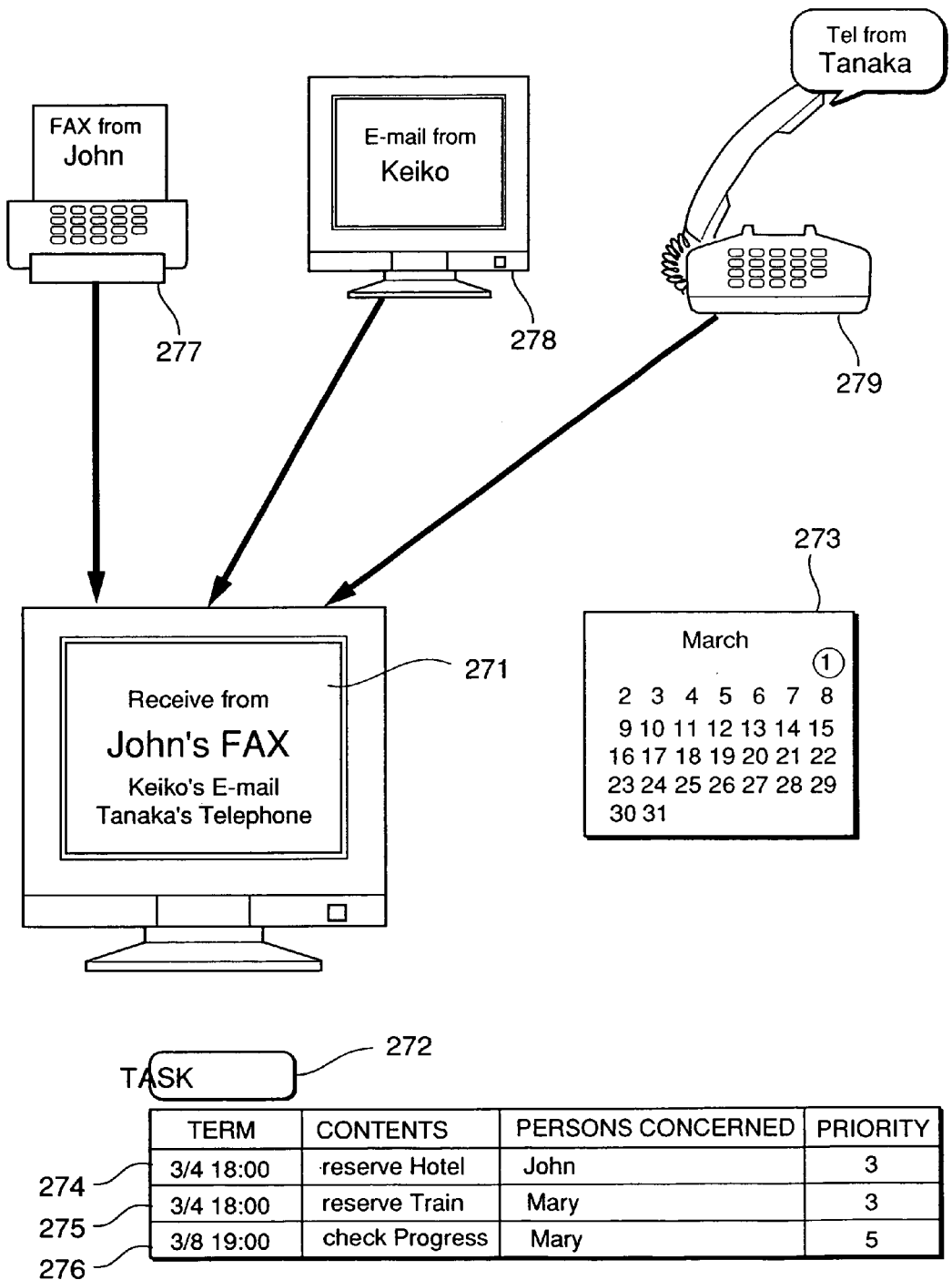
FIG. 27 is a diagram showing an example where an output form is determined in accordance with its relationship with a task.

FIG. 27 is a diagram illustrating an example information processing apparatus that determines and updates an output form in consonance with the level of a relationship associated with a task. In FIG. 27 are shown received or arriving information and tasks in the processing corresponding to the priority level and the item count, which is performed by an execution process unit 17, and the consonant display results. The received information includes information designating a transmission source.

The information processing apparatus in FIG. 27 includes a task 272, such as a user's To Do List, that the information processing apparatus can refer to. In this case, when the information processing apparatus receives a facsimile 277 from John, E-mail 278 from Keiko and a telephone call 279 from Tanaka, the relationship with a user of each item of received data is taken into account, and these data sets are shown on a display screen 271 with the data highlighted that is most closely related to the user.

In the example shown in FIG. 27, of John, Keiko and Tanaka, who are the data transmission sources, only John matches a person concerned included in a task 274, which is stored in a task list 272. Therefore, it is assumed that the data concerning the task 274, "Reserve Hotel for John", has been received, and it is ascertained that the hotel reservation may be changed, on the display screen 271 the facsimile 277 received from John is highlighted. The relationship level with a user can be obtained not only by referring to the tasks, but also by referring to the schedule and hysteresis information.

As is described above, the optimal display form, such as highlighting, can be provided in consonance with the relationship established between received information that is to be displayed and a task.

An explanation will now be given for a case where data in E-mail, a facsimile or a telephone call constitute an object to be processed.

When the processing corresponding to the priority level and the item count is begun, first, at step S1801 received or arriving data are stored in object items, as shown in FIG. 19A, and are processed in the same manner as are the schedules. For example, the schedule in an object item 1909 in FIG. 19 represents the facsimile 277 in FIG. 27, "FAX from John", and its priority level=12. By referring to the definition in FIG. 20, the display of the schedule 1909 is defined as being one for which a display color=red and a font size is 20 points.

The received information in an object item 1910 represents the E-mail 278 in FIG. 27, "E-mail from Keiko", and the priority level=15. By referring to the definition in FIG. 20, the display of the information 1910 is defined as being one for which a display color=black and a font size is 16 points. The received information in an object item 1922 represents the telephone 279 in FIG. 27, "Call from Tanaka", and the priority level=15. By referring to the definition in FIG. 20, the display of the schedule 1922 is defined as being one for which a display color=black and a font size is 16 points.

Figure 10:
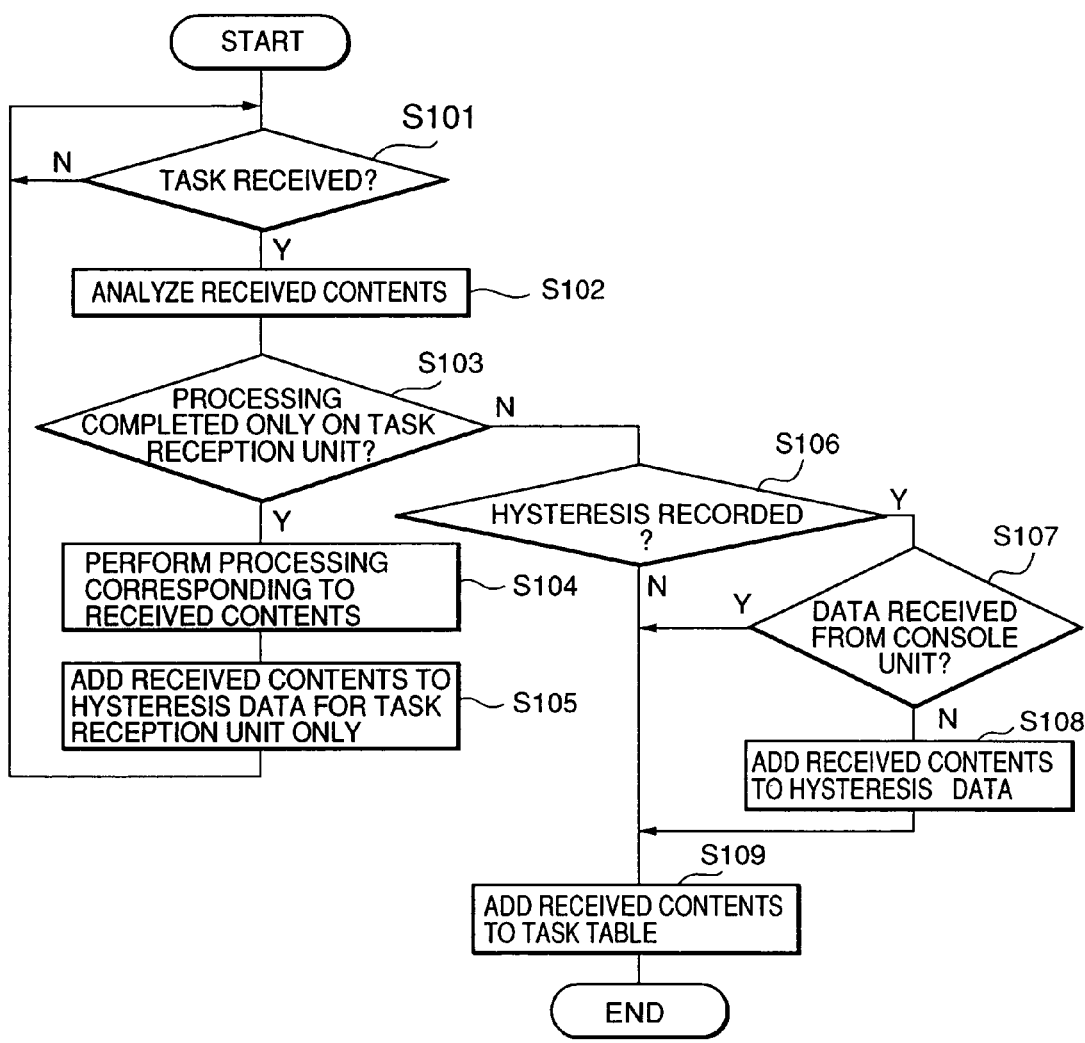
FIG. 10 is a flowchart showing the processing performed by a task reception unit.

When the display methods are determined by the individual object items described above and are performed, the results are shown on the display screen 103 in FIG. 10.

A case where the processing of the received or arriving information 277 in FIG. 27 is designated will be specifically explained. When the priority level acquisition process is begun, since the priority level has not been designated, at step S2201 a check is performed to determine whether the priority level is valid, and thereafter program control moves to step S2202, whereat standard value (=3) is set for the priority level.

Since, at step S2204, the priority level for time has also not been designated, the standard value (=4) is added to the priority level to acquire the total (=7). Following this, since John is designated as the person concerned, at steps S2207 and S2209 a check is performed to determine whether John and his or her priority level are valid. Since both are valid, program control moves to step S2211, whereat the definition information in FIG. 24, based on the common sense interpretation of the relative importance of the position and the post, is referred to, and a value (=5) for the priority level for a colleague is added to the priority level to acquire the total (=12). As a result of the search at step S2212, data concerning the received information is obtained since the John who is the person named in the task 274 in FIG. 27 matches the John who is the transmission source.

The thus obtained priority level (=12) is output as 1909 in FIG. 19B, and the processing is thereafter terminated.

(Embodiment 8)

Figure 28:
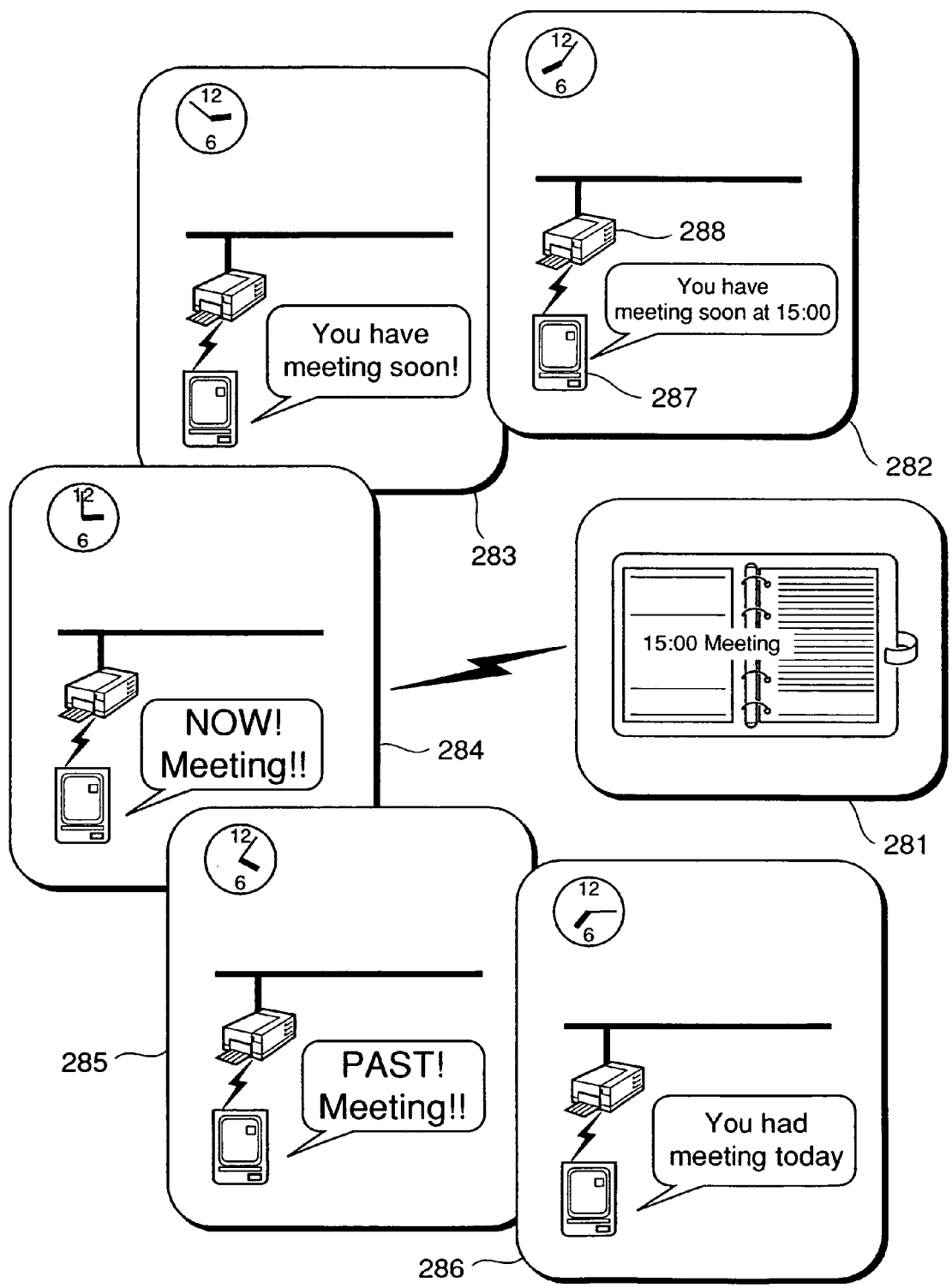
FIG. 28 is a diagram showing an example where an output form is determined in consonance with an urgency level.

FIG. 28 is a diagram illustrating an example where an output form is determined and updated in consonance with the urgency level. In FIG. 28 are shown an example where, as time elapses, the display form used for the same scheduled event is changed in the processing corresponding to the priority and the item count.

The procedures (UI) are performed by the console unit 11 while employing the results obtained by determining/updating the operation data 12, which are originally held by an information processing apparatus, in consonance with data to be processed and their priority levels.

In FIG. 28, the information processing apparatus can refer to user's schedule 281. Plans stored in the schedule 281 include start and end times, the contents, the locations, priority levels, and information concerning attendance and individual plans and sponsors. The priority level can be designated by a user, a smaller value indicating a higher priority.

In the example in FIG. 28, for a meeting schedule for 15:00, changes in a display reflect changes in the urgency level as it corresponds to the time. When, as in a state 282, there is some remaining before the scheduled meeting and the hour is not extremely advanced, the normal display level is used to notify a user that, "You have meeting at 15:00". If, at a time immediately before the scheduled meeting, as in a state 283, highlighting is used to notify the user that "You have a meeting soon!".

Then, as in a state 284, "NOW! Meeting!!" is displayed using the maximum highlighting level. If the user does not depart to attend the meeting as in a state 285, "PAST! Meeting!!" is displayed continuously until the meeting has ended. Following this, as in a state 286, a message "You had a meeting today" is displayed to notify the user that there was a scheduled meeting, and as needed, the rescheduling of subsequent events is reported.

As is described above, according to this embodiment, the degree of highlighting used for schedule data that are to be displayed can be changed in consonance with the urgency level as it changes in correspondence with the time.

The processing will now be described in detail. When the processing corresponding to the priority level and the item count is initiated, first, at step S1801 the user's scheduled events are stored in object items, as is shown in FIG. 19A. Since, at step S1802, there are data in the object items, at step S1803, as are shown in FIG. 19B, priority levels for all the data stored in the object items are acquired through the priority level acquisition process, which will be described later.

Although for easier understanding only one scheduled event is displayed for the user in FIG. 28, when at step S1804 it is ascertained that there are two or more object items, program control moves to step S1806. At step 1806, the length of time a user requires to identify and read an item is compared with the number of object items to be displayed, and the size of an optimal display area for each item is determined. At step S1807, the maximum data for each item that can be held in the period of time that is thus determined are reported in consonance with the priority level of each object item, while the definition in FIG. 20 is referred to.

For example, for the "15:00 Meeting" in the schedule 281 in FIG. 28, the form used for its display is changed in consonance with the changes in the urgency level that occur as time elapses.

According to the urgency and the corresponding priority definition data in FIG. 23, since at 8:05 the time indicated in the state 282 in FIG. 28 is less than one day and is equal to or longer than three hours before the start of the meeting, the urgency level is 4. Since at 14:50 the time in the state 283 is less than an hour and equal to or longer than five minutes before the start of the meeting, the urgency level is 1. Since at 15:00 the time in the state 284 is within five minutes of the start of the meeting, the urgency level is 1. Since at 16:05 the time in the state 285 reflects a time following the state of the meeting and not yet as its end, the urgency level is 1. Further, since at 19:15 the time in the state 286 is equal to or more than one hour and within three hours after the meeting is ended, the urgency level is 3.

As is described above, the differences between the urgency levels is represented as the differences between the priority levels and the differences between the degrees of highlighting employed for the reports. In the example in FIG. 28, the contents of the displayed notice are changed. Such a notice may be prepared, as needed, based on the scheduled for an event, and a difference between the time for the scheduled event and the time that the notice is issued.

(Embodiment 9)

Figure 29:
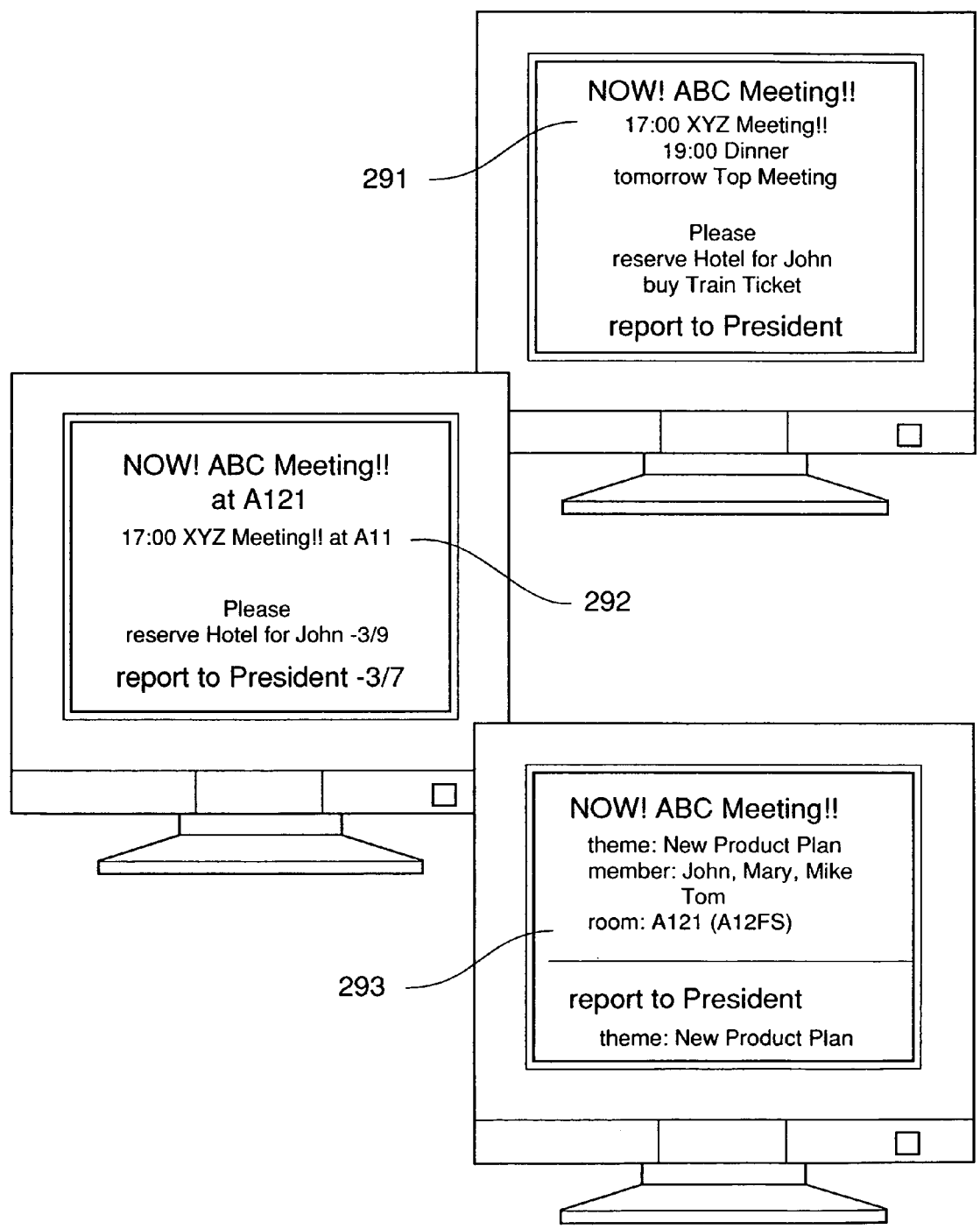
FIG. 29 is a diagram showing an example where the amount of information per item is changed depending on the number of items to be processed.

FIG. 29 is a diagram illustrating an example information processing apparatus for determining and updating an output form in consonance with the amount of information that is to be processed. In FIG. 29 is shown an example where the amount of information for one item is changed in accordance with the number of items to be processed.

In the information processing apparatus in FIG. 29, when there is a large number of information items to be displayed, the amount of information for each item is reduced and displayed as is shown on a display screen 291. When there are few information items, the amount of information for each item is increased and displayed. When the number of items is sufficiently small compared with the size of the screen or the display area that is legible to the user, the contents of the items are displayed as on a screen 293.

As is described above, according to this embodiment, optimal procedures can be provided that are in consonance with the amount of information to be processed.

The processing will now be described in detail. When the processing corresponding to the priority level and the item count is initiated, first, at step S1801 objects to be processed are stored in object items, as is shown in FIG. 19A. Since, at step S1802, there are data in the object items, at step S1803, as are shown in FIG. 19B, priority levels for all the data stored in the object items are acquired through the priority level acquisition process, which will be described later.

At step S1804, it is ascertained that there are two or more object items. Program control moves to step S1806 whereat the size of the display screen or the size of the display area that is legible to the user is compared with the number of object items to be displayed, and the size of the optimal display area for each item is determined. At step S1807, the maximum data for each item that can be entered in the display area that is thus determined are displayed in consonance with the priority level of each object item, while the definition in FIG. 20 is referred to.

For example, as is shown on the screen 291 in FIG. 29, when there are a large number of items, the amount of information to be displayed for each item is reduced, and in this example, from the schedule only the start times and the contents are displayed. As is shown on the screen 292 in FIG. 29, when there are a small number of items, the amount of information to be displayed for each item is increased, and in this example, from the schedule the start time, the contents and the location are displayed. Further, as is shown on the screen 293 in FIG. 29, when there are a small number of items relative to the display screen, all the information contents for an individual item are displayed. In this example, from the schedule all the information, such as the start time and the contents, the location, the theme and attendance, are displayed.

(Embodiment 10)

Figure 30:
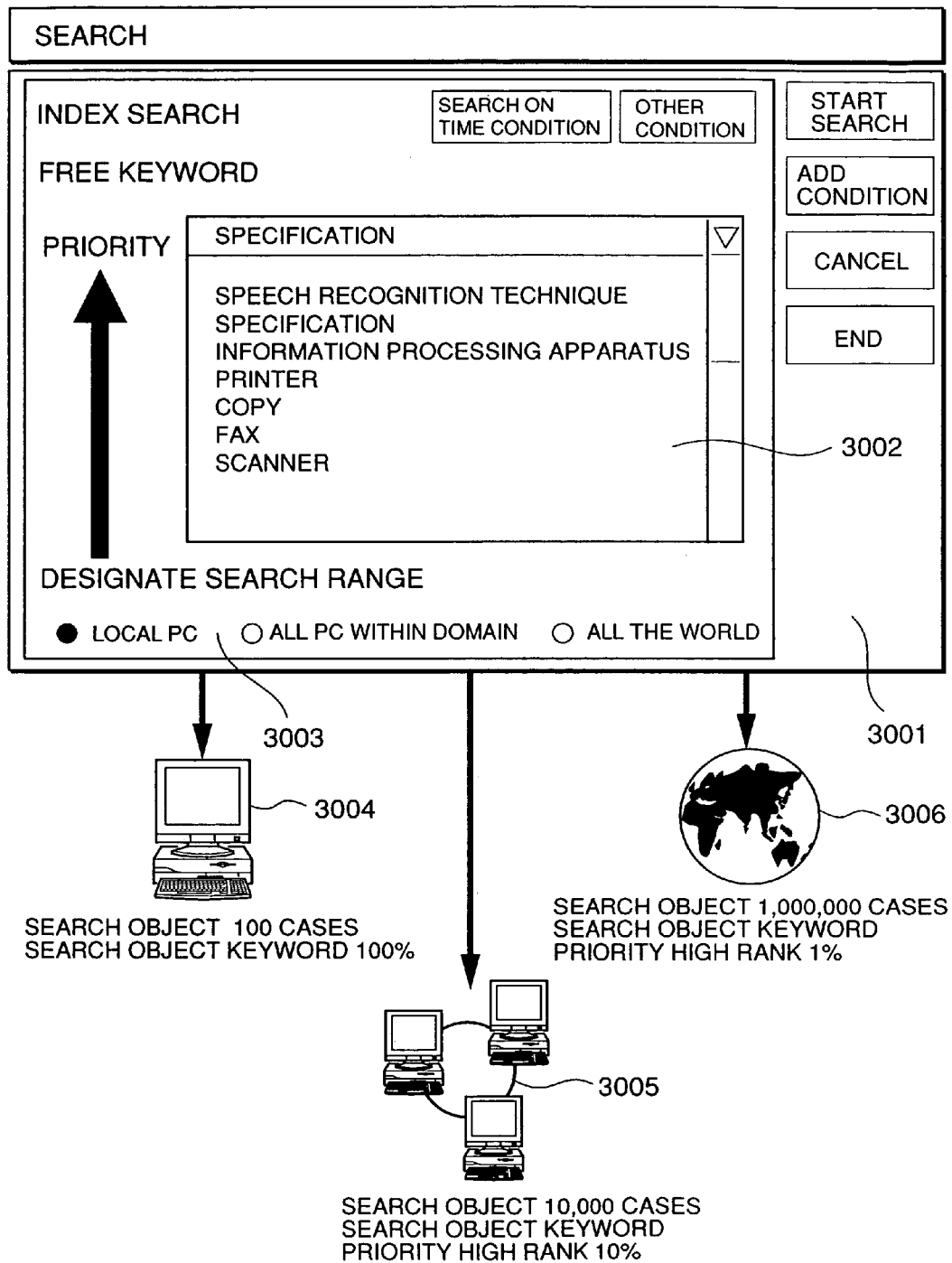
FIG. 30 is a diagram illustrating an example where a processing method is determined and updated in consonance with the amount of information to be processed.

FIG. 30 is a diagram illustrating an information processing apparatus for determining and updating a processing method in consonance with the amount of information that is to be processed. In FIG. 30 is shown a search operating screen and a search range for processing corresponding to a search object count, which will be described later.

For the search performed by the processing execution unit 17, in accordance with an instruction issued by a user, the information is searched for using an operating screen 3001 shown in FIG. 30.

The user can select from a keyword list in FIG. 30 a plurality of keywords to be used for the search. The individual key words may be input by the user or may be automatically extracted from a document that is designated in advance.

The listed keywords have individual priority levels. These priority levels may be input by the user, or may be determined from the frequencies or the context before and after the point at which the keywords appear when they are automatically extracted from a document that is designated in advance.

When the keywords are thus designated, a search range 3003 is selected, and the search process is begun in accordance with a search start instruction 3004 issued by a user. In the processing corresponding to a search object count in FIG. 31, the number of keywords used for a search varies in consonance with the number of objects searched for, and the thus determined number of keywords that have higher priority levels are selected from on a list 3002 and are employed to perform the search.

When, for example, the user selects a local PC 3004 as the search range 3003, the number of cases to be searched is determined to be 100 or more, and the search is initiated by using 100% of the search key words. When all the PCs 3005 within a domain are designated as the search range 3003, cases to be searched are determined to be 10000 or more, and 10% of the search keywords are employed for the search. When the entire world 3006 is designated for the search range 3003, the number of cases to be searched is determined to be 1,000,000 or more, and 1% of the search keywords is employed for the search.

As is described above, according to this embodiment, an optimal search can be provided by varying the amount of information used for a search in consonance with the number of objects to be searched.

The processing for changing the search procedures in accordance with the above described search object count will now be described.

From entries on the operating screen 3001 in FIG. 30, information, such as a search condition designated by a user, is accepted by the console unit 11 and is added to the task table 14 by the task reception unit 13. Then, the processing corresponding to the search object count is performed by the process execution unit 17 via the task analyzer 15 and the planning determination unit 16.

Figure 31:
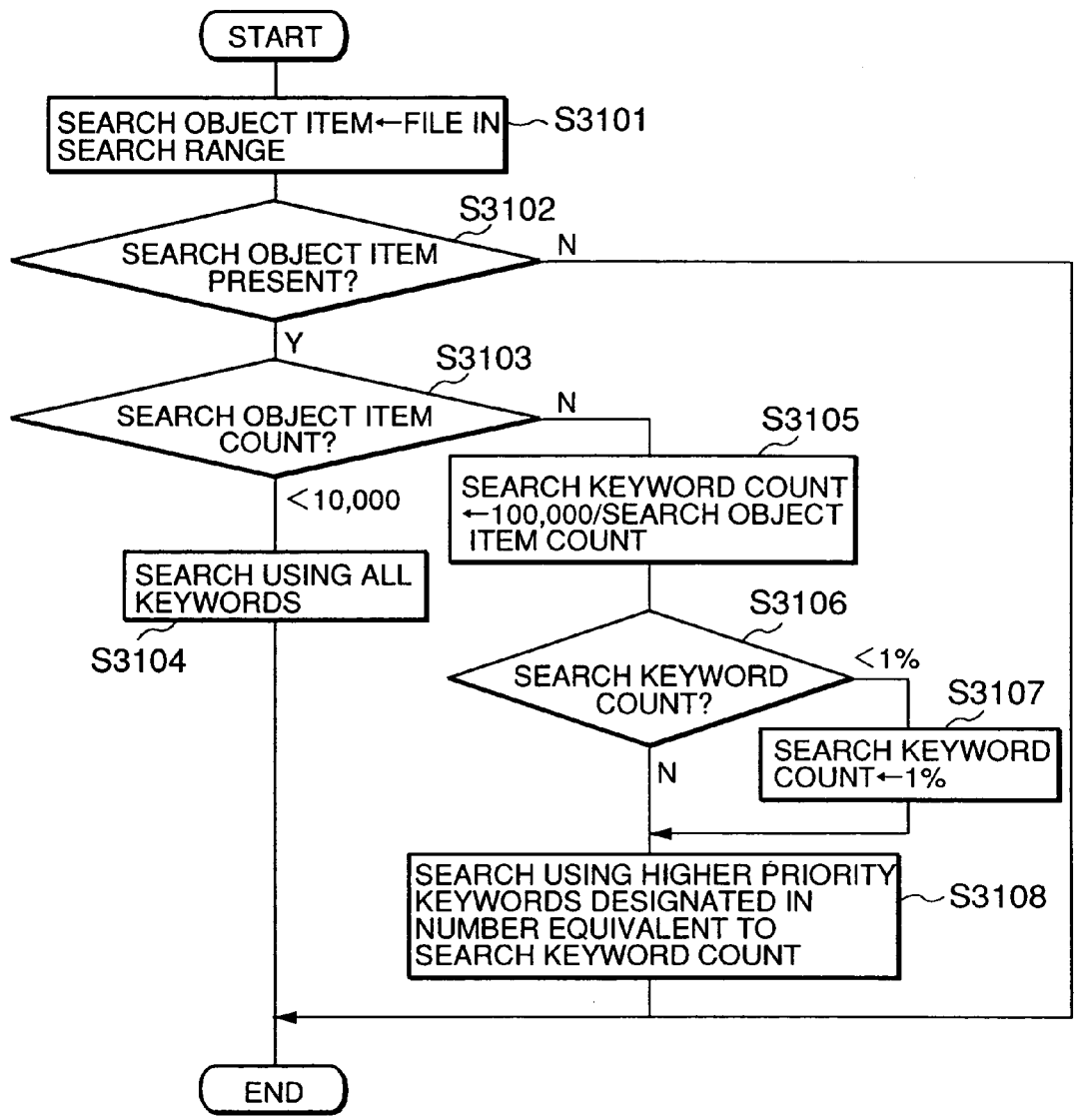

FIG. 31 is a flowchart showing the processing corresponding to the search object count.

When the processing corresponding to the search object count is begun, at step S3101 information for the search range 3003 in FIG. 30, which is designated on the screen by a user, is stored in the search object item. At step S3102, a check is performed to determine whether information is present in the search object item. When information is present, program control moves to step S3103, and when no information is present, the processing is terminated. At step S3103, a check is performed to determine whether the number of search object items is equal to or smaller than 10,000. If the number of search object items is equal to or smaller than 10,000, at step S3104 all the keywords 3002 in FIG. 30 that are designated by the user are employed to perform a search. The processing is thereafter terminated.

When the number of search object items is greater than 10,000, program control moves to step S3105 whereat the total number of search keywords is limited to a ratio of 100,000 to the number of search object items. When, at step S3106 it is ascertained that the number of search keywords is equal to or less than 1% of the total, at step S3107 the number of search keywords is again set to 1% in order to maintain the minimum search effect.

Following this, at step S3108, a search of the target objects is performed using the keywords 3002, in a count equivalent to the count obtained for the search keywords, that are designated by the user and that have higher priority levels. The processing is thereafter terminated.

When, for the processing, the user designates a local PC 3004 in FIG. 30, and when, for example, the number of search objects is around 100, all the keywords that are selected from the keyword list 3002 in FIG. 30 are employed for the search.

When the user designates all the PCs 3005 within a domain in FIG. 30, and when, for example, the number of search objects is around 10,000, 10% of those keywords selected from the keyword list 3002 in FIG. 30 that have higher priority levels are employed for the search.

When the user designates the entire world 3006 in FIG. 30, and when there are enormous number of search objects, 1% of those keywords selected from the keyword list 3002 that have higher priority levels are employed for the search.

As is described above, according to this embodiment, input procedures consonant with the situation can be provided, and usability can be drastically improved. In addition, data can be output in a form corresponding to the priority levels of the information contents. Further, processing can be performed that is consonant with the number of information items.

(Embodiment 11)

The processing performed in consonance with the presence/absence of a user will now be described. First, an explanation will be given for a case where a clear instruction is entered by a user specifying that he is or is not present. The processing to be executed is determined in accordance with whether in the user's instruction it is specifically stated that he is present.

Figure 32A:
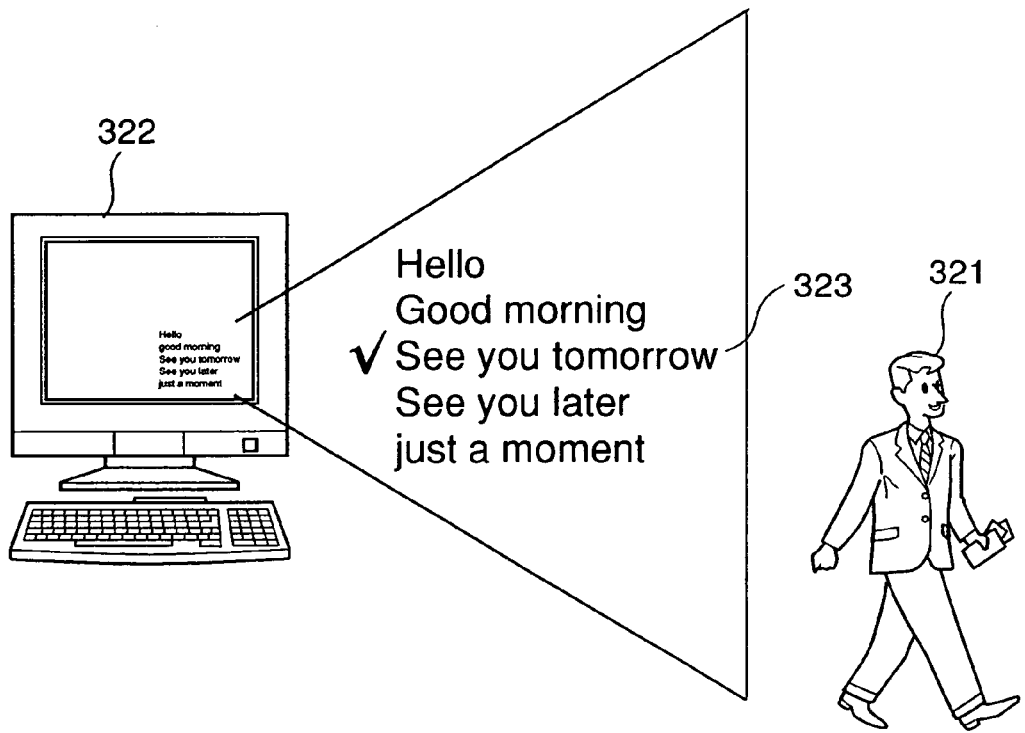
FIGS. 32A and 32B are diagrams showing examples of how to determine which process is to be performed in response to a presence instruction from a user.
Figure 32B:
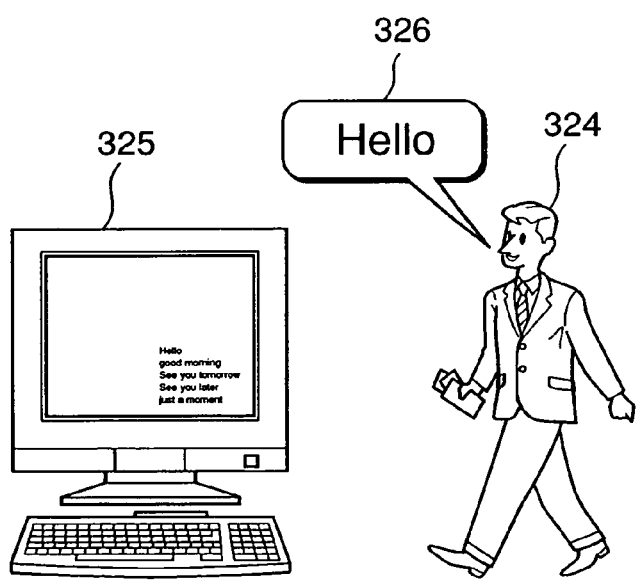

In FIGS. 32A and 32B are shown examples of presence instruction methods employed by a user. In FIG. 32A is shown an example where, in accordance with an instruction displayed on an operating screen 323 of an information processing apparatus 322, a user 321 selects the item "See you tomorrow", which is displayed and leaves his seat. In FIG. 32B is shown an example where a user 324 issues an oral instruction 326 "Hello" to an information processing apparatus 325 and returns to his seat.

Figure 33:
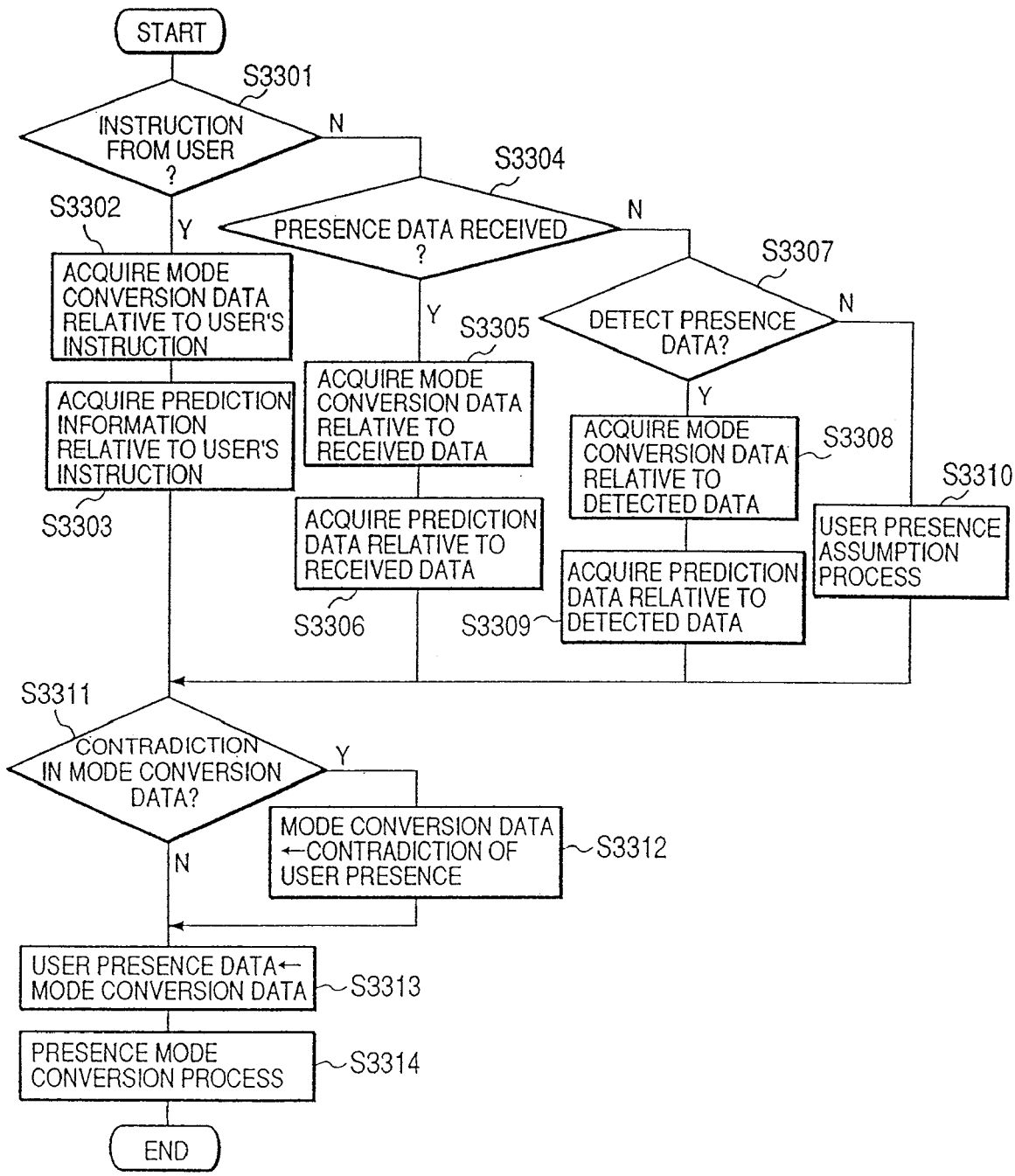
FIG. 33 is a flowchart showing processing performed for user presence determination and presence mode conversion processing.

When the user 321 selects the item "See you tomorrow", which is shown on the operating screen 323 of the information processing apparatus 322, the information on designation operation is accepted by the console unit 11 and is added to the task table 14 by the task reception unit 13. Then, the user presence determination/presence mode conversion process, which will be described later while referring to FIG. 33, is performed by the process execution unit 17 via the task analyzer 15 and the planning determination unit 16. As a consequence of this process, the mode is changed from "presence" to "absence".

When the user 324 issues the oral instruction 326 "Hello" to the information processing apparatus 325, the information on instruction operation is accepted by the console unit 11 and is added to the task table 14 by the task reception unit 13. Then, the user presence determination/presence mode conversion process in FIG. 33 is initiated by the process execution unit 17 via the task analyzer 15 and the planning determination unit 16. As a consequence of this process, the mode is changed from "absence" to "presence".

As is described above, according to this embodiment, upon receipt of a clear instruction from a user, the presence of the user is determined and a corresponding process is performed.

An explanation will now be given for the user presence determination/presence mode conversion processing for determining whether a user is present and for changing the presence mode when needed. FIG. 33 is a flowchart showing the user presence determination/presence mode conversion processing.

FIG. 34A is a diagram showing example definitions used for presence mode conversions in the user presence determination/presence mode conversion processing performed upon the receipt of an instruction from a user. As individual definition information, for each instruction described not only is a definition for presence mode conversion entered, but also the condition that is predicted will exist after the instruction is entered. In the user presence assumption processing, which will be described later, whether the user is present is inferred not only by using information extracted from a user's schedule, but also the prediction that corresponds to the user's instruction.

FIG. 34B is a diagram showing definitions for presence mode conversions relative to data received during the user presence determination/presence mode conversion process. As individual definition information, described for each item of information received and for each information transmission source are not only definitions for a presence mode conversion, but also the condition that it is predicted will exist after the information is received.

FIG. 34C is a diagram showing definitions for presence mode conversions relative to detection results obtained during the user presence determination/presence mode conversion process. As individual definition information, described for each detection result and each detected presence mode are not only definitions for a presence mode conversion, but also the condition that it is predicted will exist after the results of the detection are obtained.

FIG. 35 is a diagram showing example user presence mode conversion data that are referred to during the user presence mode conversion processing, which will be described later. As user presence mode conversion data, defined are presence modes after conversion, and a corresponding processing type execution of which is determined.

The instruction from a user accepted by the console unit 11, the received data and the detection data are added to the task table 14 by the task reception unit 13, and the user presence determination/presence mode conversion process is initiated by the process execution unit 17 via the task analyzer 15 and the planning determination unit 16.

The user presence determination/presence mode conversion processing will now be explained while referring to the flowchart in FIG. 33. First, at step S3301 a check is performed to determine whether a user has entered an instruction. When an instruction has been entered, program control advances to step S3302. At step S3302 definition information for the presence mode conversion relative to the instruction in FIG. 34A is referred to, and the mode conversion information is acquired. At step S3303 prediction information is obtained as information that is referred to in the user presence assumption processing, which will be described later.

When, at step S3301, no instruction has been entered, program control moves to step S3304, whereat a check is performed to determine whether presence information has been received. When such information has been received, program control advances to step S3305. At step S3305 the definition information for presence mode conversion relative to the information received in FIG. 34B is referred to, and the mode conversion data are acquired. At step S3306 the prediction data are obtained as information that is referred to in the user presence assumption process, which will be described later.

When, at step S3304, presence information has not been received, program control moves to step S3307, whereat a check is performed to determine whether presence information has been detected. When such information has been detected, program control advances to step S3308. At step S3308 the definition information for presence mode conversion relative to the information detected in FIG. 34C is referred to, and the mode conversion data are acquired. At step S3309 the prediction data are obtained as information that is referred to in the user presence assumption process, which will be described later.

When, at step S3307, presence information is not detected, program control moves to step S3310 whereat the user presence assumption process, which will be described later, is performed, and the mode conversion information is obtained. At step S3311 a check is performed to determine whether there is a contradiction in the thus obtained mode conversion information. When a contradiction is found, program control moves to step S3312, whereat the message "user presence contradiction" is set in the mode conversion information.

At step S3313 the thus obtained presence mode conversion information is set for the user presence information. At step S3314 the presence mode conversion process is performed that corresponds to the presence mode, which will be described later. The processing is thereafter terminated.

The example in FIG. 32A will now be described in detail. When the user 321 enters "See you tomorrow" in accordance with instructions displayed on the operating screen 323 of the information processing apparatus 322, the information entry is accepted by the console unit 11, and is added to the task table 14 by the task reception unit 13. Then, the user presence determination/presence mode conversion process in FIG. 33 is performed by the process execution unit 17 via the task analyzer 15 and the planning determination unit 16.

When the user presence determination/presence mode conversion processing is begun, it is ascertained at step S3301 that an instruction has been entered by a user. At steps S3302 and S3303 definition information for the presence mode conversion relative to the user's instruction, "See you tomorrow", entered in FIG. 34A is referred to, and mode conversion data "present→left" and prediction data "absent till tomorrow" are acquired.

At step S3311 a check is performed to determine whether there is a contradiction in the thus obtained mode conversion data. Since there is no contradiction, program control advances to step S3313, whereat the above obtained presence mode conversion data "present→left" is set for the user presence information. At step S3314 the presence mode conversion process corresponding to the presence mode is performed. The processing is thereafter terminated. As a result, the process corresponding to the condition in FIG. 35, where the user leaves his seat, is determined, and the process that is determined is added to the task table 14 so that it is initiated at an appropriate timing.

The example in FIG. 32B will now be described in detail. When the user 324 issues the oral instruction 326 "Hello" to the information processing apparatus 325, the information item is accepted by the console unit 11, and is added to the task table 14 by the task reception unit 13. Then, the user presence determination/presence mode conversion process in FIG. 33 is initiated by the process execution unit 17 via the task analyzer 15 and the planning determination unit 16.

When the user presence determination/presence mode conversion processing is begun, it is ascertained at step S3301 that an instruction has been entered by a user. At steps S3302 and S3303 definition information for the presence mode conversion relative to the user's oral instruction "Hello" in FIG. 34A is referred to, and mode conversion data "absence→back" are acquired.

At step S3311 a check is performed to determine whether there is a contradiction in the thus obtained mode conversion data. Since there is no contradiction, program control advances to step S3313, whereat the above obtained presence mode conversion data "absent→back" are set for the user presence information. At step S3314 the presence mode conversion process corresponding to the presence mode is performed. The processing is thereafter terminated. As a result, the process is determined that corresponds to the condition in FIG. 35 where the user returns to his seat, and the process that is determined is added to the task table 14 so that it is initiated at an appropriate timing.

(Embodiment 12)

Figure 36:
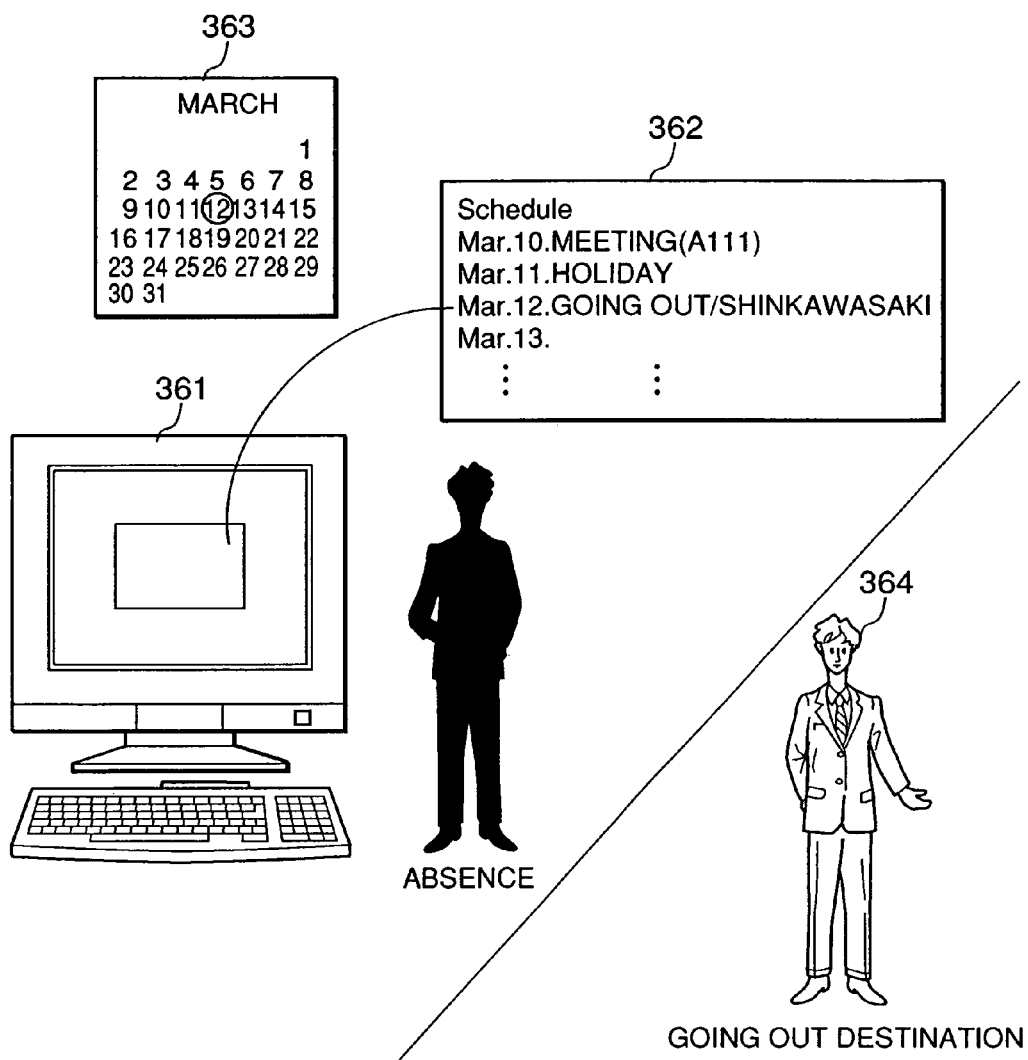
FIG. 36 is a diagram showing an example where what process to be performed is determined as a result of an assumption that a user is or is not present.

An explanation will now be given for an example where a user's schedule data are referred to in order to support an assumption concerning the presence of a user. FIG. 36 is a diagram showing an example information processing apparatus wherein data from the user's schedule are referred to in order to make an assumption concerning whether a user is present, and to determine a process to be executed. An information processing apparatus 361 in FIG. 36 holds user schedule data 362 that can be referred to, and refers to this schedule data to make an assumption concerning whether the user is present.

The user presence assumption process is performed when a task for which execution is designated when there is no manipulation from a user for a specific period of time is stored in the task table 14, or when the task reception unit 13 receives, from another information processing apparatus 2, a query concerning whether the user is present and a corresponding task is added to the task table 14.

Figure 39:
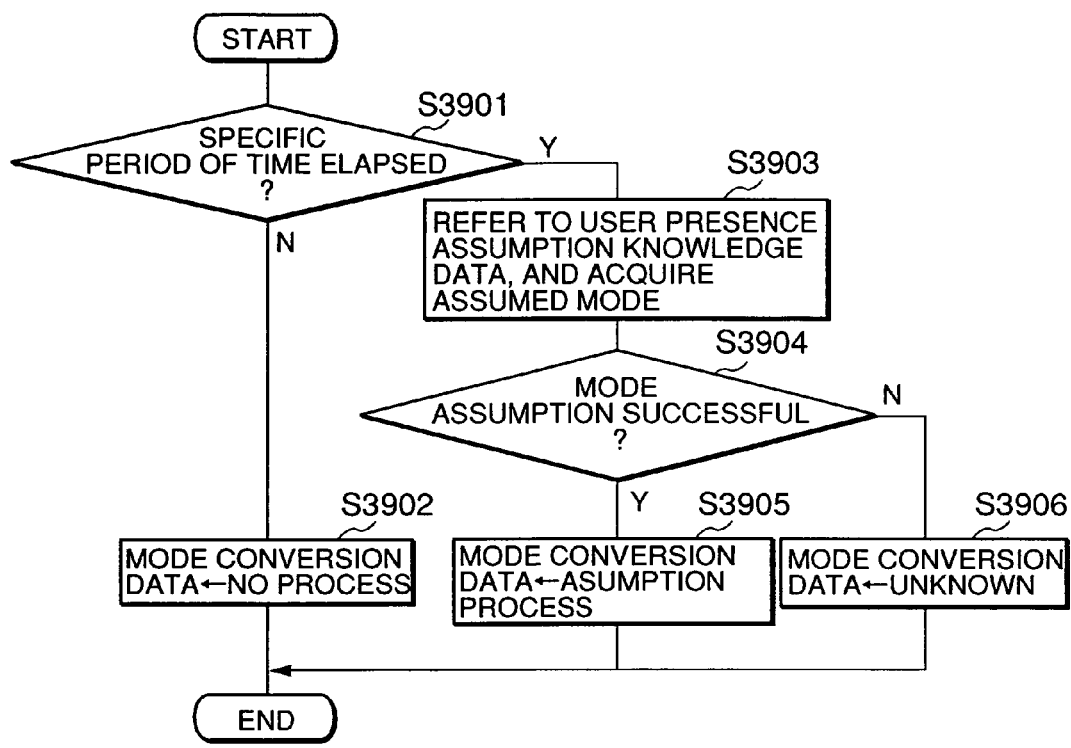
FIG. 39 is a flowchart showing user's presence inference processing.

The user presence determination/presence mode conversion processing and the user presence assumption processing in FIG. 39 are initiated by the process execution unit 17 via the task analyzer 15 and the planning determination unit 16, the assumption is made as to whether the user is present, and the mode is changed to a corresponding mode.

In the example in FIG. 36, since a date 363 for the execution is March 12th, and corresponding schedule entry 362 is "going out to Shinkawasaki", it is assumed that a user 364 went out and is in Shinkawasaki. Thus it is assumed that the user is not in the vicinity of the information processing apparatus 361, and the mode is changed to "absent". Or, the absence of the user is reported to another information processing apparatus 2.

As is described above, according to this embodiment, the information concerning a user can be referred to when making an inference as to whether the user is present, and a corresponding process can be performed.

A detailed explanation for this processing will be given later while referring to the flowchart in FIG. 39 for the user presence assumption processing performed to implement the above described processing.

(Embodiment 13)

Figure 37:
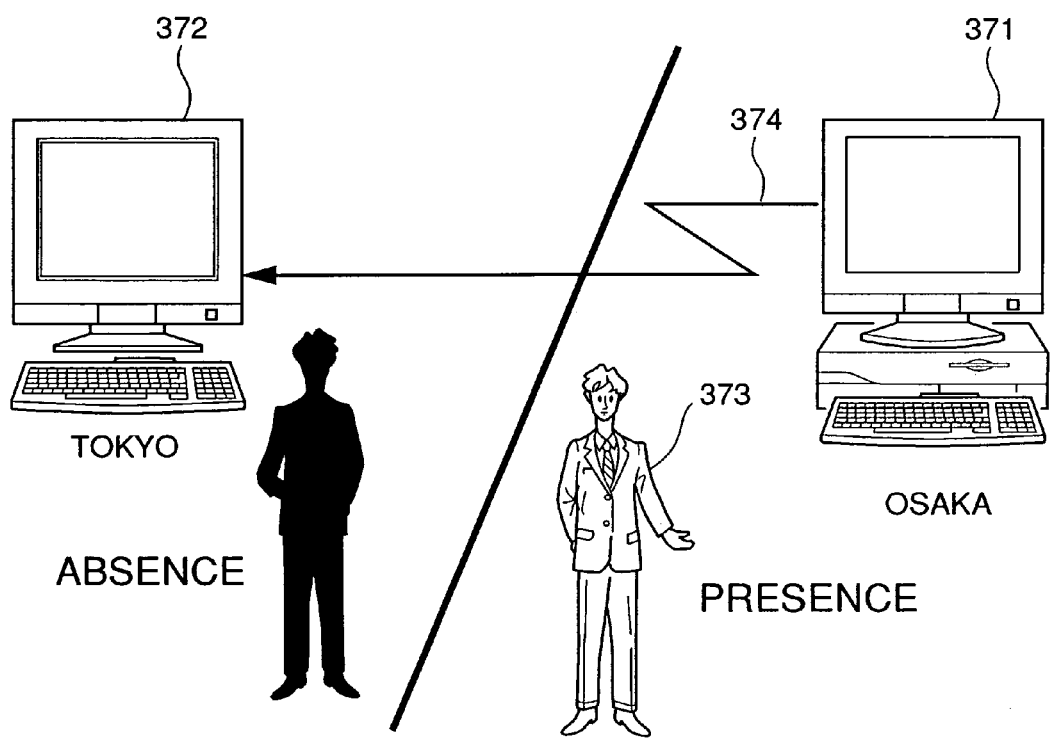
FIGS. 37 and 38 are diagrams showing an example where presence data are received to determine whether a user is present.
Figure 38:
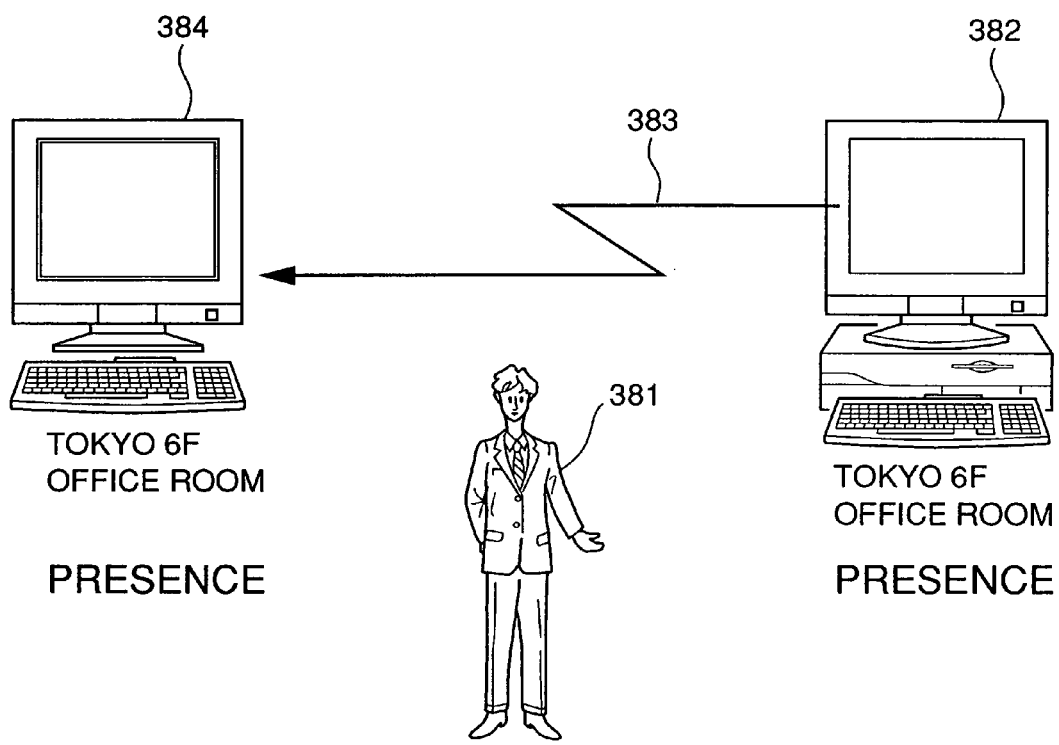

An example where received information is employed to determine whether a user is present will now be described. In FIGS. 37 and 38 is shown an example information processing apparatus that, upon the receipt of presence information from another information processing apparatus 2, determines whether a user is present and decides on the corresponding processing that is to be executed.

In the example in FIG. 37, an information processing apparatus 372 in Tokyo receives presence data 374 that indicates a user 373 is near an information processing apparatus 371 in Osaka, and determines that at its location the user is absent by employing the common sense reasoning that the same user can not at the same time be present both in Tokyo and Osaka. In the example in FIG. 38, an information processing apparatus 384 in a sixth floor office room in Tokyo receives presence data 383 indicating that a user 381 is near an information processing apparatus 382 in the same sixth floor office room in Tokyo, and determines that the user is present by employing the common sense reasoning that the user must be present because the room is the same.

First, the example in FIG. 37 will be described in detail. When the user 373 enters presence data in the information processing apparatus 371 in Osaka, or when the information processing apparatus 371 detects the presence of the user 373, the information processing apparatus 371 can ascertain the user 373 is present at that location.

The thus obtained user presence data are transmitted to the information processing apparatus 372 in Tokyo either voluntarily or in accordance with an instruction entered by the user 373. Upon the receipt of the presence data, the information processing apparatus 372 uses the task reception unit 13 to add the data to the task table 14, and initiates the user presence determination/presence mode conversion process in FIG. 33 via the task analyzer 15 and the planning determination unit 16.

When the user presence determination/presence mode conversion process is initiated, at steps S3301 and S3304 it is ascertained that presence data have been received. At steps S3305 and S3306 the definition data for a presence mode conversion, relative to the received data "returned to seat" and the transmission source "Osaka" in FIG. 34B, are referred to, and the mode conversion data "absent" are acquired.

At step S3311, a check is performed to determine whether there is a contradiction in the acquired mode conversion data. Since there is no contradiction, program control advances to step S3313, whereat the presence mode conversion data "absent" is set for the user presence data. At step S3314 the presence mode conversion process corresponding to the presence mode is performed, and the processing is thereafter terminated. As a result, performance of the process corresponding to the absence in FIG. 35 is decided, and is added to the task table 14, so that it can be initiated in consonance with an appropriate timing.

Following this, the example in FIG. 38 will be described in detail. When the user 381 enters presence information at the information processing apparatus 382 in the sixth floor office room in Tokyo, or when the information processing apparatus 382 detects the presence of the user 381, the information processing apparatus 382 can ascertain the user 381 is present at that location.

The thus obtained user presence data are transmitted to the information processing apparatus 384 in the same sitting room in Tokyo voluntarily or in accordance with an instruction entered by the user 381. Upon the receipt of the presence data, the information processing apparatus 384 adds the data to the task table 14 using the task reception unit 13, and initiates the user presence determination/presence mode conversion process in FIG. 33 via the task analyzer 15 and the planning determination unit 16.

When the user presence determination/presence mode conversion process is initiated, at step S3301 and S3304 it is ascertained that the presence data have been received. At step S3305 and S3306 the definition data for presence mode conversion, relative to the received data "returned to seat" and transmission source "Tokyo sixth floor office room" in FIG. 34B, are referred to, and the mode conversion data "unchanged" are acquired. At step S3311, a check is performed to determine whether there is a contradiction in the acquired mode conversion data. Since there is no contradiction, program control advances to step S3313, whereat the presence mode conversion data "unchanged" is set for the user presence data. At step S3314 the presence mode conversion process corresponding to the presence mode is performed, and the processing is thereafter terminated. As a result, no processing is newly performed.

As is described above, in this embodiment, the presence of a user is determined by referring to the received presence data and to its transmission source, and a corresponding process can be performed.

The processing for making an assumption as to whether a user is present will now be described. FIG. 39 is a flowchart showing the user presence assumption processing that is used in the user presence determination/presence mode conversion processing performed by the process execution unit 17. In FIG. 40 are shown example user presence assumption knowledge data that are referred to in the user presence assumption process. For the user presence assumption knowledge data, mode conversion data, which are assumption results, are defined relative to the situations indicated by the assumed knowledge.

In the example in FIG. 36, in the user presence assumption processing, user schedule data 362 are referred to and it is assumed that a user 364 is absent.

The user's instruction accepted by the console unit 11, the received data and the detected data are added to the task table 14 by the task reception unit 13, and the user presence determination/presence mode conversion process in FIG. 33 is performed via the task analyzer 15 and the planning determination unit 16. Further, the user presence assumption processing in FIG. 39 is initiated.

When the user presence assumption process is initiated, first, at step S3901 a check is performed to determine whether a specific period of time has elapsed. With this determination, the deterioration of the process efficiency, which is caused by the performance of assumption process, can be avoided.

When the specific period of time has not elapsed, program control advances to step S3902, whereat "no process" is set for the mode conversion data, and the processing is thereafter terminated. When the specific period of time has elapsed, program control moves to step S3903, whereat the user presence assumption knowledge data in FIG. 40 are referred to, and the mode conversion data, which are the assumption process results, are acquired relative to the situation when the user presence assumption process is executed.

At step S3904, a check is performed to determine whether the presumption is successful. When the assumption process is successful, program control advances to step S3905, whereat the assumption process results are set for the mode conversion data. When the assumption process fails, program control goes to step S3906, whereat "unknown" is set for the mode conversion data, and the processing is thereafter terminated.

The user presence assumption process will now be described in detail while referring to FIGS. 36 and 40. The user presence assumption processing is performed, for example, when a task that is designated to be executed when no manipulation by a user is detected for a specific period of time is stored in the task table 14, or when a query as to whether a user is present is transmitted from another information processing apparatus 2 to the task reception unit 13 and a corresponding task is added to the task table 14.

Then, the user presence determination/presence mode conversion process in FIG. 33 and the user presence assumption process in FIG. 39 are initiated by the process execution unit 17 via the task analyzer 15 and the planing determination unit 16.

When the user presence assumption process has been begun, and when it is ascertained at step S3901 that a specific time has elapsed program control moves to step S3903. At step S3903, the user presence assumption knowledge data in FIG. 40 are referred to, and the mode conversion data, which are assumption results, are obtained relative to the situation existing when the user presence assumption process is performed. In the example in FIG. 36, the execution date 363 is March 12th and the corresponding schedule 362 is "going out to Shinkawasaki". The definition in FIG. 40 is referred to and it is assumed that a user is "absent".

Following this, since at step S3904 the assumption process is successful, program control advances to step S3905, whereat the assumption process results are set for the mode conversion information, and the processing is thereafter terminated.

(Embodiment 14)

An explanation will now be given for an example where whether a user is present at his seat is determined by referring to the results obtained by the detection process performed to determine whether the user is present nearby.

Figure 41A:
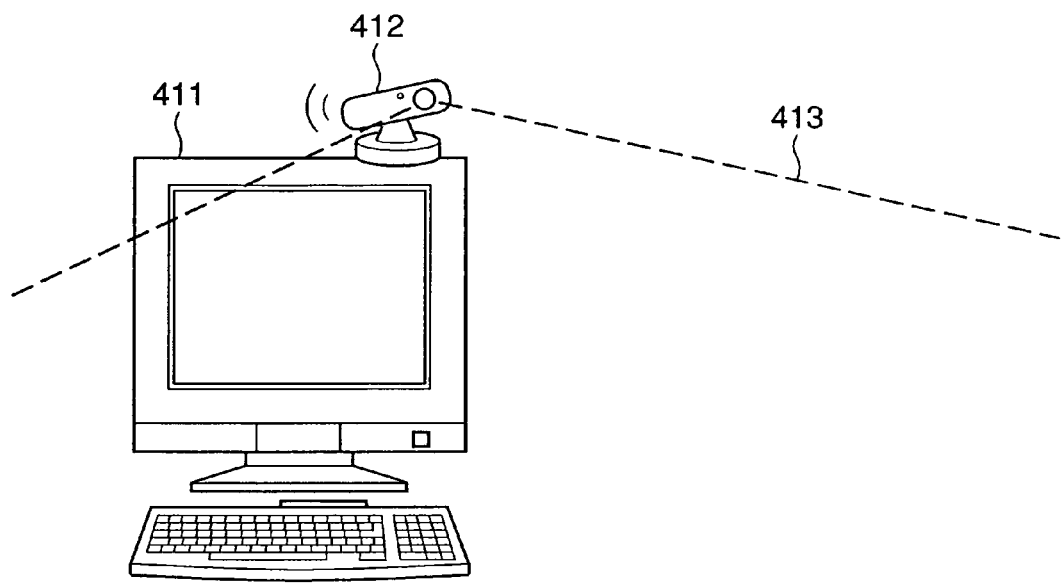
FIGS. 41A and 41B are diagrams showing examples where the presence/absence condition is detected to determine whether a user is present.
Figure 41B:
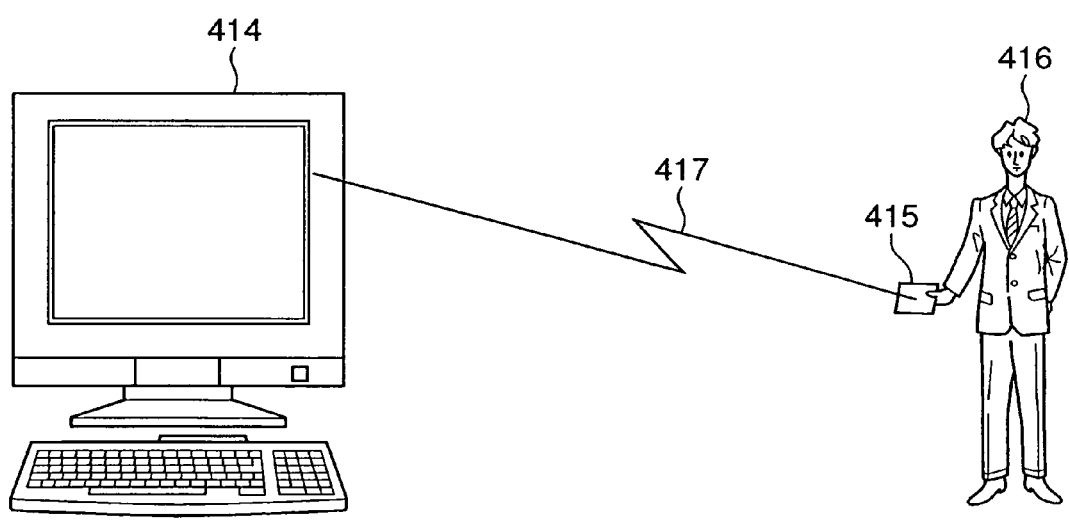

FIGS. 41A and 41B are diagrams showing examples for referring to the results obtained by a process to determine whether the user is present nearby in order to determine whether a user is in his seat, and for deciding on a process to be executed.

In FIG. 41A is shown an example where image data obtained with a camera 412 that is controllable by an information processing apparatus 411 are employed to determine whether a user is present nearby. And in FIG. 41B is shown an example where to determine a whether a user is present nearby an information processing apparatus 414 receives information 417 from an information processing apparatus 415 carried by a user 416.

Image data are obtained within a photographic range 413 by the camera 412, which controlled by the information processing apparatus 411, the data are received by the task reception unit 13, and a picture analyzation task is added to the task table 14. Then, the image data are analyzed by the task analyzer 15 and the planning determination unit 16 to determine whether the user is present. Following this, a task for initiating the user presence determination/presence mode conversion processing in FIG. 33, which is to be performed by the process execution unit 17, is newly added to the task table 14.

The user presence determination/presence mode conversion processing in FIG. 33 is initiated by the process execution unit 17 via the task analyzer 15 and the planning determination unit 16. If the results of the detection differ from the current mode, the mode is changed. Assuming that the detected mode is "present" and the user does not appear in the picture taken, the mode is changed to "absent".

When the information 417 transmitted by the information processing apparatus 415 carried by the user 416 is detected by the information processing apparatus 414, the information 417 is received by the task reception unit 13 and is added to the task table 14 as a received information analyzation task. Then, the received data are analyzed by the task analyzer 15 and the planning determination unit 16 to determine whether the user is present. Following this, a task for initiating the user presence determination/presence mode conversion processing in FIG. 33, which is to be performed by the process execution unit 17, is newly added to the task table 14.

The user presence determination/presence mode conversion processing in FIG. 33 is initiated by the process execution unit 17 via the task analyzer 15 and the planning determination unit 16. Assuming that the detected mode is "absent" and the received data indicates the presence of the user, the mode is changed to "present".

As is described above, according to this embodiment, the presence of the user is determined by employing information obtained by a camera that is controlled by the information processing apparatus, or by receiving information from another information processing apparatus carried by the user, and the corresponding processing is performed.

The user presence determination/presence mode conversion process will now be described while referring to the flowchart in FIG. 33 as an example where the above described user presence data are detected.

When the user presence determination/presence mode conversion process is initiated, at steps S3301, S3304 and S3307, it is ascertained that the presence data have been detected. When the detected presence mode is "present", at steps S3308 and S3309 the definition data for presence mode conversion, relative to the detected data "absent" and the detected mode "present" in FIG. 34C, are referred to, and the mode conversion data "leaving seat" are acquired.

At step S3311, a check is performed to determine whether there is a contradiction in the acquired mode conversion data. Since there is no contradiction, program control advances to step S3313, whereat the presence mode conversion data "leaving seat" is set for the user presence data. At step S3314 the presence mode conversion process corresponding to the presence mode is performed, and the processing is thereafter terminated.

As a result, selection of the process in FIG. 35 that corresponds to the event where the user left his seat is confirmed, and is added to the task table 14, so that the process will be initiated at an appropriate timing.

(Embodiment 15)

An process performed when it is determined that a user is present will now be described.

Figure 42:
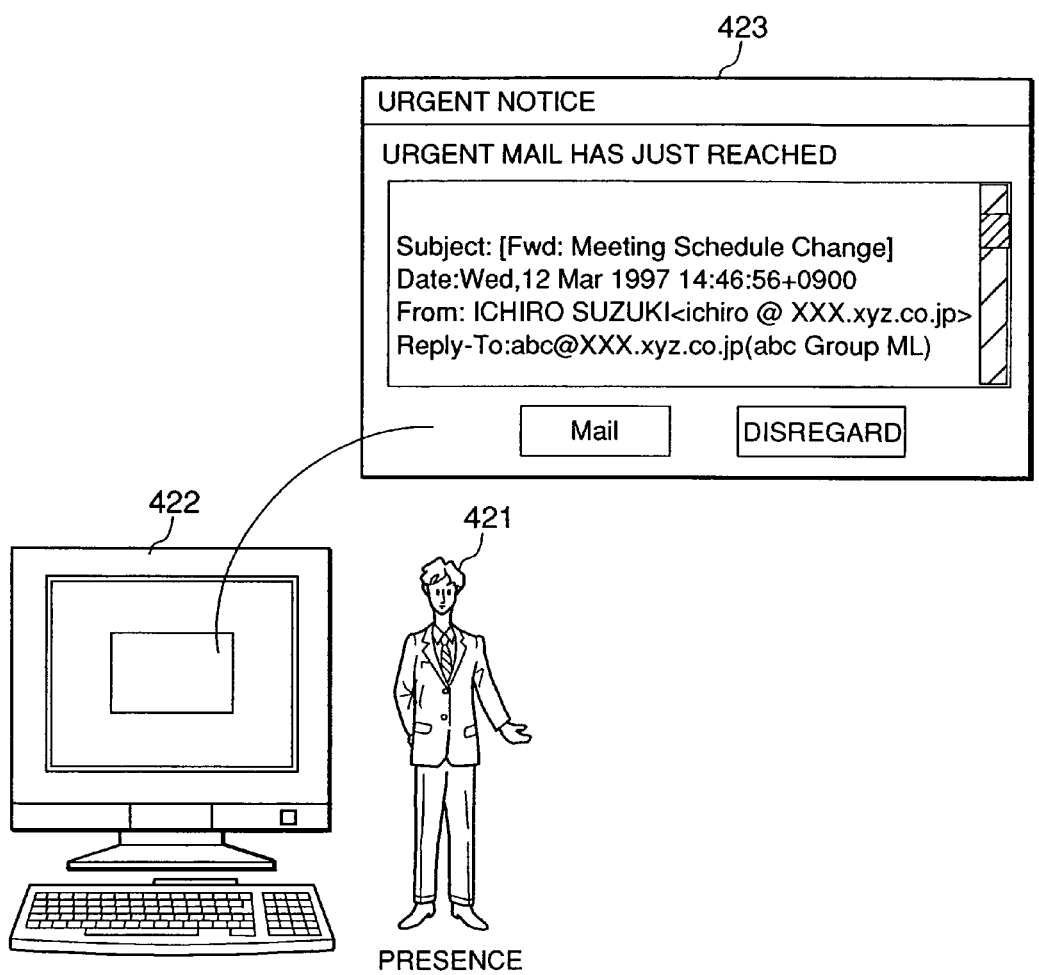
FIG. 42 is a diagram showing example processing performed when it is ascertained that a user is present.

FIG. 42 is a diagram showing an example information processing apparatus that can execute a corresponding process when it is determined that a user is present at his seat. In FIG. 42 is shown an example display screen for notifying a user of the arrival of urgent information when the user is present at his seat.

Figure 43:
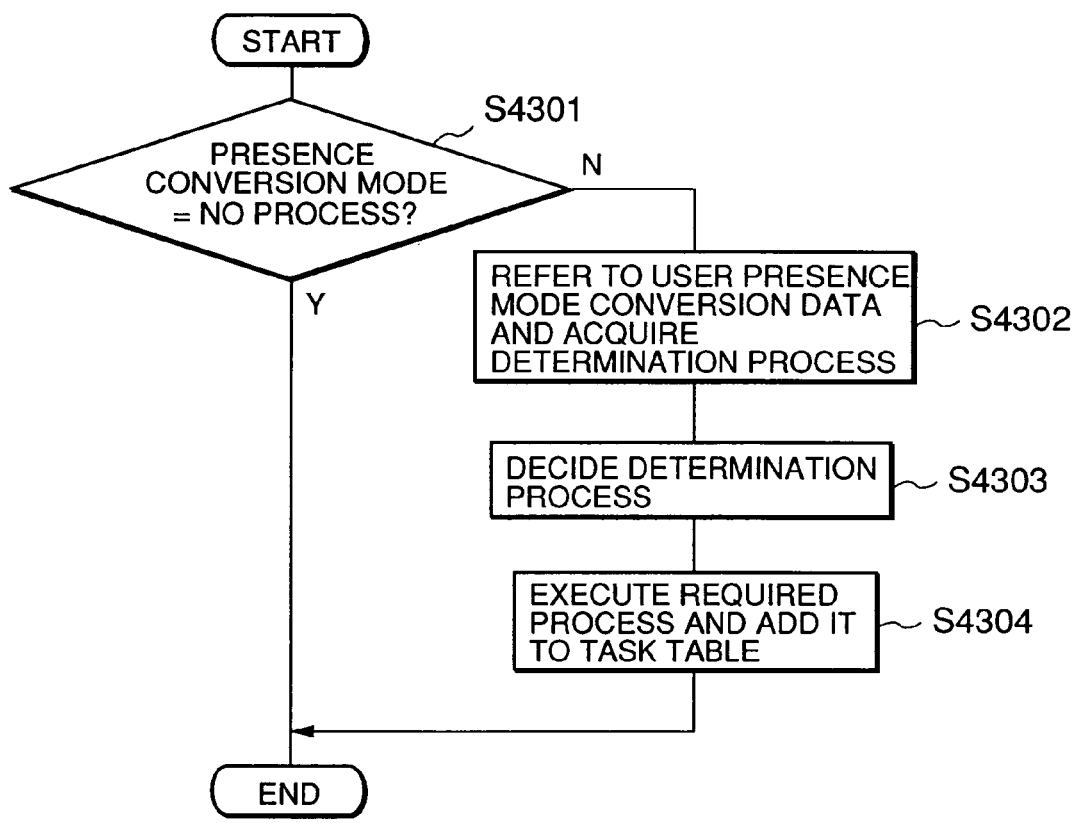
FIG. 43 is a flowchart showing a user's presence mode conversion process.

The user presence process shown in FIG. 42 can be performed when the mode is changed to the "presence" mode through the user presence mode conversion process shown in FIG. 43, which is initiated by the user presence determination/presence mode conversion process in FIG. 33. In FIG. 42, when an information processing apparatus 422 receives urgent mail while a user 421 is present at his seat, the mail is added to the task table 14 by the task reception unit 13.

The urgent notice task is initiated by the process execution unit 17 via the task analyzer 15 and the planning determination unit 16, and a notification screen 423 in FIG. 42 is displayed. This is a meaningless display unless the user is present, and the purpose of the urgent notification can not be attained. Thus, in a mode other than the "present" mode, another method must be employed for notification.

As is described above, according to this embodiment, when the user is present at his seat, a process consistent with that situation, such as the transmission of an urgent notice, can be performed.

The user presence mode conversion processing will now be described. FIG. 43 is a flowchart showing the user presence mode conversion process that is employed in the user presence determination/user mode conversion processing. In the user presence mode conversion process, the user presence mode conversion data in FIG. 35 are referred to.

In FIGS. 44 to 49 are shown examples of the processing that is determined to be executable as the result of the user presence mode conversion process.

The user's instructions accepted by the console unit 11, the received data and the detected data are added to the task table 14 by the task reception unit 13. The user presence determination/presence mode conversion process in FIG. 33 is begun by the process execution unit 17 via the task analyzer 15 and the planning determination unit 16, and in addition, the user presence mode conversion processing is initiated.

When the user presence mode conversion process is initiated, first, at step S4301 a check is performed to determine whether the presence conversion mode is set for "no process". If "no process" is selected, no process accompanying the change of the presence mode is performed, and the processing is thereafter terminated.

When the presence conversion mode is other than "no process", program control moves to step S4302, whereat the user presence mode conversion data in FIG. 35 are referred to and a process is acquired, which is determined in correspondence with the designated presence conversion mode. At step S4303, the acquired process is established, and at step S4303 the required process is performed. Following this, if necessary, the task is added to the task table 14, and the processing is thereafter terminated.

When the presence conversion mode is "returning to seat", the user presence mode conversion data in FIG. 35 are referred to, and a process type 355 that is to be determined corresponding to the "returning to seat" is acquired. As a result, various processes in FIG. 46 are performed or are added to the task table 14.

(Embodiment 16)

Figure 44:
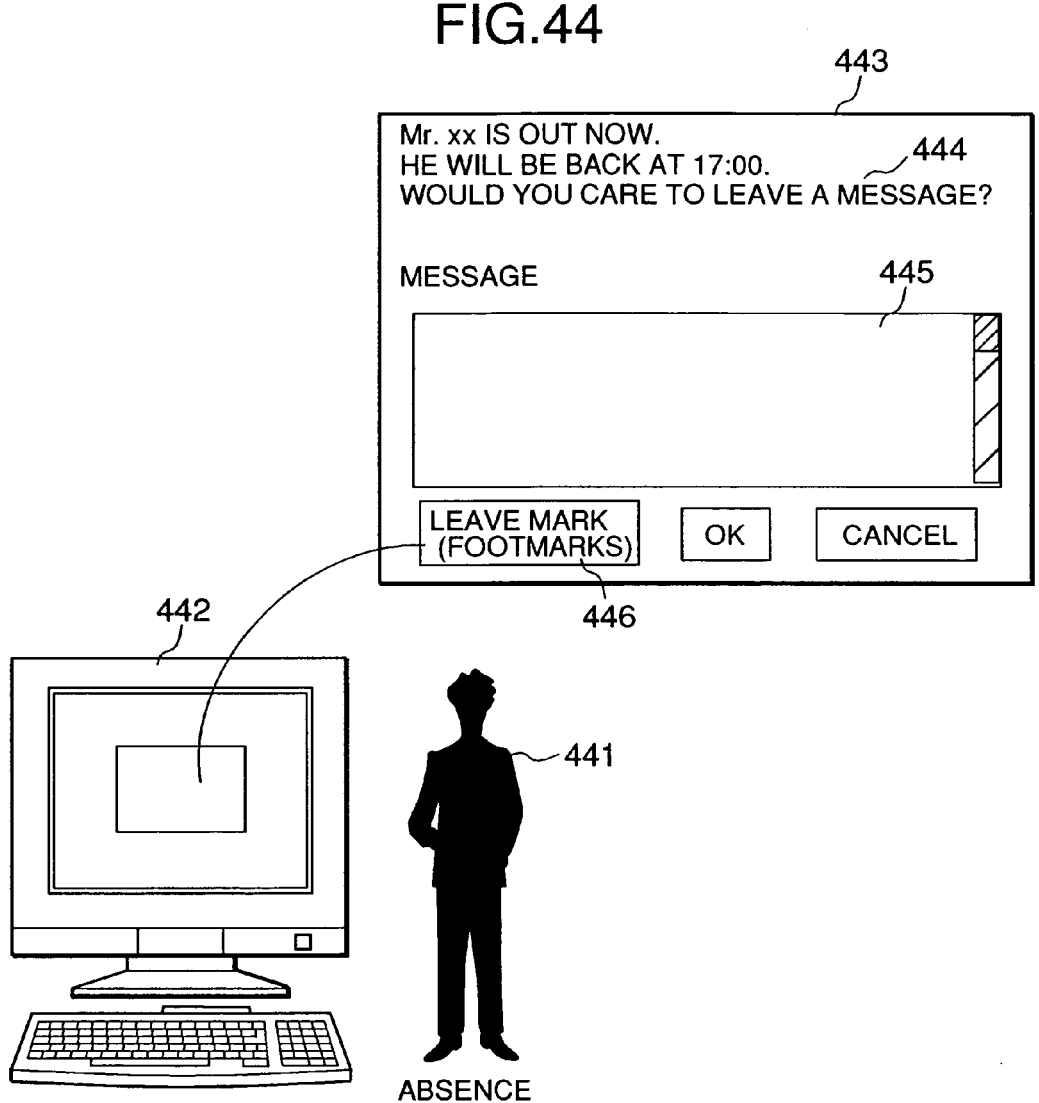
FIG. 44 is a diagram showing example processing performed when it is ascertained that a user is absent.

The processing performed when it has been ascertained that a user is absent will now be described. FIG. 44 is a diagram showing an example information processing apparatus that can perform a corresponding process when it is determined that a user is absent. In FIG. 44 is shown an example display screen on which to display a message from a user to a visitor and to accept a message from the visitor to the user.

The user absence process in FIG. 44 can be performed when the mode is changed to "absent mode" in the user presence mode conversion processing in FIG. 43, which is initiated during the user presence determination/presence mode conversion processing in FIG. 33.

An information processing apparatus 442 adds the process in FIG. 44 to the task table 14, so that it can be performed when a user 441 is absent. Then, the message display/acceptance task is initiated by the process execution unit 17 via the task analyzer 15 and the planning determination unit 16, and an operating screen 443 shown in FIG. 44 is displayed.

This display is meaningful because the user is absent, and the purpose of displaying and accepting messages can attained. Thus, in a mode other than the "absent" mode, this process need not be performed.

As is described above, according to this embodiment, when the user is absent, a corresponding process, such as displaying and accepting messages, can be performed.

(Embodiment 17)

Figure 45:
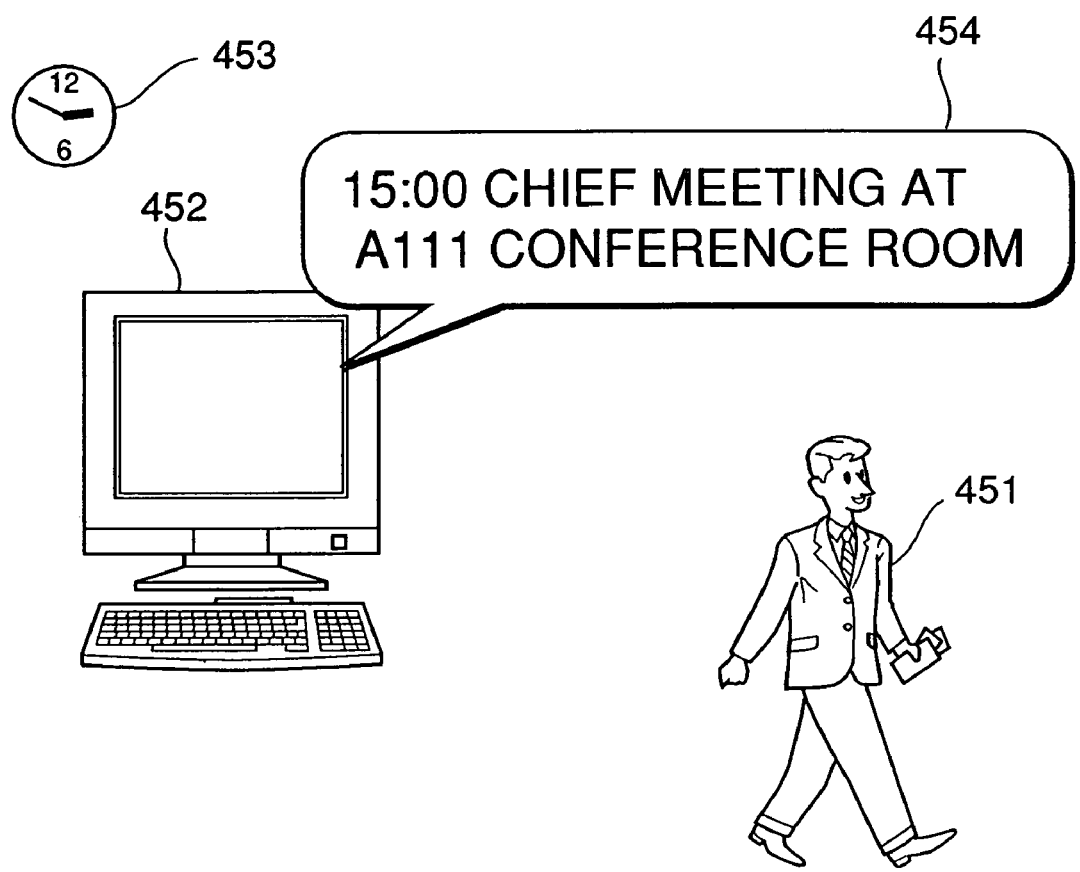
FIG. 45 is a diagram showing example processing performed when it is determined that a user is about to leave his seat.

An explanation will now be given for an example where a corresponding process is performed when it is ascertained that a user is to leave his seat. In FIG. 45 is shown an example notification operation in which, when it is determined that a user is to leave his seat, a process is performed to notify the user of information that he should recall.

The process performed in FIG. 45 when a user leaves the seat can be performed when the mode is changed to the "leaving seat" mode in the user presence mode conversion processing in FIG. 43, which is initiated during the user presence determination/presence mode conversion processing in FIG. 33.

When by employing the above described method it is detected that the user is to leave his seat, the mode is changed to the "leaving seat" mode, and added to the task table 14 is a notification process task shown in FIG. 45 that can be performed in the "leaving seat" mode to notify the user of information that he should recall.

Then, the notification process task for notifying a user of information that he should recall is initiated by the process execution unit 17 via the task analyzer 15 and the planning determination unit 16, and an operating screen 454 in FIG. 45 is displayed.

In the example in FIG. 45, current time 453, 14:50, is compared with the schedule of the user 451, "15:00 Chief meeting". So long as the reason that the user 451 leaves his seat is to attend the meeting, no problem will occur. If the user 451 leaves his seat for some reason, it is understood that the user may forget the meeting. Thus, the process is performed to notify the user 451 of the message 454, "15:00 Chief meeting at All conference room".

This notice is effective because the user 451 is about to leave his seat, and the purpose of implementing the notification of the information that the user should recall can be attained. When the "leaving" mode process has been performed, the process for changing the mode to the "absent" mode follows.

As is described above, according to this embodiment, when a user is about to leave his seat, a process corresponding to this state can be performed, such as a process for notifying a user of information that he should recall.

(Embodiment 18)

An explanation will now be given for an example where a corresponding process is performed when it is determined that a user has returned to his seat. In FIG. 46 is shown an example of the notification operation employed for reporting received information, such as messages accepted during the absence of a user, when it is ascertained that he has returned to his seat.

The process performed in FIG. 46 when a user returns to his seat can be performed when the mode is changed to the "returning" mode in the user presence mode conversion processing in FIG. 43, which is initiated during the user presence determination/presence mode conversion processing in FIG. 33.

When by the above described method it is detected that the user has returned to the seat, the mode is changed to the "returning" mode, and added to the task table 14 is a notification process task, shown in FIG. 46, that can be performed in the "returning" mode to notify a user of information items that were received, such as messages accepted during his absence.

Then, the notification process task for notifying a user of information items that were received, such as messages accepted during his absence, is initiated by the process execution unit 17 via the task analyzer 15 and the planning determination unit 16, and an operating screen 464 in FIG. 46 is displayed.

In the example in FIG. 46, information for five cases, including a message directly entered by a visitor, was received while the user was absent, and the list of received information items is displayed.

This notice is effective because the user 461 has returned to his seat, and the purpose of implementing the notification of the information items received during the user's absence, such messages, can be attained. When the mode is other than the "returning" mode, another method must be employed for such notification. When the "returning" mode process has been performed, the process for changing the mode to the "present" mode follows.

As is described above, according to this embodiment, when the user returns to his seat, a process corresponding to this state is performed, such as the notification of information items that were received, such as messages accepted during the absence of the user.

(Embodiment 19)

An explanation will be given for an example where a corresponding process is performed when it is ascertained that the presence status of a user is unknown.

Figure 47:
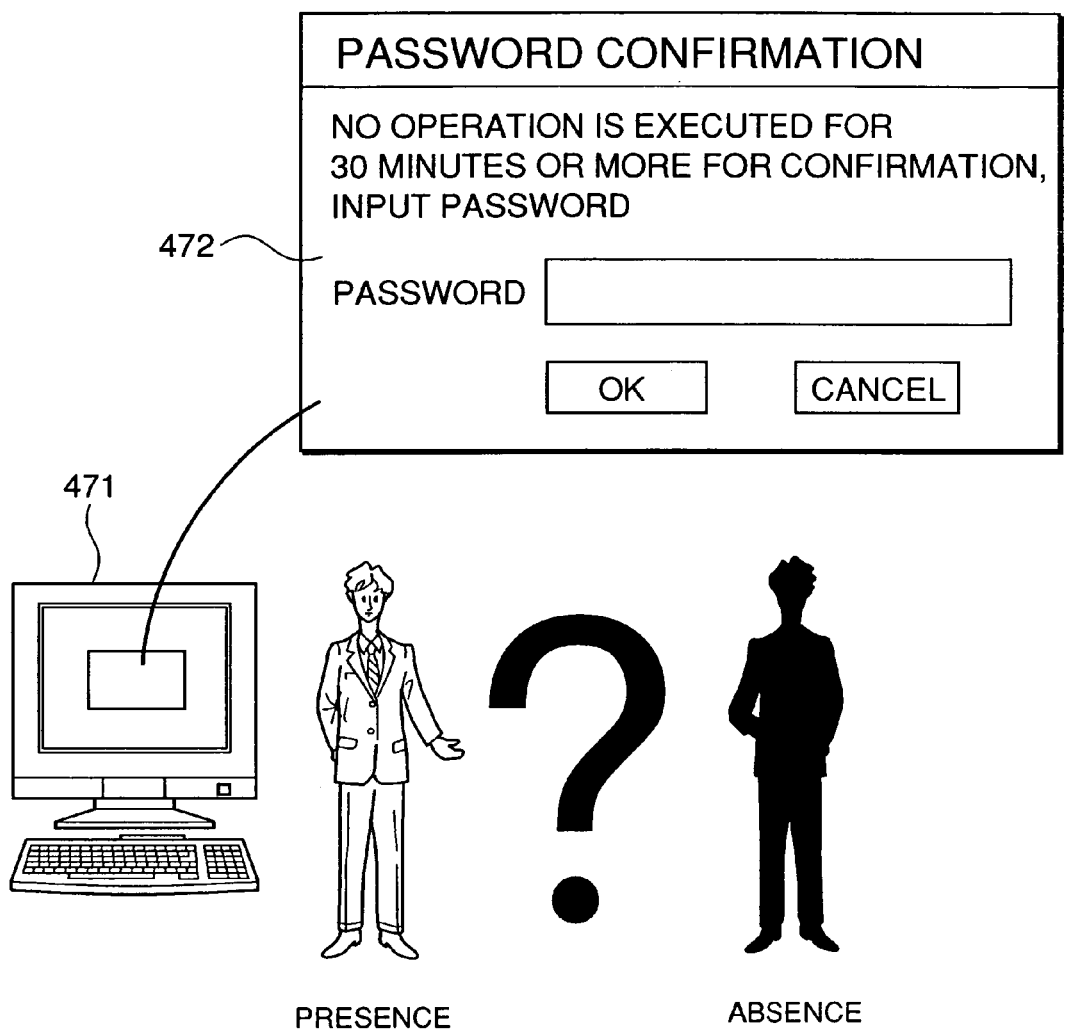
FIG. 47 is a diagram showing example processing performed when it is ascertained that whether or not a user is present is unknown.

In FIG. 47 is shown an example operating screen that is used, when it is ascertained that the presence of the user is unknown, to request confirmation of a password in order to determine whether the user is present nearby.

The process in FIG. 47 when the presence of the user is unknown can be performed when the mode is changed to the "presence unknown" mode in the user presence mode conversion processing in FIG. 43, which is initiated during the user presence determination/presence mode conversion processing in FIG. 33.

When even after employing the above described method the presence of the user continuous to be unknown, the mode is changed to the "presence unknown" mode, and a password confirmation process task, shown in FIG. 47, that can be performed in the "presence unknown" mode is added to the task table 14. Then, the password confirmation process task is initiated by the process execution unit 17 via the task analyzer 15 and the planning determination unit 16, and an operating screen 472 in FIG. 47 is displayed.

In the example in FIG. 47, confirmation of a password is requested because no manipulation by a user for predetermined period of time (30 minutes) has occurred and the presence of the user is unknown, This notice is effective because the presence of the user is unknown, and the purpose of the password confirmation operation can be attained. Therefore, when the mode is other than the "presence unknown" mode, another method is employed to confirm the password.

As is described above, according to the present invention, when the presence of a user is unknown, a process corresponding to this state, such as a password confirmation process, can be performed.

(Embodiment 20)

An example where a corresponding process is performed when it is ascertained that a contradiction exists as to the presence of the user.

Figure 48:
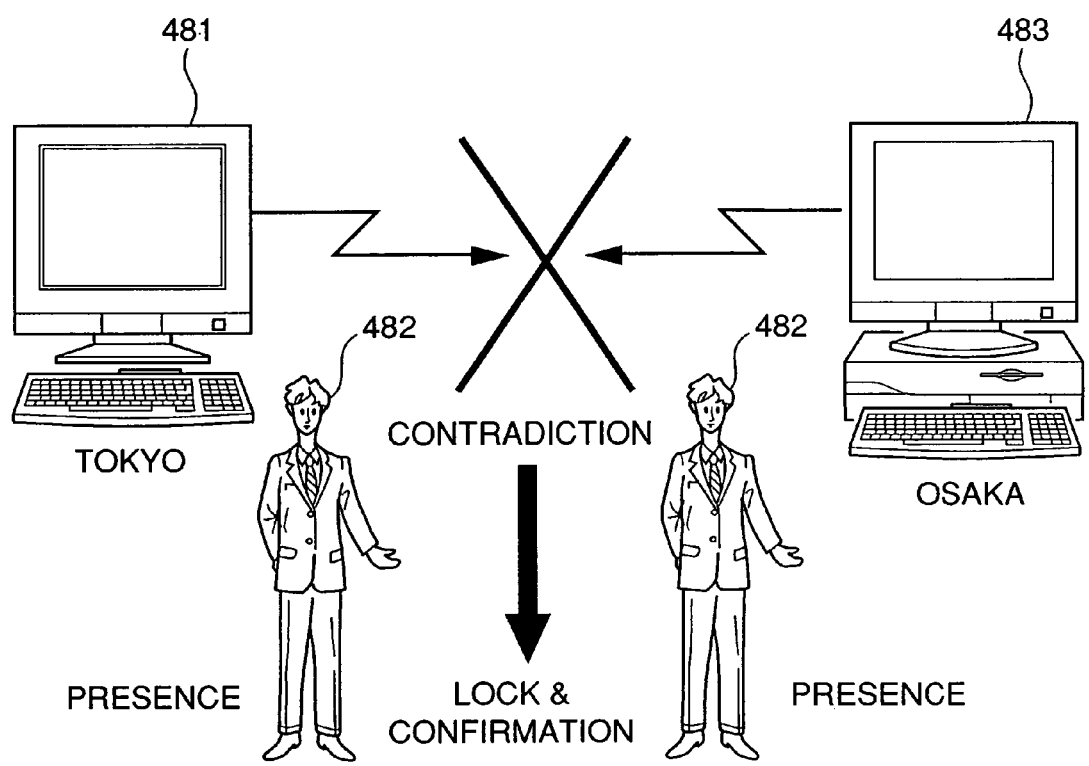
FIG. 48 is a diagram showing example processing performed when it is determined that a contradiction exists as to whether or not a user is present.

In the example in FIG. 48, when it is ascertained that a contradiction exists as to the presence of the user, the user's operation of the information processing apparatus is locked to inhibit illegal use, and the previously described password confirmation process is performed.

The user presence contradiction process in FIG. 48 can be performed when the mode is changed to the "presence contradiction" mode in the user presence mode conversion processing in FIG. 43, which is initiated during the user presence determination/presence mode conversion processing in FIG. 33.

When, as a result of the detection by the above described method, it is determined that a contradiction exists as to whether the user is present, the mode is changed to the "presence contradiction" mode, and the user's operation in FIG. 48 that can be performed in the "presence contradiction" mode is locked to inhibit illegal use. In addition, the previously described password confirmation process task is added to the task table 14. The user's operation is locked by the process execution unit 17 via the task analyzer 15 and the planing determination unit 16 in order to inhibit unauthorized use, and in addition, the above described password confirmation process task is initiated.

In the example in FIG. 48, for example, when existence data are transmitted at the same time from information processing apparatuses in Tokyo and Osaka indicting the user is present nearby, the occurrence of a contradiction is found, the user's operation is locked to inhibit the illegal use, and confirmation of the password is requested. This process is effective because a contradiction exists as to the presence of the user, and the purpose of the process can be attained. In a mode other than the "presence contradiction" mode, therefore, another method must be employed to perform the above processing.

As is described above, according to this embodiment, when a contradiction exists as to the presence of a user, the above described processing, which corresponds to such a state, can be performed.

(Embodiment 21)

Figure 49:
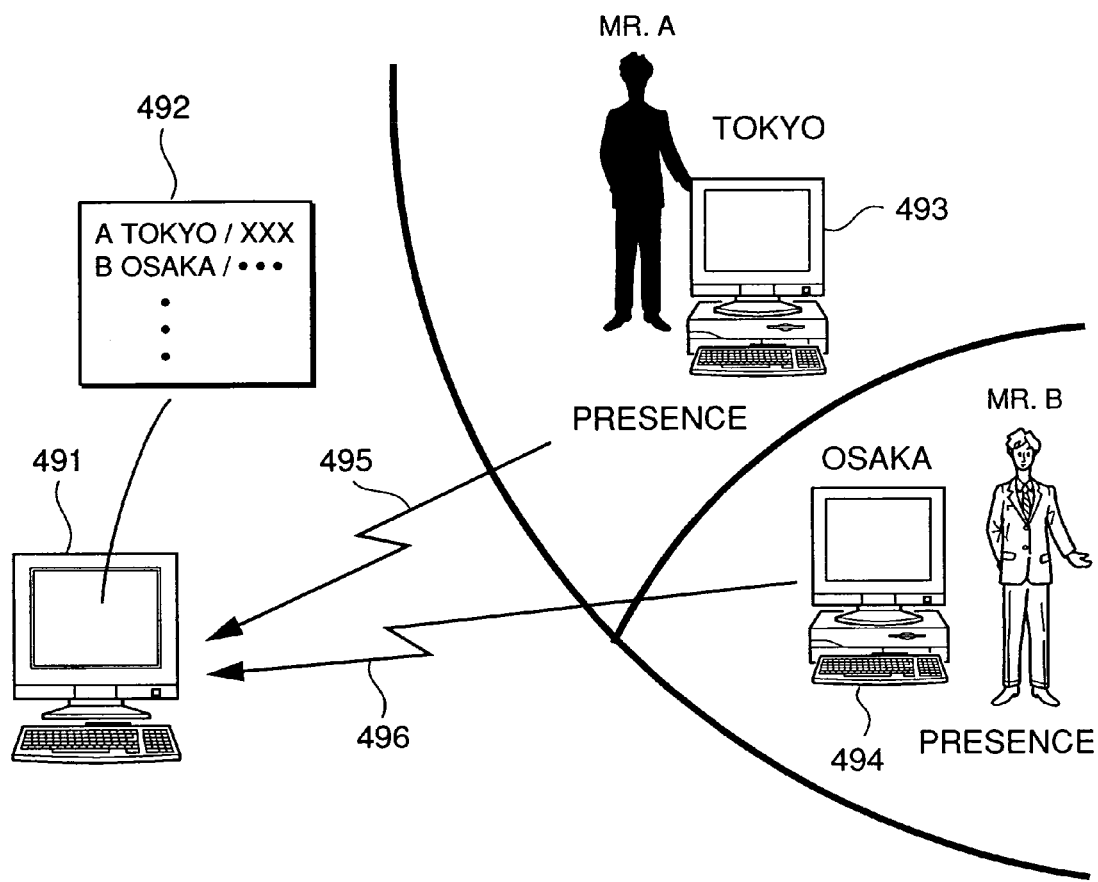
FIG. 49 is a diagram showing an example for displaying a location at which a user is present.

An explanation will now be given for an example where a remote location at which a user is present is displayed by an information processing apparatus. In FIG. 49 is shown an example information processing apparatus that can display the locations of users, such as group members. In the example in FIG. 49, the locations of Mr. A and Mr. B are displayed by an information processing apparatus 491.

As previously described, the user's presence data are transmitted to the information processing apparatus 491 in the process for the individual modes, which are changed in the user presence mode conversion process in FIG. 43 that is initiated by the user presence determination/presence mode conversion process in FIG. 33.

In the example in FIG. 49, for example, an information processing apparatus 493 in Tokyo detects the presence nearby of Mr. A, and transmits presence data 495 to the information processing apparatus 491. An information processing apparatus 494 in Osaka detects the presence nearby of Mr. B, and transmits presence data 496 to the information processing apparatus 491.

Upon the receipt of the presence data 495 and 496 for Mr. A and Mr. B, the information processing apparatus 491 stores and manages these data so that they can be displayed in response to an instruction by a user.

When a user instructs the information processing apparatus 491 to display the presence data for all the group members, the console unit 11 accepts the instruction and the task reception unit 13 adds to the task table 14 the user's present location display process task, which is to be performed by the process execution unit 17. Then, the user's present location display task is initiated by the process execution unit 17 via the task analyzer 15 and the planning determination unit 16, and a present location list 492 in FIG. 49 is displayed.

As is described above, according to this embodiment, the locations at which the individual users, such as group members, are present can be displayed.

Figures 50, 51:
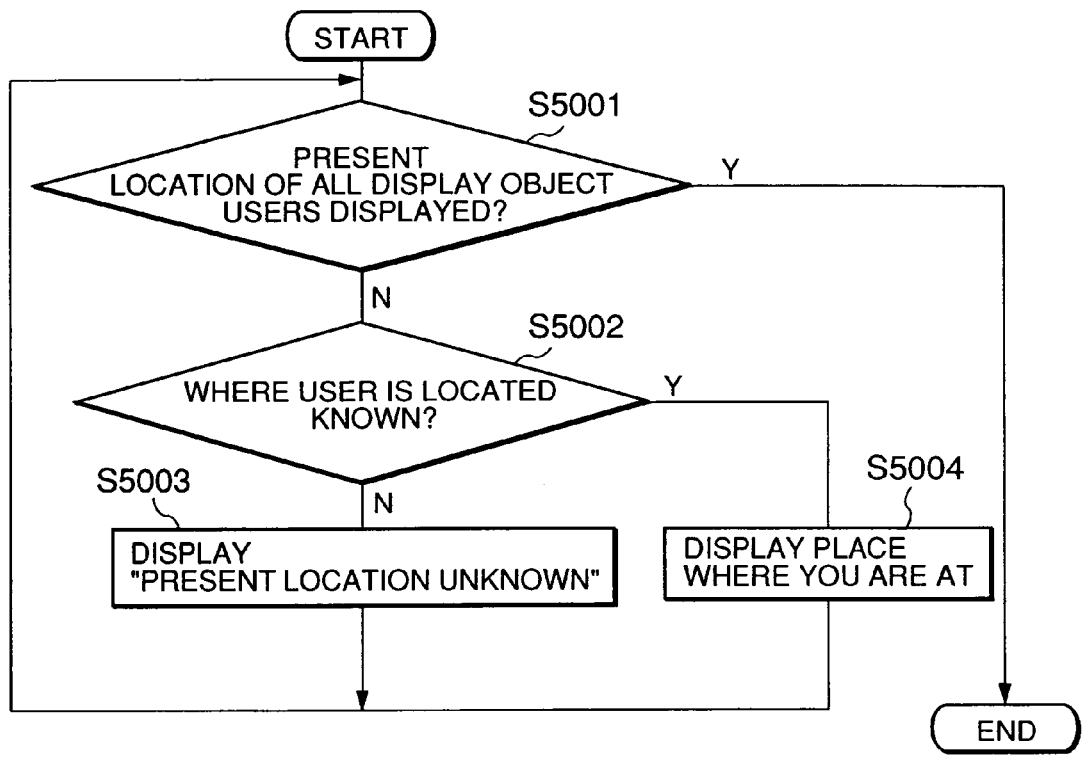
FIG. 50 is a flowchart showing the user's present location display processing.
FIG. 51 is a diagram showing example data for locations at which a user is present.

The processing for displaying a location at which a user is present will now be described. FIG. 50 is a flowchart showing the processing performed by the process execution unit 17 to display a location at which a user is present. FIG. 51 is a diagram showing example present location data that are referred to in the processing for displaying the location at which the user is present. For the individual present location data, included are the name of a user to be displayed and his present location.

When the processing for displaying the location at which a user is present is begun, first, at step S5001 a check is performed to determine whether the locations are displayed of all the users for which the present location data in FIG. 51 are stored. When the locations for all the users are displayed, the processing is terminated.

If there is a user whose location has not yet been displayed, program control moves to step S5002, whereat information is extracted concerning the users who are stored for whom the present location data in FIG. 51 is extracted, and a check is performed to determine whether the present location of the one user can be ascertained. If his present location is unknown, program control moves to step S5003 whereat "present location is unknown" is displayed. If his present location is ascertained, program control moves to step S5004 whereat the present location is displayed.

Program control then returns to step S5001, the above process is repeated, and finally, a present location list 492 shown in FIG. 49 is displayed. Since the present location for Mr. A is understood to be "Tokyo/xxxx", by referring to the present location data in FIG. 51, his location is displayed as is shown in FIG. 49.

As is described above, according to this embodiment, the presence/absence of a user is determined, and as a process corresponding to this state can be performed, usability can be considerably enhanced.

The presence/absence state of a user can be determined from a clear instruction entered by a user, an assumption made while referring to the information, information received from another information processing apparatus, and information concerning the user obtained by using a detector.

In consonance with when the user is present at his seat or is absent, corresponding processing can be performed. Further, in accordance with when the user is leaving his seat or has returned to his seat, a corresponding process can be performed.

In addition, in consonance with when the presence of the user is unknown or when a contradiction exists, when the presence/absence condition is obtained by making an assumption, a corresponding process can be performed. Furthermore, the present location of the user can be displayed. Also, the user presence data of an information processing apparatus can be employed to understand with which information processing apparatus the user was working, and a processing load imposed on the job information recovery process can be reduced.

(Embodiment 22)

Figure 52:
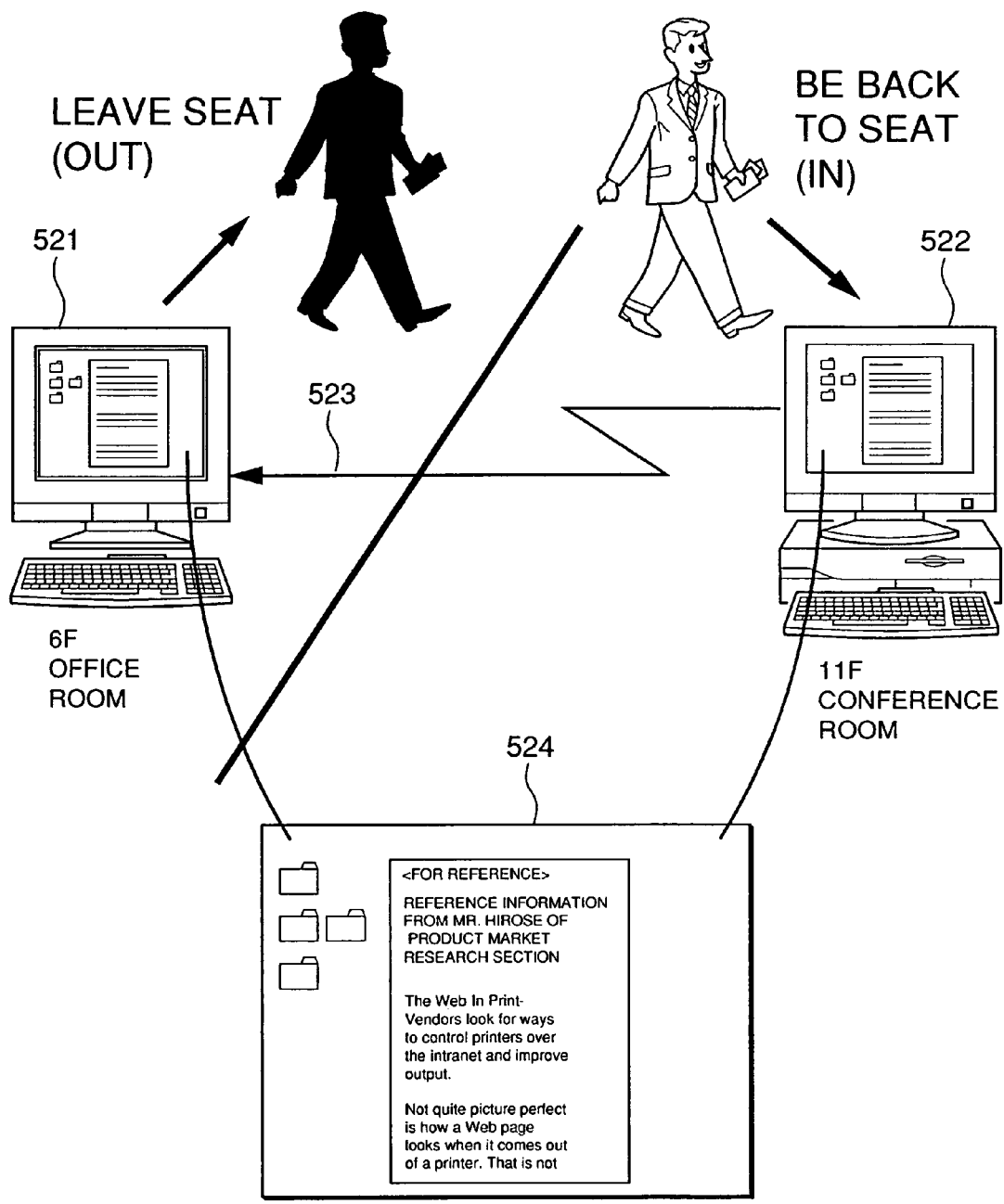
FIG. 52 is a diagram for explaining an example where a job interrupted at a specific information processing apparatus is recovered by another information processing apparatus.

An explanation will now be given for an example process where a job that was interrupted at an information processing apparatus 1 is recovered at an information processing apparatus 2. In the example in FIG. 52, a user, who is permitted to use a plurality of information processing apparatuses connected via a network, interrupts his job at an information processing apparatus 521. When the user resumes his interrupted operation at an information processing apparatus 522, at that apparatus 522 he recovers the job that was interrupted at the information processing apparatus 521.

As previously described, information concerning the mode designation of "leaving the seat", which reflects an act by a user at the information processing apparatus 521, is accepted by the console unit 11, and is added to the task table 14 by the task reception unit 13. Then, the user presence determination/presence mode conversion processing in FIG. 33 is initiated by the process execution unit 17 via the task analyzer 15 and the planning determination unit 16. In this processing, the mode is changed from "present" to "leaving the seat".

At this time, for the process performed in the "leaving the seat" mode, a user's job condition 524 when he left his seat is stored, and information indicating that the user left his seat is transmitted as presence data 523 to the information processing apparatus 522.

Information concerning the mode designation "returning to seat", which reflects an act by the same user at the information processing apparatus 522, is accepted by the console unit 11, and is added to the task table 14 by the task reception unit 13. Then, the user presence determination/presence mode conversion processing in FIG. 33 is initiated by the process execution unit 17 via the task analyzer 15 and the planning determination unit 16. In this processing, the mode is changed from "absent" to "returned to seat".

At this time, for the process performed in the "returning to seat" mode, it is understood that the same user was left the information processing apparatus 521, and the job condition 524 is acquired from the information processing apparatus 521. Thus, the job condition 524 can be recovered at the information processing apparatus 522.

In this example, since the user left the information processing apparatus 521 before he returned to the information processing apparatus 522, the condition 524 for the job performed at the information processing apparatus 521 is recovered. If a user did not use any information processing apparatus before he returned to his seat, the job condition that existed when the user left the information processing apparatus 522 is recovered.

As is described above, according to this embodiment, when a user, who is permitted to use a plurality of information processing apparatuses connected via a network, interrupts a job at the information processing apparatus 1 and then resumes the job at the information processing apparatus 2, not only can the user recover the job at the information processing apparatus 2, but also at the information processing apparatus that he is going to use, he can recover the previous job condition, unless he employed another information processing apparatus during the period between the time he left his seat and the time he returned to it.

Figure 53:
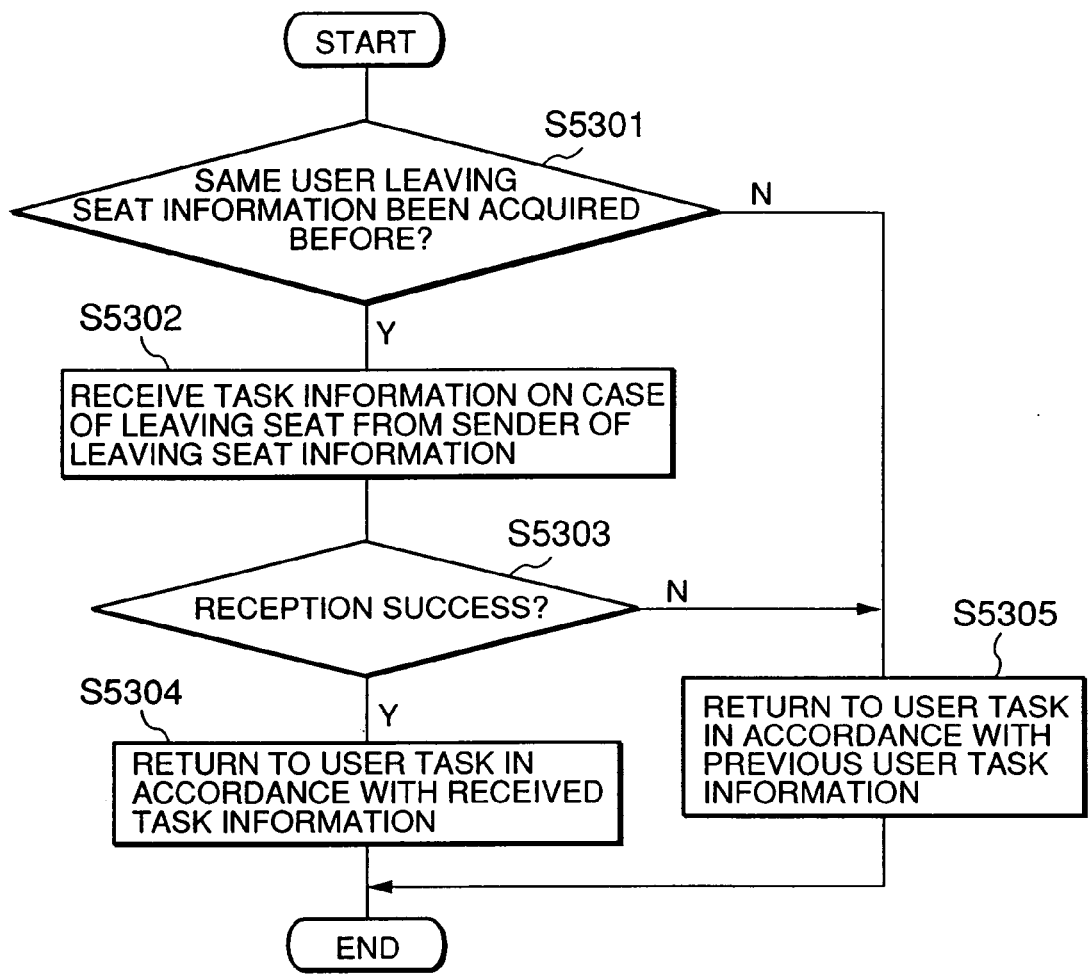
FIG. 53 is a flowchart showing remote job recovery processing.

The remote control process for recovering a job will now be described in order to implement the above described operation. FIG. 53 is a flowchart showing the remote control processing performed by the precess execution unit 17 for recovering a job.

As previously described, when the user left the information processing apparatus 521, the presence data 523 indicating that the user left the seat are transmitted to the information processing apparatus 522. When the same user returned to the information processing apparatus 522 later, the remote control processing for recovering a job in FIG. 53 is begun.

When this processing is initiated, first, at step S5301 a check is performed to determine whether leaving-seat information for the same user was received before. When such data were received before, program control moves to step S5302. When such data were not received before, program control moves to step S5305, whereat the job data acquired when the user left his seat previously, which are held by the subject information processing apparatus, are recovered. The processing is thereafter terminated.

At step S5302, a request for transmission of job condition data for the user when he left his seat is transmitted to the transmission source that previously transmitted the leaving-seat data, and thus the job condition data obtained when the user left his seat are obtained. When at step S5303 the receipt of the job data is successful, program control advances to step S5304. When the receipt of such data fails, program control moves to step S5305.

At step S5304, the received job condition data are employed to recover the job condition when the user left his seat, and the processing is thereafter terminated. In the example in FIG. 52, when the user has left his seat, the information processing apparatus 521 stores the job condition 524 and transmits to the information processing apparatus 522 the presence data 523 indicating that the user left his seat. Therefore, when the user returned to the information processing apparatus 522, at step S5301 it is ascertained that presence data reflecting that the user left his seat were previously received. At step S5302 the job condition data 524 extent when the user left his seat are received, and at step S5304, the job condition is recovered. The processing is thereafter terminated.

When neither information processing apparatus received presence data reflecting that the user left his seat, program control moves to step S5305, whereat the information processing apparatus 522 recovers the job condition extent when the user left his seat. The processing is thereafter terminated.

In the above example, the information processing apparatus that the user left transmits presence data to that effect to another information processing apparatus. However, if a user can employ multiple information processing apparatuses connected across a network, a transmission destination for presence data may be regarded as a specific server on the network, and the information processing apparatus that the user left may obtain presence data from this server. Instead of the presence data, the job condition data may be transmitted to the server.

According to the above described embodiment, the job condition can be recovered at a different information processing apparatus connected via a network, and as the job can be resumed across a plurality of information processing apparatuses, useability can be enhanced.

(Embodiment 23)

An example where optimal information consonant with a situation is reported will now be described. In this embodiment is reported associated information that a user should recall in consonance with a situation.

Figure 54:
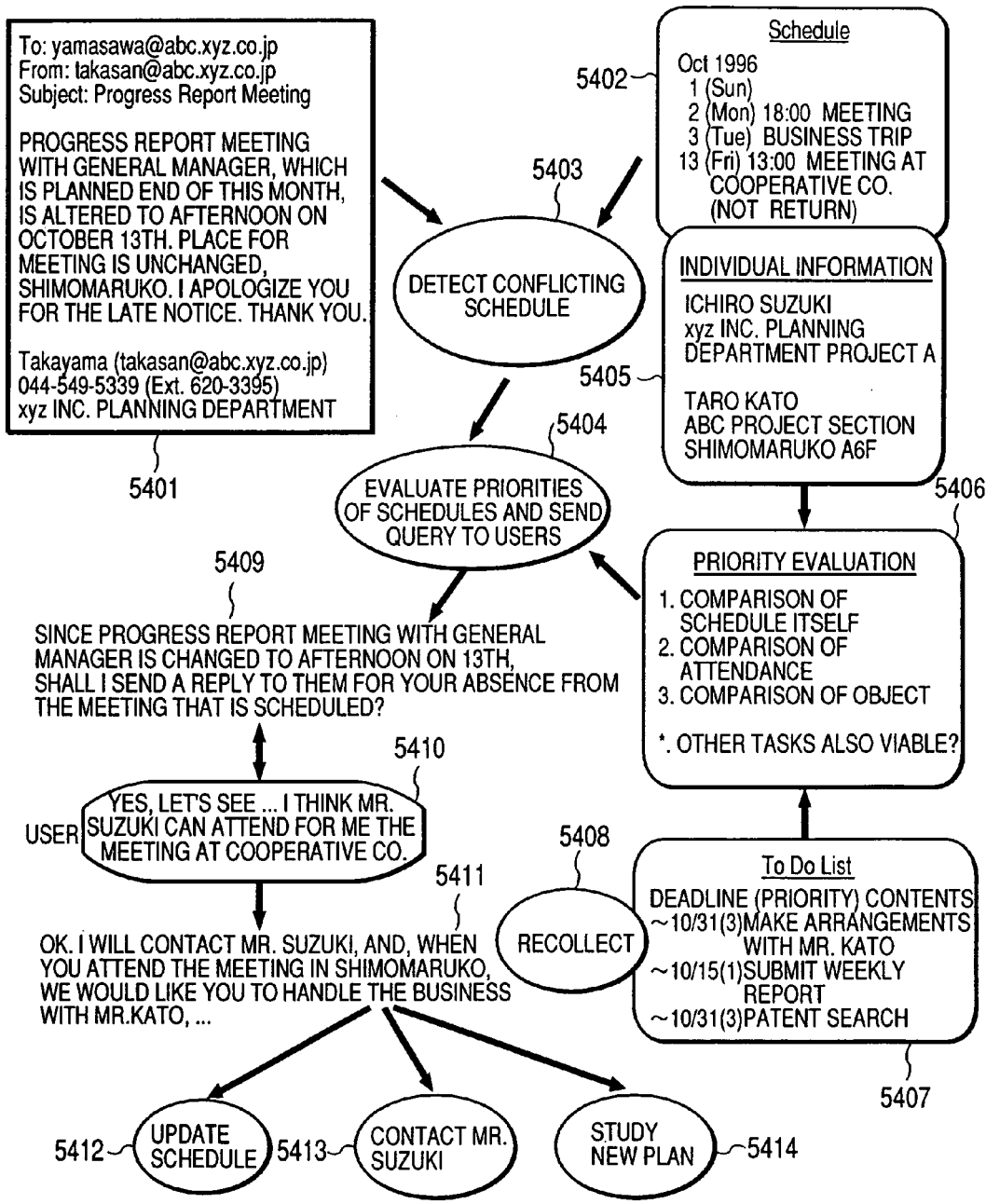
FIG. 54 is a diagram for explaining an example when optimal information consonant with a situation is reported.

FIG. 54 is a diagram for explaining an example where optimal information consonant with a situation is reported. In the example in FIG. 54, schedule data are extracted from received E-mail 5401, and detection 5403 of a conflict with a schedule previously stored in a schedule list 5402 is performed.

While personal information 5404 is referred to, evaluation 5404 for the priority level of the schedule is performed using a knowledge base 5406 for evaluation of a priority level, and a query 5409 to a user is issued. Then, a response 5410 is received from a user, and in accordance with an included instruction, processing for a response 5411, schedule updating 5412, learning of new plan 5414, and contacting of a third party 5413 are performed.

In a recollection process 5408 performed by the process execution unit 17, to remind a user of work to be performed, by referring to a user's To Do List, work that can be performed at the user's destination is extracted and is included in the response 5411.

As is described above, when a process, such as the schedule updating 5412, is performed by the process execution unit 17, the recollection process is initiated.

Figure 55:
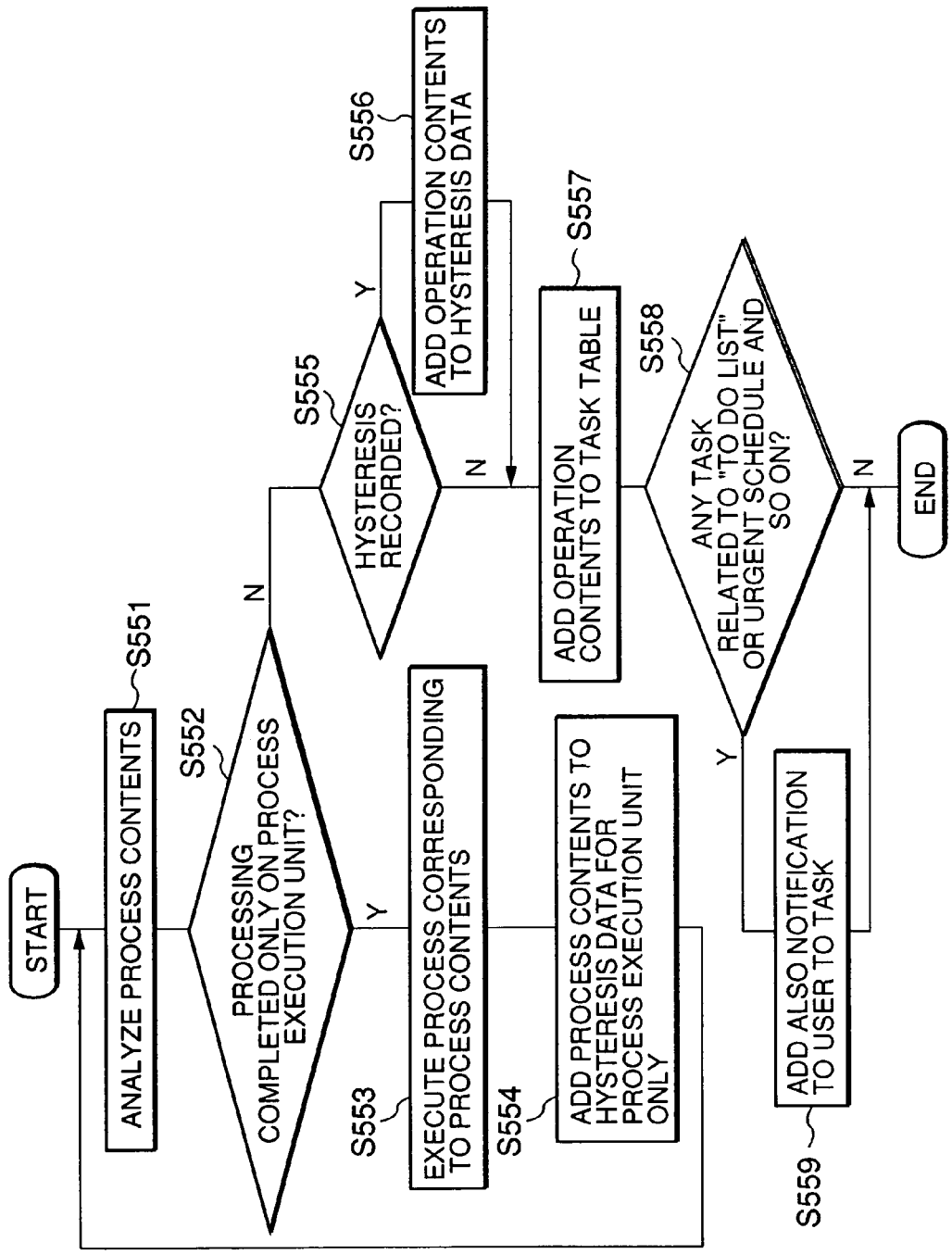
FIG. 55 is a flowchart showing recall processing.

The recollection process will now be explained while referring to the flowchart in FIG. 55.

When the updating of a schedule is requested, the process execution unit 17 is activated, and at step S551 the contents of an operation are analyzed. When at step S552 it is ascertained that the operation can be completed by only the process execution unit 17, program control advances to step S553. When the external process is required, program control moves to step S555.

At step S553, a process corresponding to the contents of the operation, the updating of the schedule in this case, is performed. At step S554, information concerning the contents of the operation is added to the hysteresis data in the process execution unit 17. When this hysteresis data in the process execution unit 17 is employed, canceling (UNDO) and repeating (REDO) of the operation can be performed. Program control thereafter returns to step S551, and the remaining process is continued.

If at step S552 the performance of a process outside the process execution unit 17 is required, program control moves to step S555, whereat a check is performed to determine whether, for saving the hysteresis, the original hysteresis number is valid which is designated as a task that corresponds to the process that was performed, so that whether or not hysteresis should be saved is decided.

When it is ascertained that the hysteresis should be saved, program control advances to step S556, whereat the contents of the operation are added to the hysteresis data 19 via the hysteresis data manager 18, and the hysteresis number is acquired. When at step S556 the hysteresis data are added, at step S557 the hysteresis number returned by the hysteresis data management unit 18 is set as the original hysteresis number for the task, and is added to the task table 14. When, at step S555, it is ascertained that the hysteresis need not be saved, an invalid value is set as the original hysteresis number for the task, and is added to the task table 14.

In the above processing, at step S558 a check is performed to determine whether information associated with the process exists in a To Do List 5407 or in a schedule 5402. If such information is present, at step S559, a notification task for reminding the user of information, is added to the task table 14. The processing is thereafter terminated.

In the example shown in FIG. 54, the task informing "meeting with Mr. Kato", which is a work to be possibly done at Shimomaruko, which is the same place as a renewed schedule of "progress reporting conference" be held will be added to the task table 14.

In the leaving-seat process in FIG. 45, for example, the current time 453, 14:50, is compared with the schedule of the user 451, "15:00 chief meeting". So long as the reason that the user 451 leaves the seat is to attend the meeting, no problem occurs. If the user 451 leaves the seat for another reason, it is understood that the user may forget the meeting. Thus, the task of notifying the user 451 using message 454, "15:00 Chief meeting at A111 conference room" is added to the task table 14.

In the above example, the schedule for the identical location or the schedule for a time close to the current time are reported. An activity performed for the same person (query to one of the attendees at a meeting, while not referring to the contents of the meeting) or an activity for which time still remains (a meeting that a user should attend after another meeting) may be reported to a user.

In the above described embodiment, the optimal notice consonant with the situation can be issued. The notification time must not be designated in advance by a user, and usability can be improved. The notification of conditions other than time, such as the issuance of a notification when the user leaves his seat, can be employed to provide a flexible notification procedures consonant with an exact situation.

(Embodiment 24)

Figure 56:
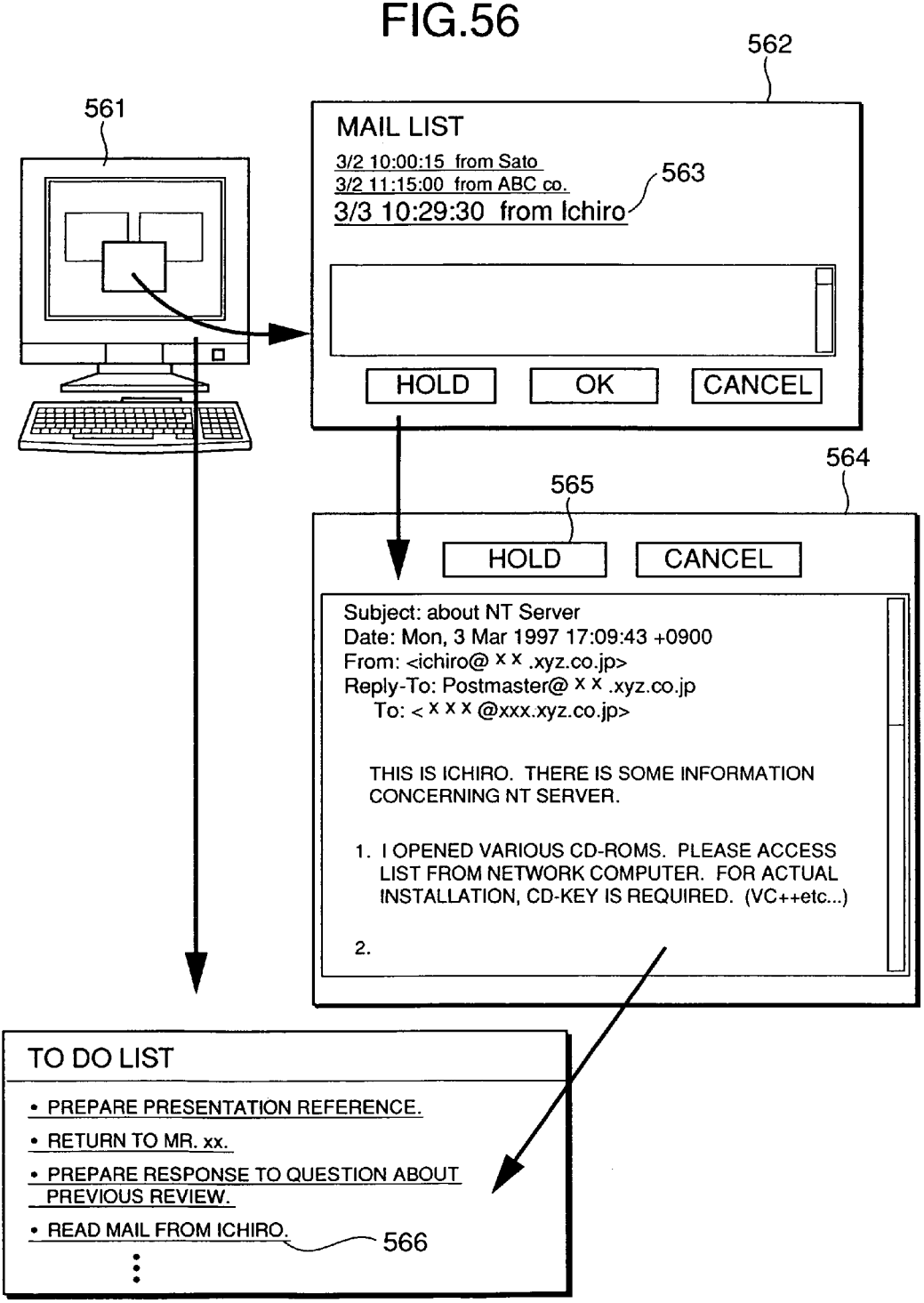
FIG. 56 is a diagram showing an example where an optimal task is added or stored in consonance with a situation where a user has issued a pending instruction.

FIG. 56 is a diagram showing an example where an optimal task is added/stored in consonance with the situation where a user has issued a pending instruction.

In the example in FIG. 56, when mail "3/3 10:29:30 from Ichiro" 563 is selected from a mail list 562 displayed on an information processing apparatus 561, and the contents of the mail 563 is displayed, a HOLD button 565 is depressed in order to perform a reference search and correction for the mail or to interrupt another operation. In this embodiment, a job resumption task, such as "read mail from Ichiro" 566 in FIG. 56, is added and is stored in the To Do List.

As is described above, when a pending instruction is issued during a process, such as mail reference 564, performed by the process execution unit 17, the pending process, which is the essential element of this embodiment, is performed, and a job resumption task is added to the To Do List of the user.

In the above described embodiment, since the optimal task is added and stored in consonance with the issuance of a pending instruction by a user, usability can be considerably enhanced.

Figure 57:
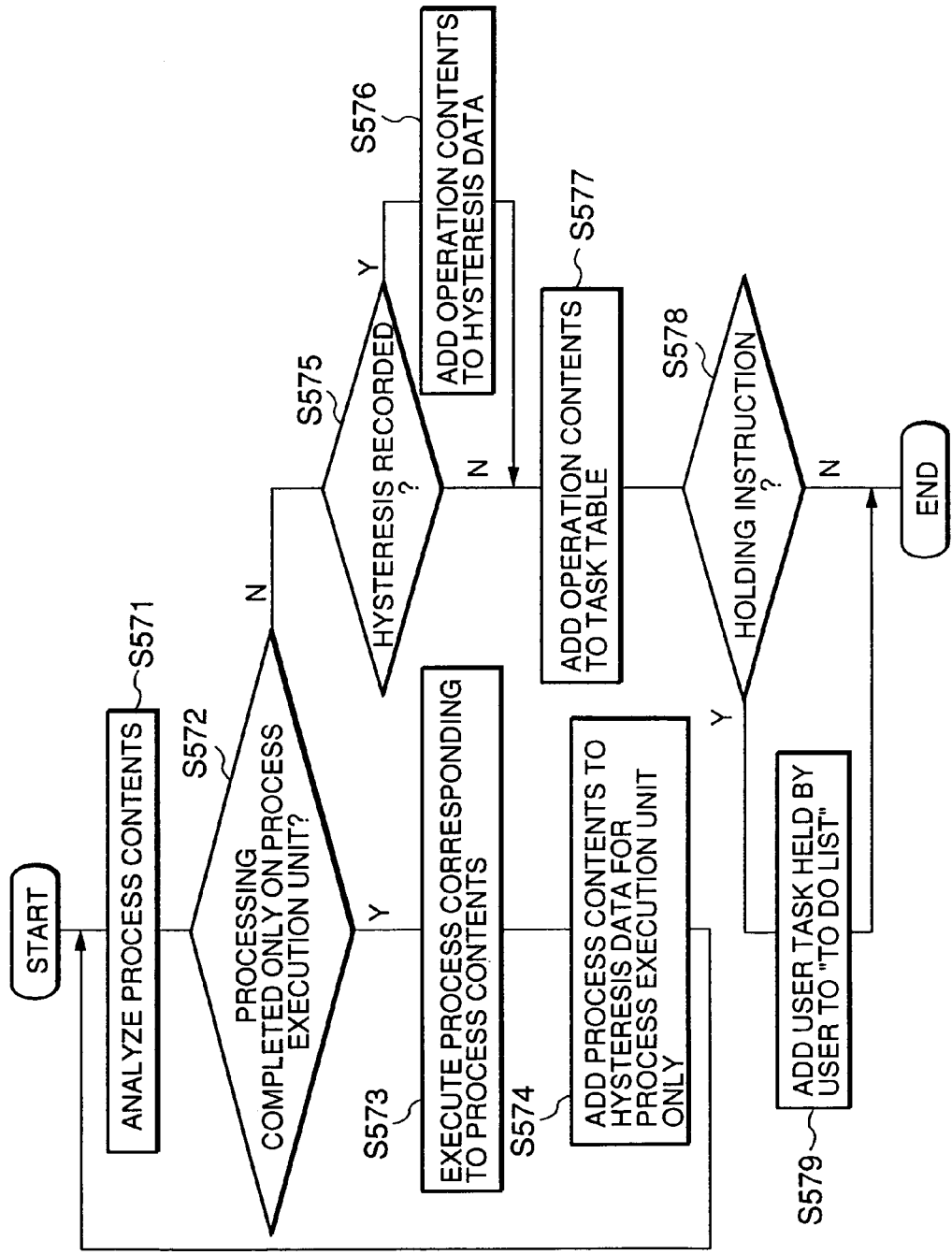
FIG. 57 is a flowchart for pending processing.

FIG. 57 is a flowchart showing the pending processing performed by the process execution unit 17.

An explanation will now be given for an example where the pending process is initiated by the process execution unit 17 at the same time the process 564 for referring to mail is performed.

When the process execution unit 17 is activated, at step S571 the contents of an operation are analyzed. When, at step S572, it is ascertained that the operation can be completed by only the process execution unit 17, program control advances to step S573. When an external process is required, program control moves to step S575.

At step S573, a process corresponding to the contents of the operation, the mail reference in this case, is performed. At step S574, information for the contents of the operation is added to the hysteresis data in the process execution unit 17. When this hysteresis data in the process execution unit 17 is employed, canceling (UNDO) and repeating (REDO) of the operation can be performed. Program control thereafter returns to step S571, and performance of the process is continued.

If, at step S572, the performance of a process outside the process execution unit 17 is required, program control moves to step S575, whereat a check is performed to determine whether, for saving of the hysteresis, the original hysteresis number is valid which is designated as a task that corresponds to the process that was performed, so that whether or not hysteresis should be saved is decided.

When it is ascertained that the hysteresis should be saved, program control advances to step S576, whereat the contents of the operation are added to the hysteresis data 19 via the hysteresis data manager 18, and the hysteresis number is acquired. When, at step S576, the hysteresis data are added, at step S577 the hysteresis number returned by the hysteresis data management unit 18 is set as the original hysteresis number for the task and is added to the task table 14. When, at step S575, it is ascertained that the hysteresis need not be saved, an invalid value is set as the original hysteresis number for the task and is added to the task table 14.

In the above processing, when at step S578 it is ascertained that there is a user instructed pending process, at step S579, the task for resuming the above process is added to the To Do List. The processing is thereafter terminated.

In the example in FIG. 56, since the pending process was instructed while referring to the E-mail from Ichiro, the task "read mail from Ichiro" is added to the To Do List.

Figure 58:
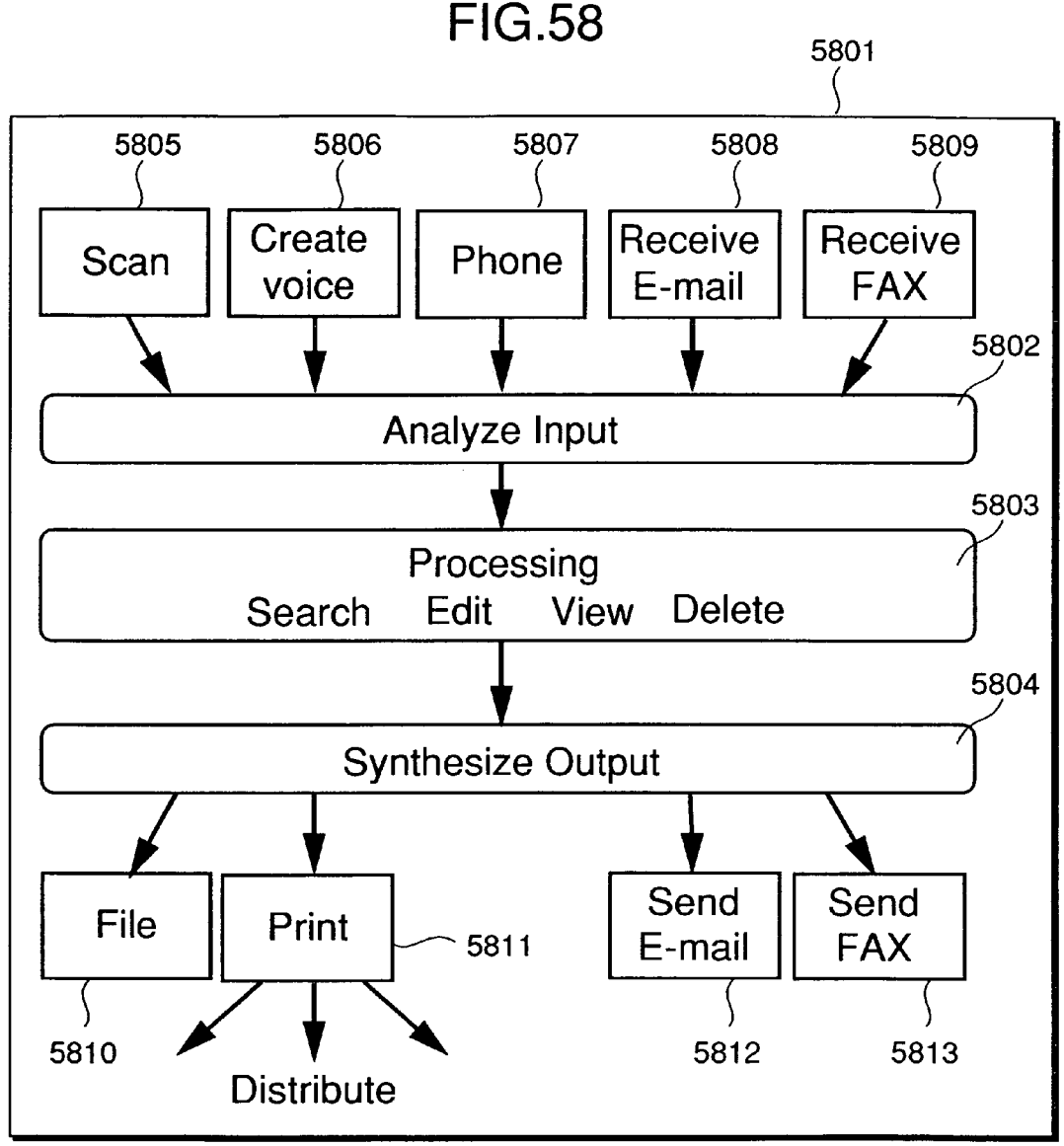
FIG. 58 is a diagram illustrating the general arrangement of an information processing apparatus that can add or store an optimal task in accordance with a situation.

FIG. 58 is a diagram illustrating the entire arrangement, according to this embodiment, of an information processing apparatus that can add and store an optimal task in consonance with a situation. In an information processing apparatus 5801, an input analyzer 5802 analyzes data input by various input devices, such as a scanner 5805, a voice input unit 5806, a telephone 5807, E-mail 5808 and a facsimile machine (FAX) 5809, a processor 5803 performs the searching, editing, referencing and deleting processes, and a synthesizer 5804 synthesizes/converts data as needed and outputs the resultant data to various output devices, such as a file 5810, a printer 5810, E-mail 5812 and a facsimile 5813.

During the input, analyzation, data processing, synthesization and output procedures, a process that is assumed to be necessary is added to the task table 14, and a task associated with a user is added to the To Do List that the user can read.

As a result, an optimal task in consonance with the situation can be added and stored.

Figure 59:
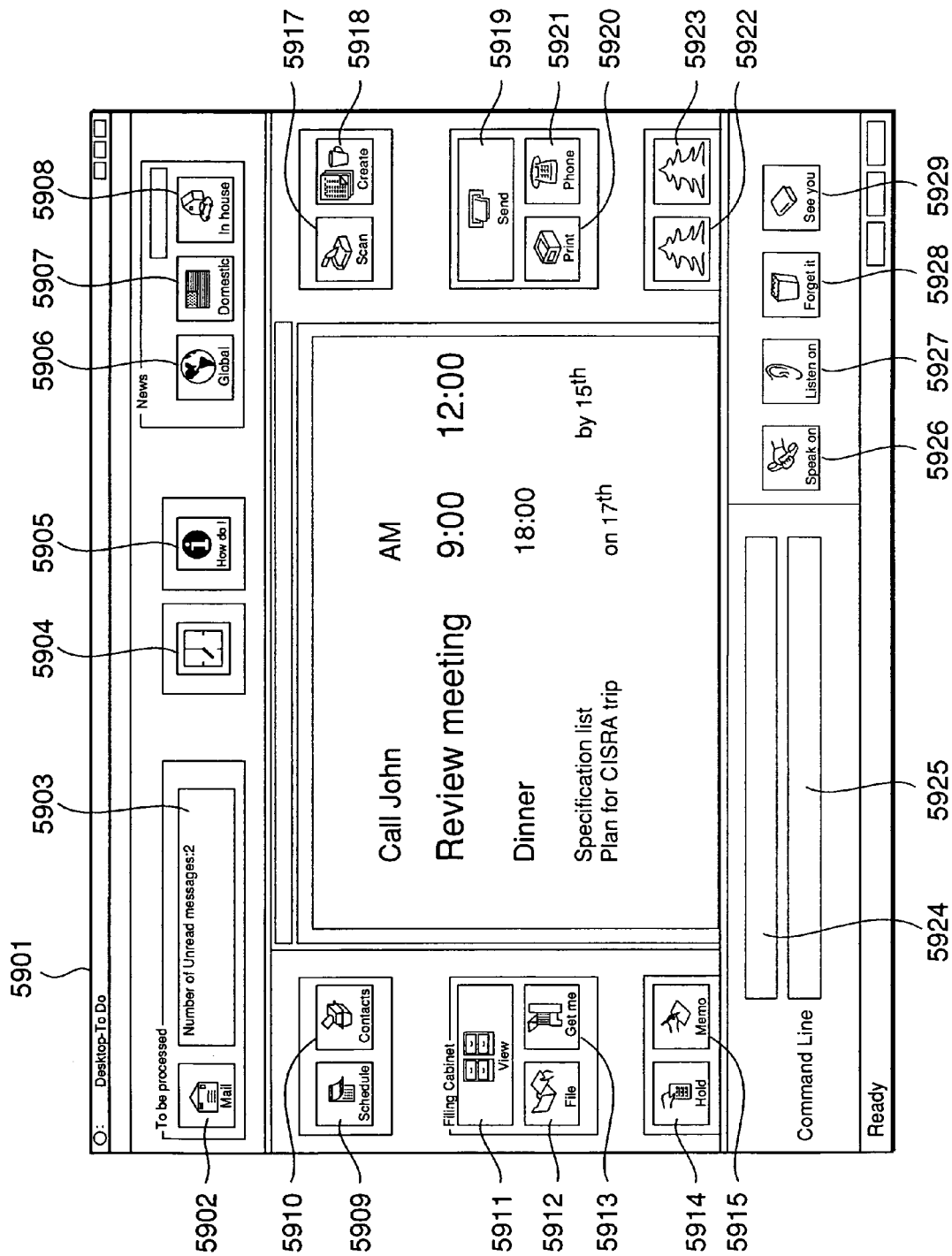
FIG. 59 is a diagram showing an example operating screen.

FIG. 59 is a diagram illustrating an example operating screen of an information processing apparatus that can add and store an optimal task in consonance with the situation.

In FIG. 59, various operation buttons are displayed, such as those for an E-mail list display instruction 5902, an E-mail summary display 5903, a clock 5904, help 5905, news displays 5906 to 5908, a schedule 5909, an address list 5910, a filing cabinet 5911, a file 5912, a search for various data 5913, pending 5914, a note 5915, display and operation of various data 5916, retrieval 5917, creation 5918, transmission 5919, printing 5920, a telephone 5921, application activations 5922 to 5923, a notification data display 5924, natural language input 5925, an oral operation 5926, an oral response 5927, a deletion 5928 and quit 5929.

As a result of the process performed in response to the instruction entered on the operating screen, or upon the entry of an instruction, a process that is assumed to be required is added to the task table 14, and a task associated with the user is added to the To Do List that the user can read.

As is described above, for each process, an optimal task in consonance with the situation can be added and stored.

In this embodiment, when a pending instruction is issued during the processing, as a task for resuming a process that is being held is registered in the execution list without an explicit key manipulation directing the addition and storage of the task being required, usability can be drastically increased.

(Embodiment 25)

Figure 60:
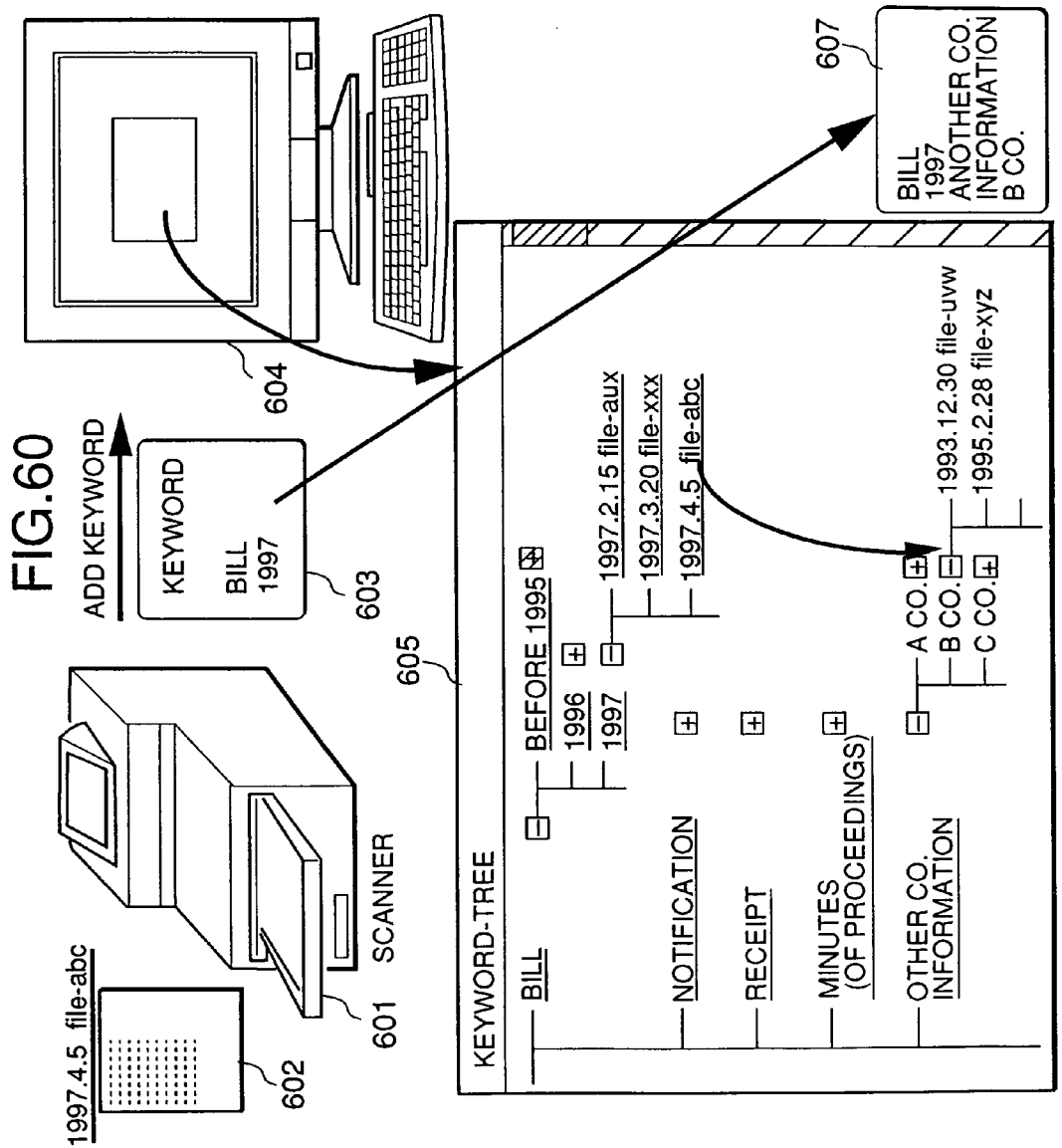
FIG. 60 is a diagram illustrating key word update processing.

FIG. 60 is a diagram for explaining a moving and copying process, with an automatic index provision, that is performed to display a dynamic tree based on file attributes and to update the file attributes in accordance with the moving and copying performed on the display.

In the example in FIG. 60, in response to the input of data by a user, or by the reading characters and code that are written at a predetermined location of an image that is scanned, a keyword 603 is provided for a file "1997.4.5, file-abc" 602 that is read by a scanner 601.

In the above procedures, in response to the use of a keyword, a file list stored and managed by an information processing apparatus 604 is displayed in the form of a dynamic tree 605. When the user selects "1997.4.5 file-abc" from among the files on the display, and enters a moving or copying instruction 606, "Another company information" and "B Co.", which are keywords for moving or copying destinations, are added to the file "1997.4.5 file-abc", as is shown in a keyword list 607.

As is described above, only moving and copying manipulation of the keyword tree 605 need be performed to add attributes, such as keywords for a moving and copying destination.

According to this embodiment, as the dynamic tree based on the file attributes is displayed and the attributes of files are updated in accordance with the moving or copying of data on the display, useability can be improved.

Figure 61:
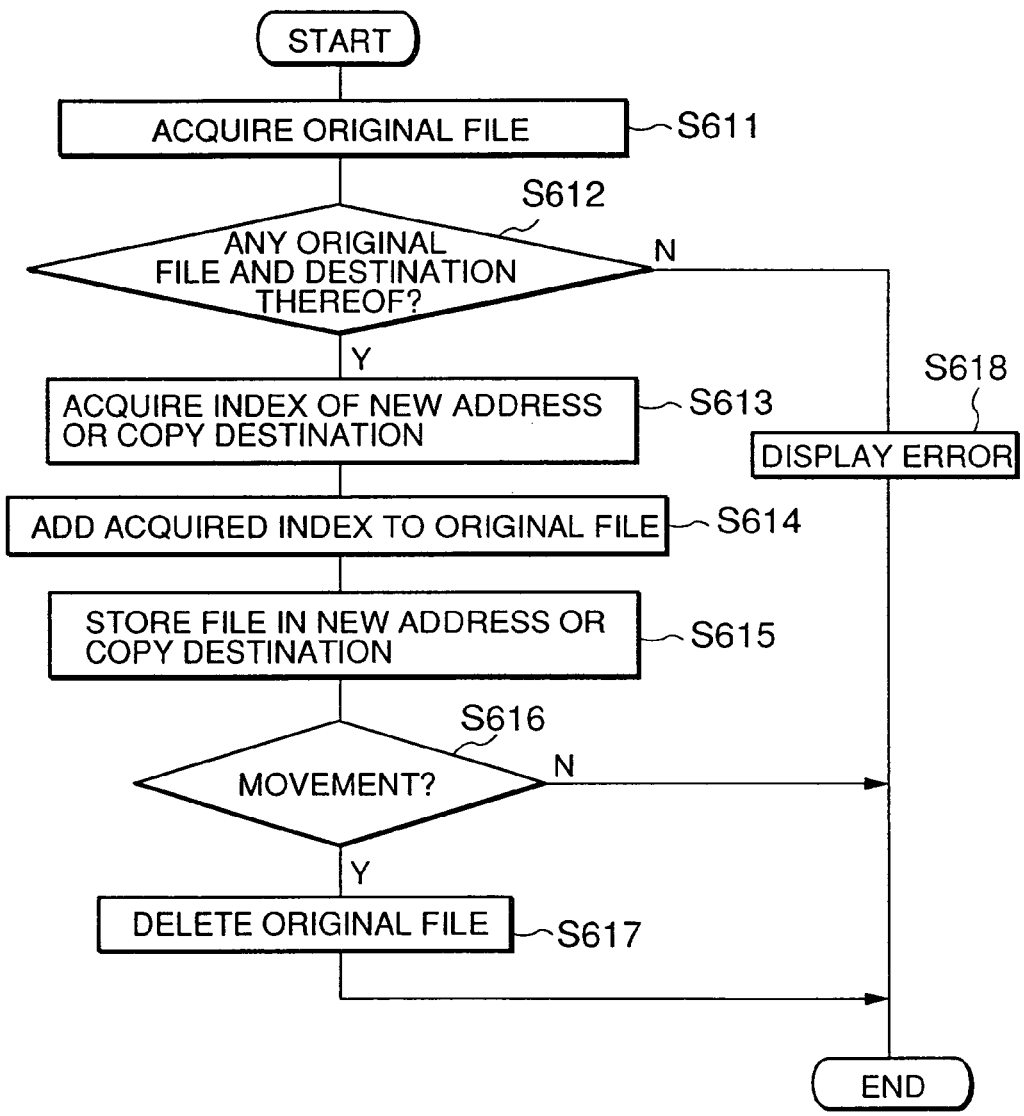
FIG. 61 is a flowchart showing automatic index movement/copy processing.

FIG. 61 is a flowchart showing the moving and copying processing performed with an automatic index provision. This processing will now be described while referring to this flowchart.

When the moving and copying processing with an automatic index provision is initiated, first, at step S611 a user acquires an original file for which moving or copying is designated. At step S612, a check is performed to determine whether the original file designated by the user and the moving or copying destination are valid. When both are valid, program control moves to step S613. When both are invalid, program control moves to step S618, whereat an error message is displayed, and the processing is thereafter terminated.

At step S613, an index at the moving or copying destination is obtained, and at step S614 the obtained index is added to the index of the original file. At step S615, the file is stored at the moving or copying destination, and at step S616 a check is performed to determine whether the user instructed the moving of the file. When the user instructed the moving of the file, program control advances to step S617, whereat the original file is deleted and the processing is thereafter terminated. At this time, when the keyword or the index provided for the original file is deleted from the moving destination file, the keyword or the index of the original file can be replaced with those for the moving destination.

In the example in FIG. 60, the moving or copying source file is "1997.4.5 file-abc". The keyword or the index data for the moving or copying destination, "Another company information, B Co.", are added to the original keyword or the index data for the file, "Bill, 1997", 603 to thereby obtain the updated keyword or index data, "Bill, 1997, Another company information, B Co". 607.

In the above process, while viewing the entire file that is stored and managed, the user can add, delete or update a necessary keyword, and usability can be considerably enhanced.

According to the above described embodiment, a dynamic tree based on the attributes of the file can be displayed, and the attributes of the file can be updated in accordance with those for the file moving or copying destination shown on the display.

(Embodiment 26)

Figure 62:
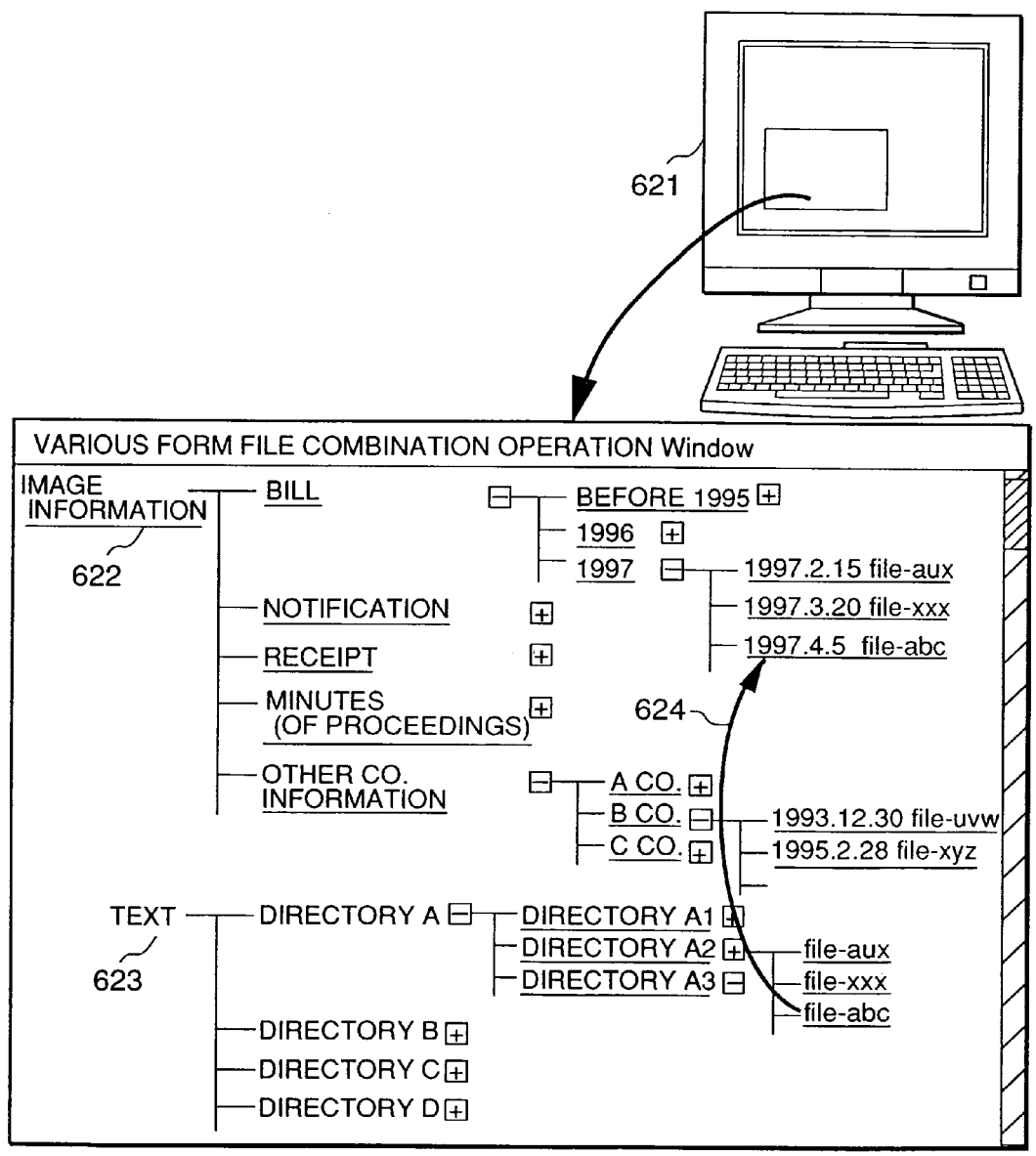
FIG. 62 is a diagram illustrating the processing for various form file combinations.

FIG. 62 is a diagram for explaining an example of the processing performed for a combination of files having different forms, in a situation where moving and copying between files having different forms can be performed.

In the example in FIG. 62, a file list is displayed using a tree for each file form on an information processing apparatus 621 that can store and manage files having a plurality of different forms, such as an image file 622 and a text file 623.

The user selects a text file, "file-abc", from the file list, and employs a mouse to enter an instruction 624 to move or copy it to the image data tree. Then, the selected file is converted from a text file, which is the moving or copying source file form, into an image data file, which is a moving or copying destination file form, and the resultant file is moved or copied into "1997.4.5 file-abc".

As is described above, only the moving or copying operation on the operating screen in FIG. 62 need be performed to convert the file into a file form for a moving or copying destination.

FIG. 63 is a flowchart showing the different file form combination processing. This processing will now be described while referring to the flowchart.

When the different file form combination processing is initiated, first, at step S631 a user acquires an original file for which moving or copying is designated. At step S632, a check is performed to determine whether the original file designated by the user and the moving or copying destination are valid. When both are valid, program control moves to step S633. When both are invalid, program control moves to step S638, whereat an error message is displayed and the processing is thereafter terminated.

At step S633 a format, such as a file form for a moving or copying destination, is acquired, and at step S634, the original file is converted into the obtained format.

At step S635, the file is stored at the moving or copying destination, and at step S636, a check is performed to determine whether the user selected the moving of the file. When the user selected the moving of the file, program control goes to step S637, whereat the original file is deleted and the processing is thereafter terminated.

In the example in FIG. 62, since the source file to be moved or copied, "file-abc", has a text format and a file for the moving or copying destination has an image data format, at step S634 the original file is converted to the image data format before the moving or copying process is begun.

Through the above processing, as the user can change the format of a required file, while viewing the entire file that is stored and managed, useability can be considerably improved.

According to the above described embodiment, the file form can be changed in association with the moving and copying of the file on the display. In addition, the moving and copying of files having different file forms can be easily performed.

The present invention can be applied to a system that is constituted by a plurality of devices (e.g., a computer main body, an interface device and a display), or to an apparatus that includes a single device.

The following is also included within the scope of the present invention: in order to operate various devices to implement functions in the above embodiment, software program code for implementing the functions in the previous embodiments are supplied to a computer in an apparatus, or in a system that is connected to various devices, and in consonance with the program, the computer (or a CPU or an MPU) in the system or the apparatus operates the devices to accomplish the functions included in the above embodiments. In this case, the program code read from a memory medium accomplishes the functions of the above described embodiments. And the program code and means for supplying the program code to the computer, e.g., a memory medium on which such program code is recorded, constitute the present invention.

A memory medium for supplying such program code can be, for example, a floppy disk, a hard disk, an optical disk, a magneto optical disk, a CD-ROM, a CD-R, a magnetic tape, a nonvolatile memory card, or a ROM.

In addition, not only in a case where the functions in the previous embodiment can be performed when program code is read and executed by the computer, but also in a case where, according to an instruction in the program code, an OS (Operating System) running on the computer, or another application software program, interacts with the program code to accomplish the functions included in the above embodiments, this program code can be included in the embodiments of the present invention.

Furthermore, the present invention includes a case where program code, read from a memory medium, is written in a memory that is mounted on a function expansion board inserted into a computer, or in a function expansion unit connected to a computer, and in consonance with a program code instruction, a CPU mounted on the function expansion board or the actual processing in order to implement the functions included in the above described embodiments.

When the present invention is applied for the above memory medium, program code corresponding to the previously described flowcharts is stored in the memory medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing apparatus, comprising:
a receiver that receives an ending instruction from a user for instructing the apparatus to terminate use of the apparatus by the user;
a search unit that searches for a pending task to be performed by the user within a predetermined timeframe of the time when said receiver receives the ending instruction from the user; and
a notifier that notifies the user of the pending task to be performed within the predetermined timeframe when the pending task is found by said search unit.

2. An information processing apparatus, comprising:
a receiver that receives an ending instruction from a user for instructing the apparatus to terminate a use of the apparatus by the user;
an inferring unit that infers a destination of a user based on a user's schedule when said receiver receives the ending instruction from the user;
a search unit that searches for a pending task relevant to the inferred destination of the user and to be performed within a predetermined timeframe of the time when said receiver receives the ending instruction from the user; and
a notifier that notifies the user of the pending task relevant to the destination of the user.

3. An information processing apparatus, comprising:
a receiver that receives an ending instruction from a user for instructing the apparatus to terminate a use of the apparatus by the user;
an inferring unit that infers a person with whom the user is scheduled to meet based on a user's schedule when said receiver receives the ending instruction from the user;
a search unit that searches for a pending task relevant to the person with whom the user is scheduled to meet within a predetermined timeframe of the time when said receiver receives the ending instruction from the user; and a notifier that notifies the user of the pending task relevant to the person with whom the user is scheduled to meet.

4. An information processing method, comprising the steps of:
- a receiving step of receiving an ending instruction from a user for instructing an information processing apparatus to terminate a use of the information processing apparatus by the user;
- a searching step of searching for a pending task to be performed by the user within a predetermined timeframe of the time when the ending instruction is received from the user in said receiving step; and
- a notification step of notifying the user of the pending task to be performed within the predetermined time when the pending task is found in said searching step.

5. An information processing method, comprising the steps of:
- a receiving step of receiving an ending instruction from a user for instructing an information processing apparatus to terminate a use of the information processing apparatus by the user;
- an inferring step of inferring a destination of a user based on a user's schedule when the ending instruction is received from the user in said receiving step;
- a searching step of searching for a pending task relevant to the inferred destination of the user and to be performed within a predetermined timeframe of the time when the ending instruction is received from the user in said receiving step; and
- a notification step of notifying the user of the pending task relevant to the destination of the user.

6. An information processing method, comprising the steps of:
- a receiving step of receiving an ending instruction from a user for instructing an information processing apparatus to terminate a use of the information processing apparatus by the user;
- an inferring step of inferring a person with whom the user is scheduled to meet based on a user's schedule when the ending instruction is received from the user in said receiving step;
- a searching step of searching for a pending task relevant to the person with whom the user is scheduled to meet within a predetermined timeframe of the time when the ending instruction is received from the user in said receiving step; and
- a notification step of notifying the user of the pending task relevant to the person with whom the user is scheduled to meet.

7. A computer-readable storage medium which stores a program for controlling a computer, the program comprising the steps of:
- a receiving step of receiving an ending instruction from a user for instructing an information processing apparatus to terminate a use of the information processing apparatus by the user;
- a searching step of searching for a pending task to be performed by the user within a predetermined timeframe of the time when the ending instruction is received from the user in said receiving step; and
- a notification step of notifying the user of the pending task to be performed within the predetermined timeframe when the pending task is found in said searching step.

* * * * *

UNITED STATES PATENT AND TRADEMARK OFFICE
CERTIFICATE OF CORRECTION

PATENT NO. : 7,139,718 B2
APPLICATION NO. : 09/047348
DATED : November 21, 2006
INVENTOR(S) : Jeyachandran et al.

It is certified that error appears in the above-identified patent and that said Letters Patent is hereby corrected as shown below:

TITLE SHEET:
Item (56) U.S. Patent Documents, "5,898,979 A * 5/1999 Miller et al..... 705/9" should be deleted; and
Item (56) Other Publications, after "Designation of Alternate Receipients For Reminders', IBM Technical Disclosure Bulltim" should read -- "Designation of Alternate Recipients For Reminders", IBM Technical Bulletin --.

SHEET 35:
FIG. 35, under the column labeled "Conversion Mode", "CONTRACTION" should read -- CONTRADICTION --.

SHEET 39:
FIG. 39, in reference numeral S3905, "ASUMPTION" should read -- ASSUMPTION --.

COLUMN 11:
Line 9, "and the" should read -- then the --; and
Line 65, "recaption" should read -- reception --.

COLUMN 21:
Line 43, "the" should read -- the processing is thereafter terminated. --;
Line 44, "processing is thereafter terminated." should be deleted; and
Line 61, "ben" should read -- been --.

COLUMN 25:
Line 28, "scheduled" should read -- schedule --.

COLUMN 26:
Line 47, "on" should be deleted.

COLUMN 27:
Line 49, "number" should read -- numbers --.

COLUMN 33:
Line 44, "planing" should read -- planning --.

COLUMN 34:
Line 12, "a" (first occurrence) should be deleted; and
Line 17, "which" should read -- which is --.

UNITED STATES PATENT AND TRADEMARK OFFICE
CERTIFICATE OF CORRECTION

PATENT NO. : 7,139,718 B2
APPLICATION NO. : 09/047348
DATED : November 21, 2006
INVENTOR(S) : Jeyachandran et al.

It is certified that error appears in the above-identified patent and that said Letters Patent is hereby corrected as shown below:

COLUMN 36:
Line 39, "can" should read -- can be --.

COLUMN 37:
Line 57, "such" should read -- such as --.

COLUMN 38:
Line 16, "continuous" should read -- continues --; and
Line 27, "unknown," should read --unknown. --.

COLUMN 41:
Line 42, "precess" should read -- process --.

COLUMN 49:
Line 15, "time" should read -- timeframe --.

Signed and Sealed this

Eleventh Day of March, 2008

JON W. DUDAS
*Director of the United States Patent and Trademark Office*